US009882439B2

United States Patent
Goto et al.

(10) Patent No.: US 9,882,439 B2
(45) Date of Patent: Jan. 30, 2018

(54) ROTOR AND MOTOR

(71) Applicant: ASMO CO., LTD., Shizuoka-ken (JP)

(72) Inventors: Kenta Goto, Hamamatsu (JP); Hideaki Nishiura, Kosai (JP); Shigemasa Kato, Toyohashi (JP); Yoshiyuki Takabe, Hamamatsu (JP); Masashi Matsuda, Kakegawa (JP); Toshihiro Uchida, Kosai (JP)

(73) Assignee: ASMO CO., LTD., Shizuoka-ken (JP)

( * ) Notice: Subject to any disclaimer, the term of this patent is extended or adjusted under 35 U.S.C. 154(b) by 419 days.

(21) Appl. No.: 14/616,106

(22) Filed: Feb. 6, 2015

(65) Prior Publication Data
US 2015/0171681 A1 Jun. 18, 2015

Related U.S. Application Data

(63) Continuation of application No. 13/658,965, filed on Oct. 24, 2012, now Pat. No. 8,981,611.

(30) Foreign Application Priority Data

Oct. 28, 2011 (JP) .................................. 2011-237741
Dec. 26, 2011 (JP) .................................. 2011-284282
(Continued)

(51) Int. Cl.
*H02K 1/27* (2006.01)
*H02K 29/03* (2006.01)
(52) U.S. Cl.
CPC ........... *H02K 1/2746* (2013.01); *H02K 29/03* (2013.01); *H02K 2201/06* (2013.01)
(58) Field of Classification Search
CPC .. H02K 1/2746; H02K 29/03; H02K 2201/06; H02K 21/12
(Continued)

(56) References Cited

U.S. PATENT DOCUMENTS 4,658,167 A   4/1987 Popov et al.
5,663,605 A * 9/1997 Evans .................... H02K 1/223
                                                     174/DIG. 21
(Continued)

FOREIGN PATENT DOCUMENTS

JP        S6110953 A    1/1986
JP        S63154050 A   6/1988
(Continued)

OTHER PUBLICATIONS

English translation of Office Action corresponding to JP 2012-163002, dated Aug. 2, 2016, five pages.
(Continued)

*Primary Examiner* — Hanh Nguyen
*Assistant Examiner* — Leda Pham
(74) *Attorney, Agent, or Firm* — Kilpatrick Townsend & Stockton LLP

(57) ABSTRACT

A rotor includes magnetic pole portions and first and second ferric core portions. The first and second ferric core portions are each located between magnetic pole portions in the circumferential direction of a rotor. A first gap is formed between the first or second ferric core portion and a magnetic pole portion at a first circumferential side. A second gap is formed between the first or second ferric core portion and the magnetic pole portion at a second circumferential side. The first gap has a smaller width than the second gap at the first ferric core portion. The first ferric core portion is inclined toward the first circumferential side. The first gap is larger than the second gap at the second ferric core portion. The second ferric core portion is inclined toward the second circumferential side.

15 Claims, 63 Drawing Sheets

(30) Foreign Application Priority Data

| Mar. 13, 2012 | (JP) | 2012-056068 |
|---|---|---|
| Mar. 27, 2012 | (JP) | 2012-072460 |
| May 29, 2012 | (JP) | 2012-122200 |
| Jul. 23, 2012 | (JP) | 2012-163002 |

(58) Field of Classification Search
USPC ........ 310/156.47, 156.56, 216.001, 216.004, 310/216.008, 216.011, 216.012, 156.53
See application file for complete search history.

(56) References Cited

U.S. PATENT DOCUMENTS

| 5,682,073 | A | 10/1997 | Mizuno | |
| 5,978,061 | A | 11/1999 | Miyazaki et al. | |
| 6,445,437 | B1 | 9/2002 | Miyazaki et al. | |
| 2002/0171800 | A1 | 11/2002 | Miyazaki et al. | |
| 2008/0018190 | A1* | 1/2008 | Takahata | H02K 1/2766 310/156.56 |
| 2010/0133939 | A1 | 6/2010 | Takemoto et al. | |
| 2010/0148612 | A1* | 6/2010 | Takemoto | H02K 1/276 310/156.53 |
| 2010/0308680 | A1 | 12/2010 | Yamada et al. | |
| 2011/0148240 | A1* | 6/2011 | Koide | H02K 1/2746 310/156.54 |
| 2011/0181230 | A1 | 7/2011 | Yamada et al. | |
| 2011/0309707 | A1 | 12/2011 | Kate et al. | |

FOREIGN PATENT DOCUMENTS

| JP | 4-28745 U | 3/1992 |
| JP | H06351206 A | 12/1994 |
| JP | H08205499 A | 8/1996 |
| JP | H0974729 A | 3/1997 |
| JP | 9-327139 A1 | 12/1997 |
| JP | 2000175389 A | 6/2000 |
| JP | 2003023740 A | 1/2003 |
| JP | 2004048912 A | 2/2004 |
| JP | 2010110142 A | 5/2010 |
| JP | 2010259304 A | 11/2010 |
| JP | 2010273442 A | 12/2010 |
| JP | 2011083047 A | 4/2011 |
| JP | 2011182603 A | 9/2011 |
| JP | 2012016128 A | 1/2012 |
| WO | WO2011/108737 A1 | 9/2011 |

OTHER PUBLICATIONS

English translation of Office Action corresponding to JP 2012-163002, dated Jan. 19, 2016, five pages.

English translation of Office Action corresponding to JP 2012-122200, dated Sep. 29, 2015, six pages.

Office Action corresponding to JP 2012-056068, dated Jul. 21, 2015, four pages.

\* cited by examiner

Fig.58
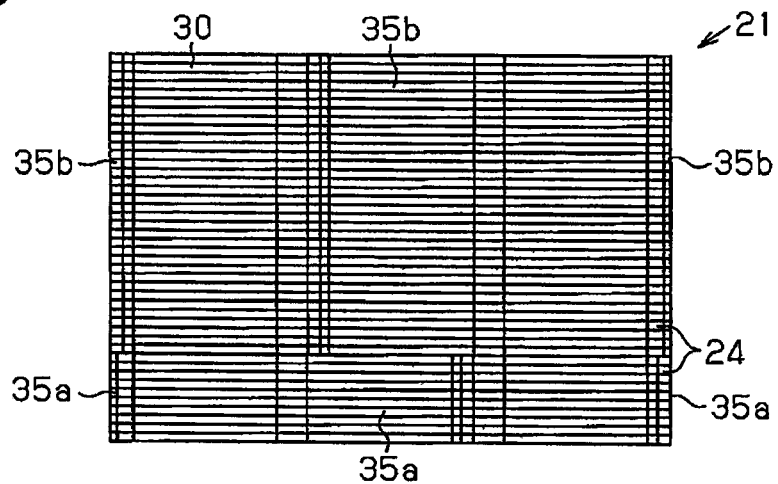
Fig.59A
No Load
Fig.59B
Load Applied
(Operated by Rated Current)
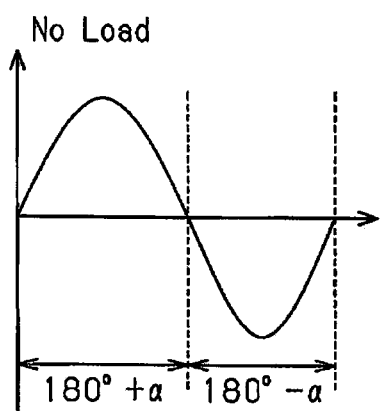
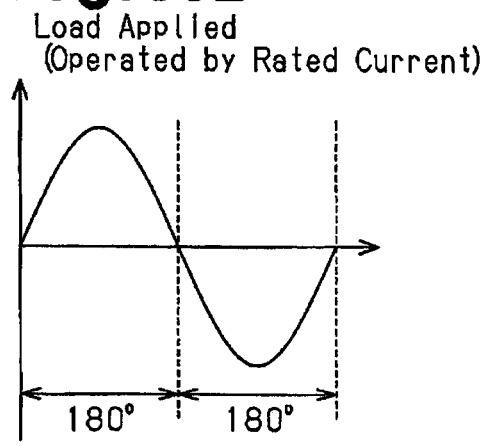
Fig.60A
No Load
Fig.60B
Load Applied
(Operated by Rated Current)
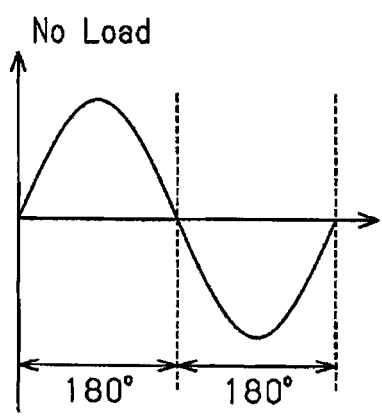
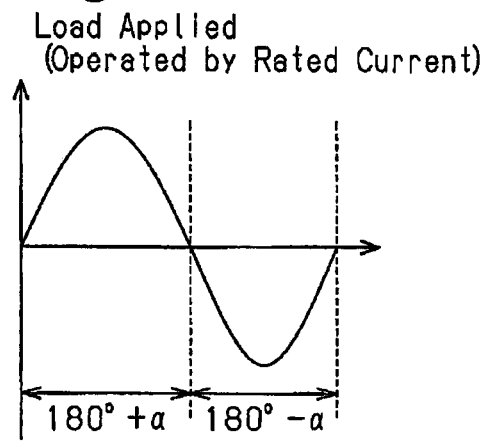

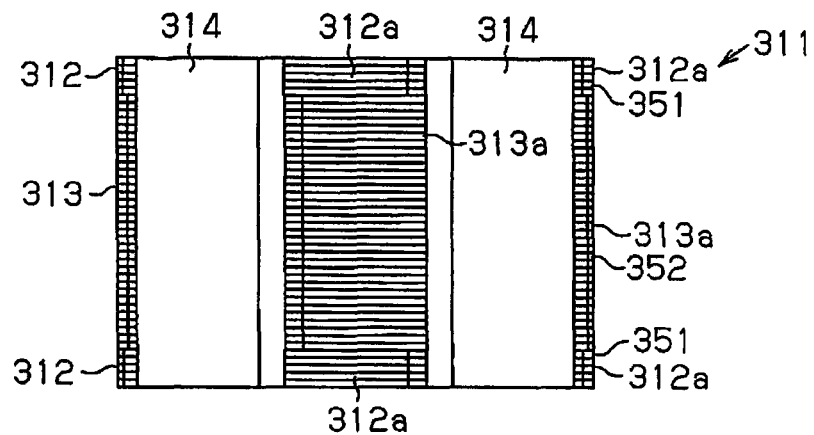
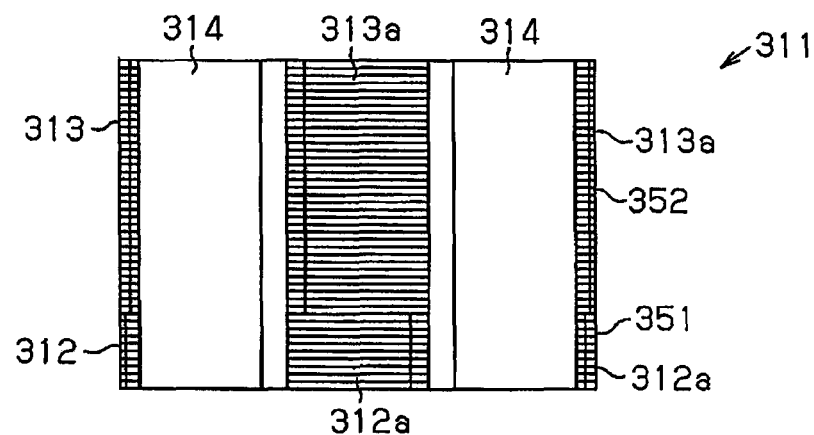
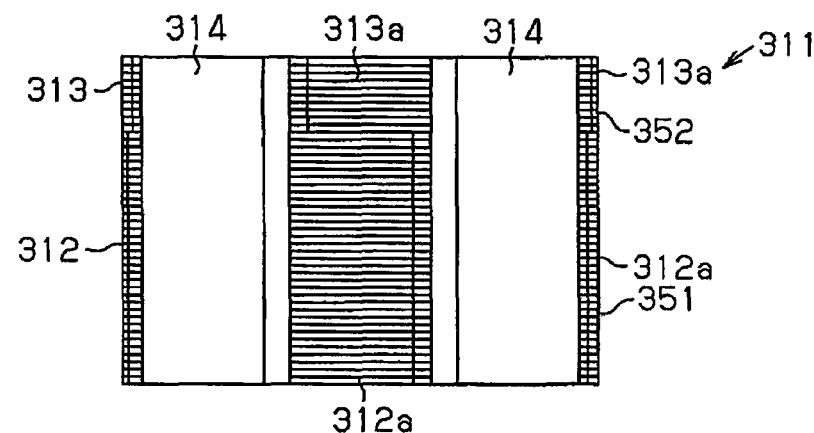

Fig.73A
Fig.73B
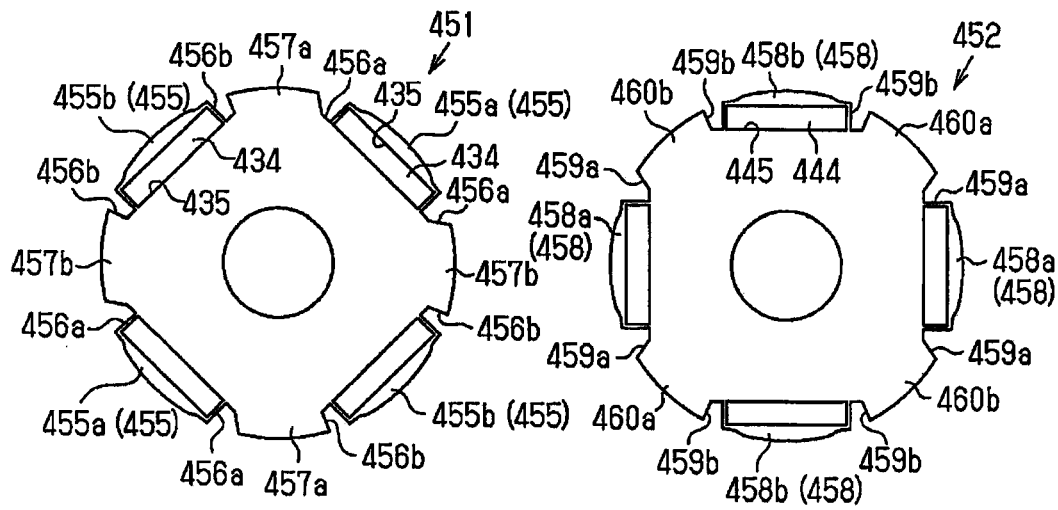
Fig.74
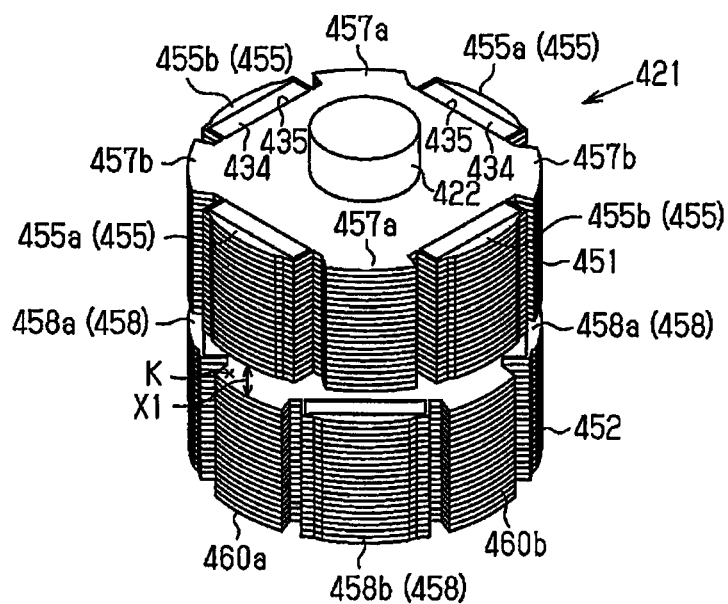

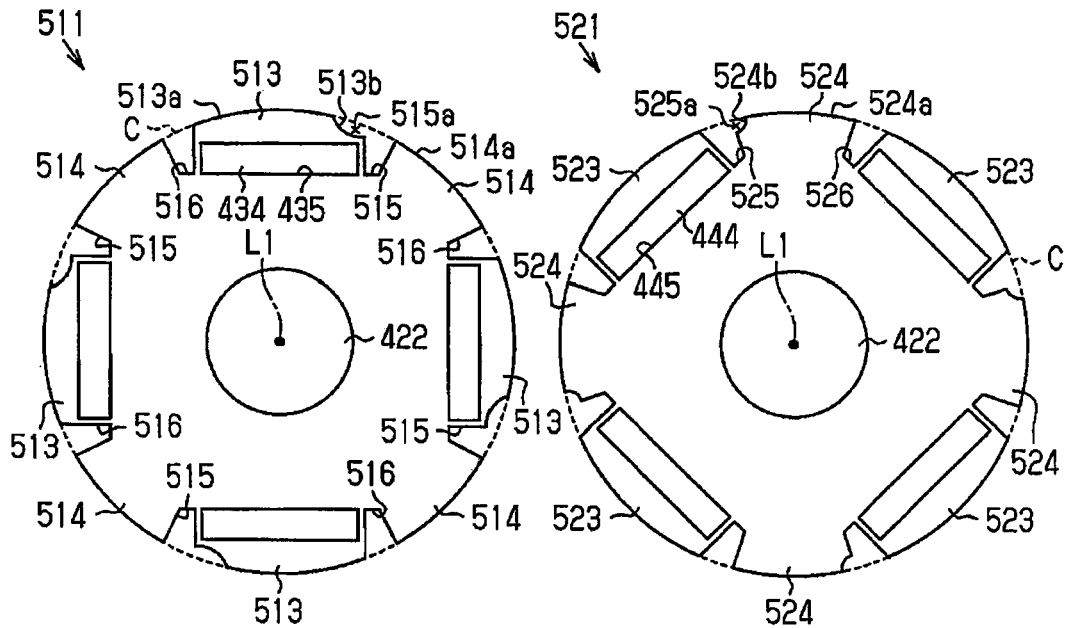
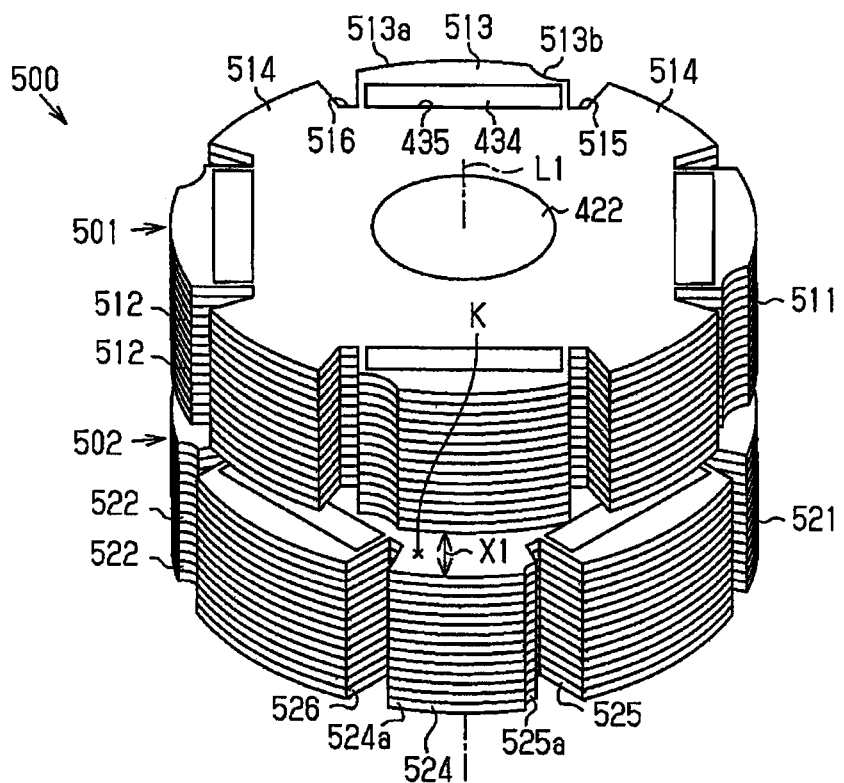

Fig.85
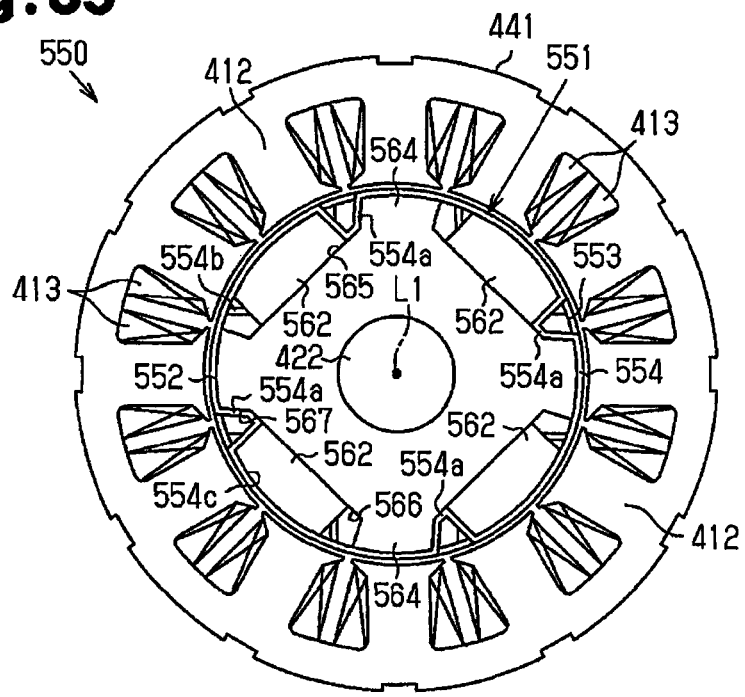
Fig.86A  Fig.86B
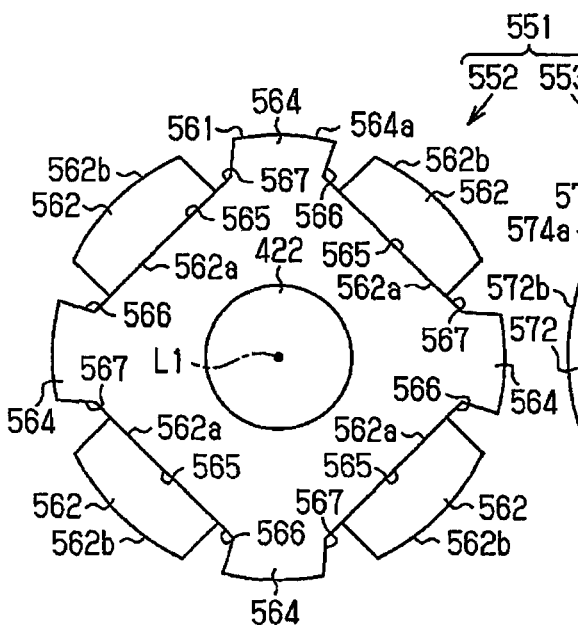
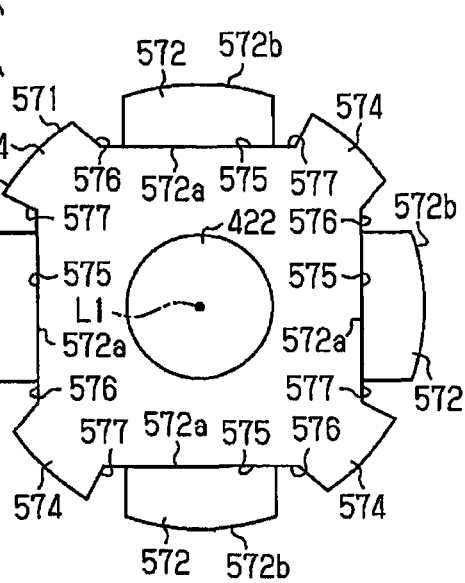

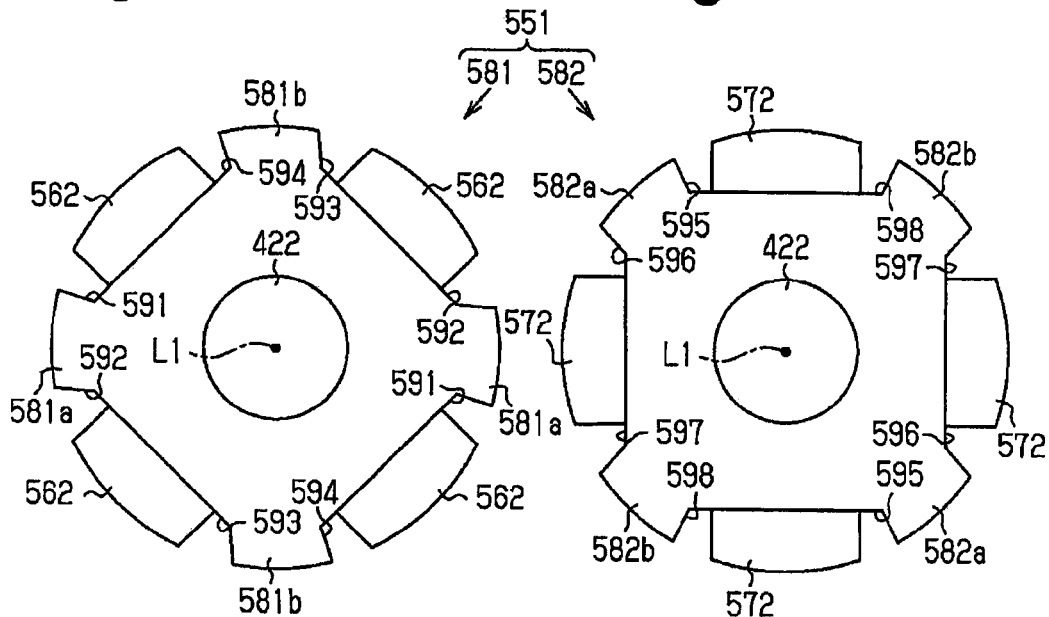
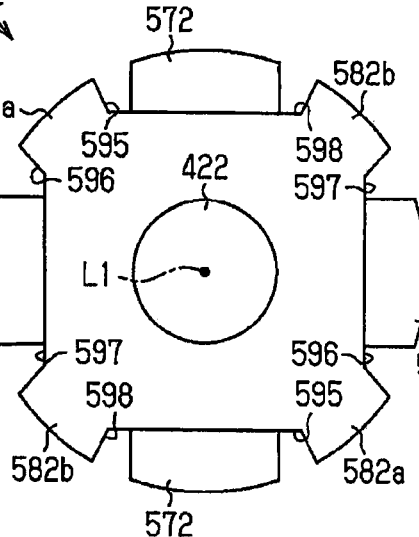
Fig.89A  Fig.89B
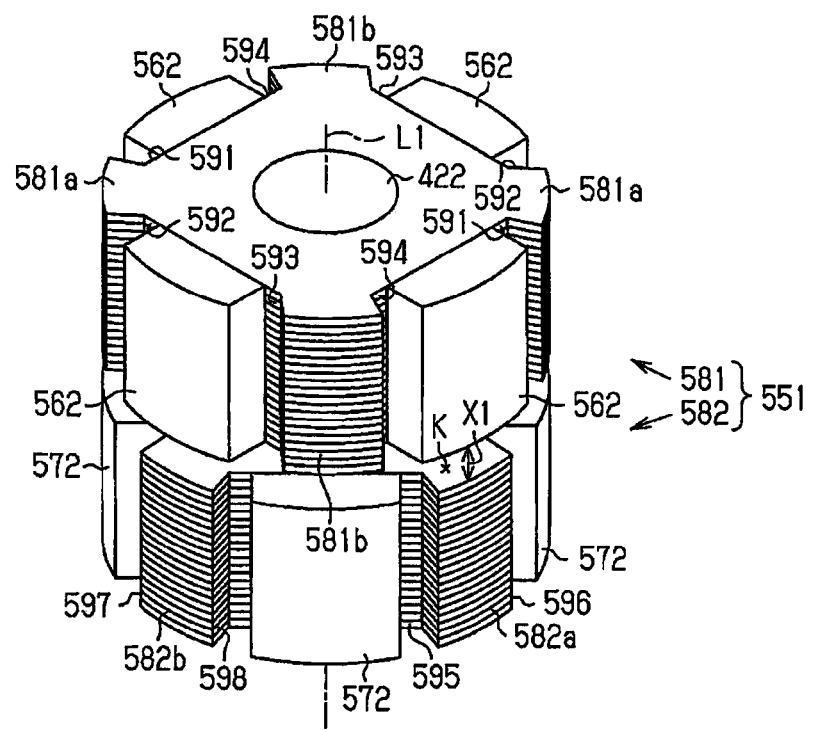
Fig.90

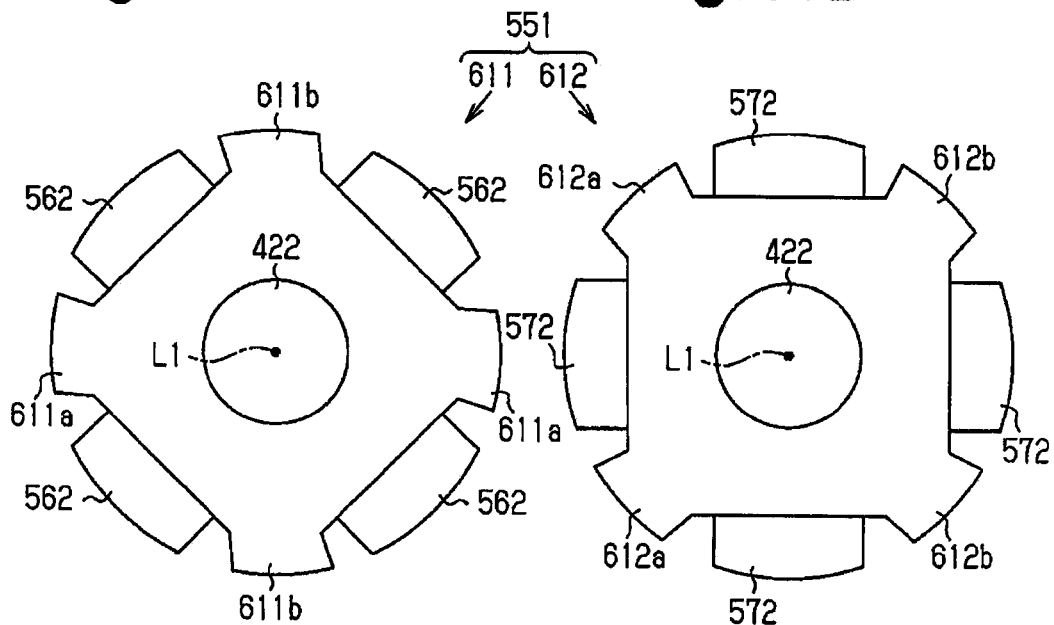
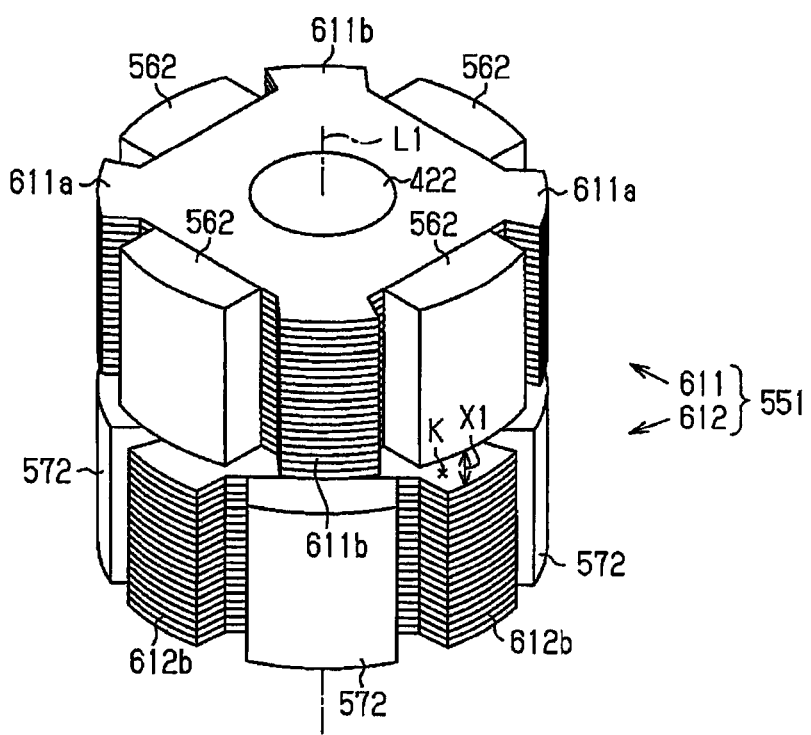

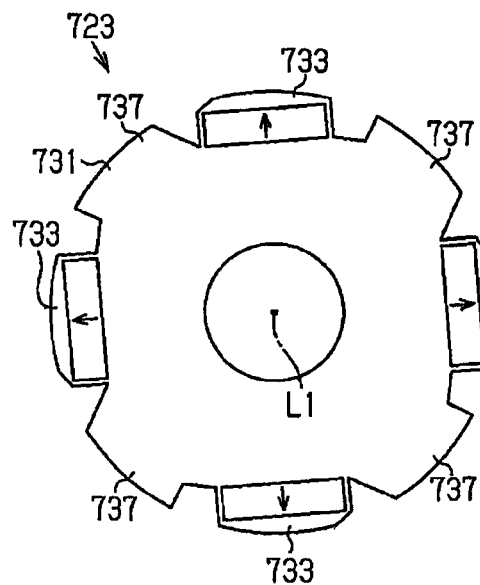
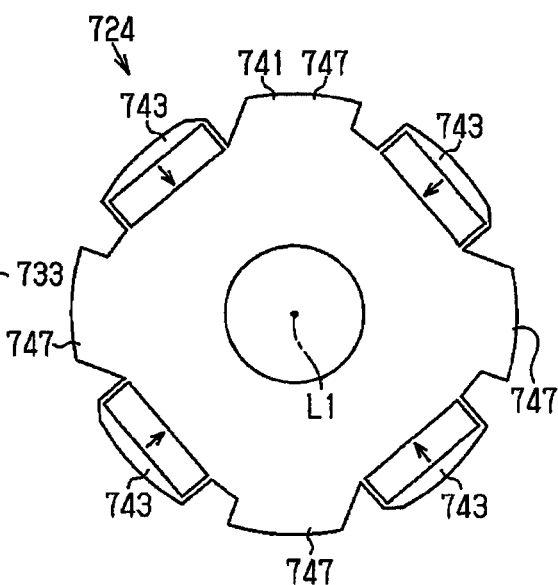
Fig.105A
Fig.105B
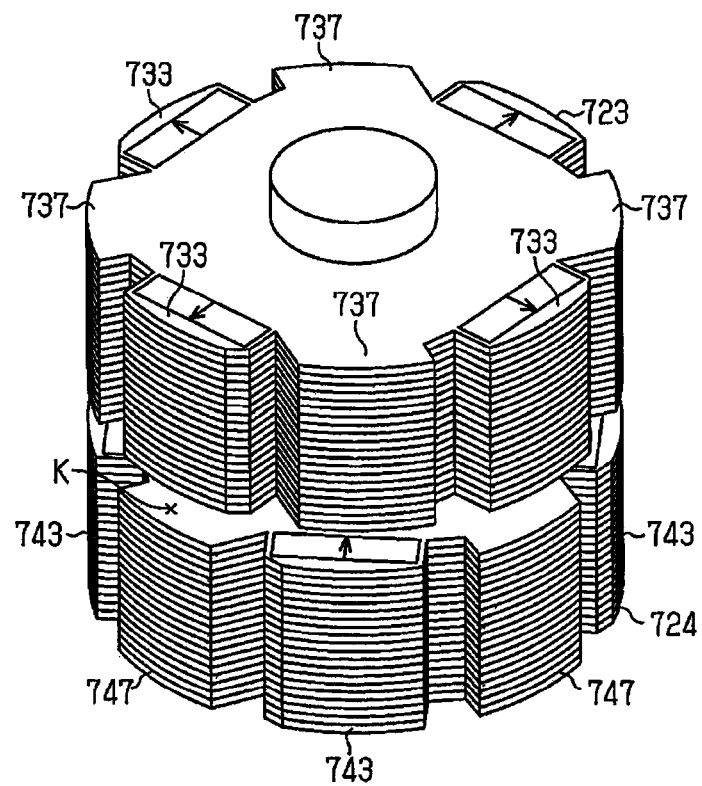
Fig.106

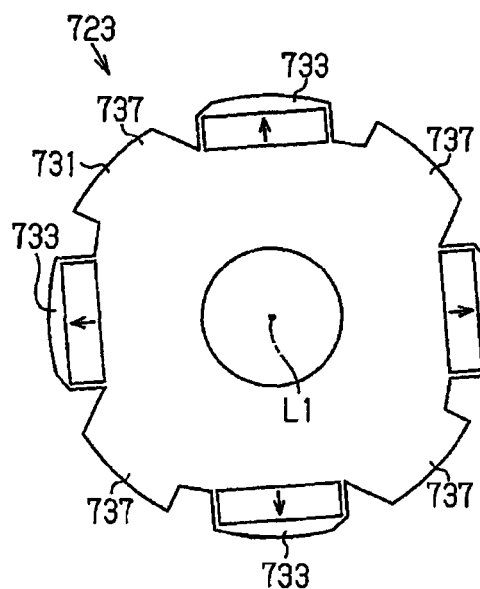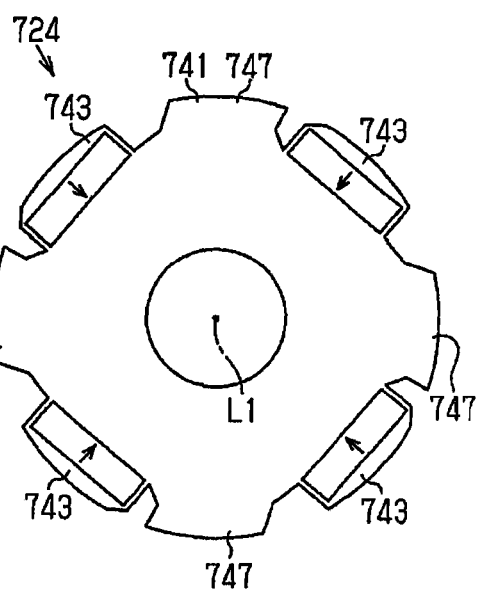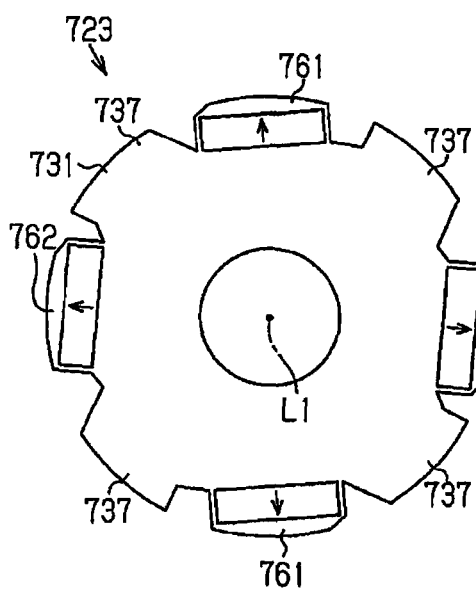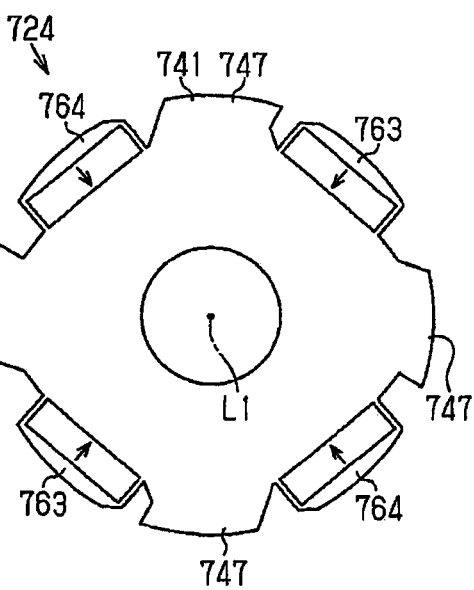

——— 1st Rotor Portion
----- 2nd Rotor Portion
——— Combined

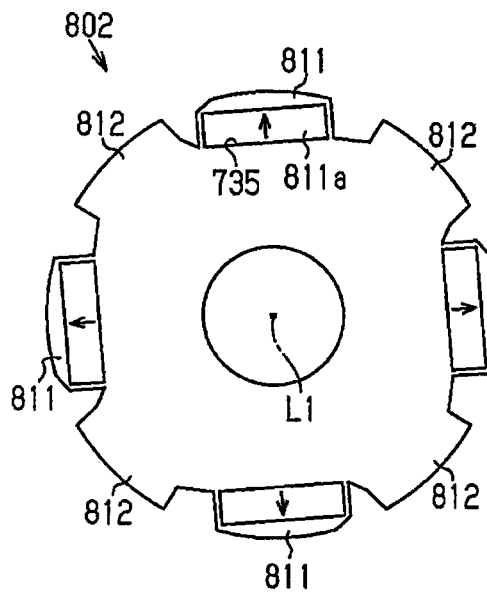 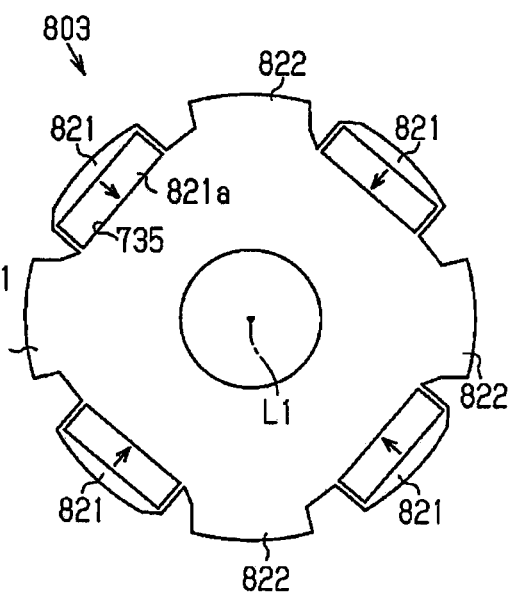
Fig.120A  Fig.120B
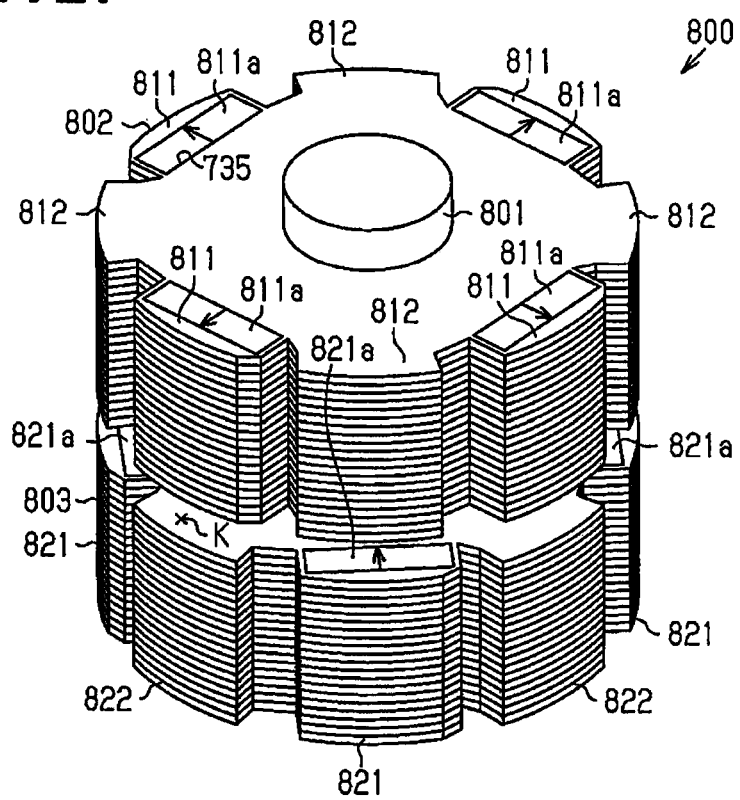
Fig.121

ROTOR AND MOTOR

CROSS REFERENCE TO RELATED APPLICATIONS

This application is a continuation application of U.S. patent application Ser. No. 13/658,965, filed Oct. 24, 2012, the complete disclosure of which is herein incorporated by reference.

BACKGROUND OF THE INVENTION

The present invention relates to a rotor and a motor.

Japanese Laid-Open Patent Publication No. 9-327139 describes a motor that saves natural resources and lower costs. The motor uses a so-called consequent pole type rotor (also referred to as half magnet-type rotor) in which magnets of one of the magnetic poles are arranged on an outer circumferential surface of a rotor core in a circumferential direction, and ferric core portions (salient poles) of the rotor core are arranged in the gaps between the magnets as the other one of the magnetic poles.

In such a consequent pole type rotor, ferric core portions (salient poles), of which magnetic flux has no forcing power, are mixed with magnets. This results in a magnetic imbalance that may cause cogging torque.

SUMMARY OF THE INVENTION

It is an object of the present invention to provide a rotor and a motor that suppresses cogging torque.

To achieve the above object, one aspect of the present invention is a rotor including a plurality of magnetic pole portions arranged along a circumferential direction of a rotor core. Each of the magnetic pole portions includes a magnet forming one of two magnetic poles. First and second ferric core portions are arranged in the rotor core and located between adjacent ones of the magnetic pole portions in the circumferential direction. Each of the first and second ferric core portions functions as the other one of the magnetic poles. A first gap is formed between each of the first and second ferric core portions and a magnetic pole portion located at a first circumferential side. A second gap is formed between each of the first and second ferric core portions and a magnetic pole portion located at a second circumferential side. The first gap at the first circumferential side of the first ferric core portion has a smaller width than the second gap at the second circumferential side of the first ferric core portion. The first ferric core portion is inclined toward the first circumferential side. The first gap at the first circumferential side of the second ferric core portion has a larger width than the second gap at the second circumferential side of the second ferric core portion. The second ferric core portion is inclined toward the second circumferential side.

In this structure, the gap at the first circumferential side differs in circumferential width from the gap at the second circumferential side. This substantially changes the locations and shapes of the magnetic pole portions between the ferric core portions and cancels out the cogging torques generated by the ferric core portions. Thus, cogging torque can be suppressed.

More specifically, the present invention includes a ferric core portion that is inclined toward the first circumferential side and has a small circumferential gap at the first circumferential side and a large circumferential gap at the second circumferential side and a ferric core portion that is inclined toward the second circumferential side and has a large circumferential gap at the first circumferential side and a narrow circumferential gap at the second circumferential side. In this manner, the ferric core portion inclined toward the first circumferential side and the ferric core portion inclined toward the second circumferential side cancels out the cogging torques generated at the ferric core portions. This ensures that the cogging torques are suppressed.

Preferably, the first ferric core portions and the second ferric core portions are stacked in an axial direction of the rotor at the same position in the circumferential direction. The first ferric core portion has a total length in the stacking direction and the second ferric core portion has a total length in the stacking direction that differs from the total length of the first ferric core portion.

In this structure, the first ferric core portion has a total length in the stacking direction and the second ferric core portion has a total length in the stacking direction that differs from the total length of the first ferric core portion. This evens the induced voltage pitch to 180 degrees when power is supplied.

Preferably, a larger one of the first gap and second gap includes a gap extension that extends to an outer surface of the corresponding one of the first ferric core portion, the second ferric core portion, and the magnetic pole portion.

In this structure, the first gap includes a gap extension that extends to an outer surface of the corresponding one of the first ferric core portion, the second ferric core portion, and the magnetic pole portion. Thus, by adjusting the gap extension that extends to the outer surface in a state in which the rotor is coupled, the circumferential width of the first gap can be adjusted. This accurately adjusts the magnetic balance and suppresses cogging torque.

Preferably, a first rotor portion and a second rotor portion are overlapped with each other in the axial direction. The first gap is arranged in the first rotor portion only at the first circumferential side of the corresponding one of the first ferric core portion, the second ferric core portion, and the magnetic pole portion. The first gap is arranged in the second rotor portion only at the second circumferential side of the corresponding one of the first ferric core portion, the second ferric core portion, and the magnetic pole portion.

In this structure, the rotor includes a first rotor portion including a first gap arranged only at the first circumferential side of the corresponding one of the first ferric core portion, and a second rotor portion including a first gap arranged only at the second circumferential side of the corresponding one of the first ferric core portion, the second ferric core portion, and the magnetic pole portion. In such a structure, the weight can be balanced even when the first and second rotor portions are overlapped in the axial direction.

Preferably, the rotor core is formed by stacking a plurality of core sheets that are identical in shape.

In this structure, the rotor core is formed by stacking a plurality of core sheets that are identical in shape. This eliminates the need for using core sheets having different shapes and reduces different types of components. Thus, the number of components can be reduced, and the number of steps when pressing and forming the core sheets is prevented from being increased.

Preferably, the core sheets are separated from each other in the circumferential direction so that the first ferric core portion is overlapped with the second ferric core portion in the axial direction.

In this structure, in the rotor core, the ferric core portion that includes a small circumferential gap at the first circumferential side and a large circumferential gap at the second circumferential side is overlapped in the axial direction with the ferric core portion that includes a large circumferential gap at the first circumferential side and a small circumferential gap at the second circumferential side. This balances the weight of the ferric core portions having different shapes and smoothly rotates the rotor.

Preferably, the first ferric core portion is one of a plurality of first ferric core portions, and the second ferric core portion is one of a plurality of second ferric core portions. Each of the core sheets includes at least two of the first ferric core portions and at least two of the second ferric core portions. Either one of the first ferric core portions and the second ferric core portions are identical in shape and separated from each other by 180 degrees in the circumferential direction.

In this structure, the ferric core portions are identical in shape at opposite sides where the ferric core portions are separated by 180 degrees in the circumferential direction. This balances the weight and smoothly rotates the rotor.

Preferably, the rotor core is symmetric in a stacking direction of the core sheets about a center of the stacking direction.

In this structure, the rotor core is symmetric in a stacking direction of the core sheets about a center of the stacking direction. Thus, the number and surface area of the first ferric core portion in the stacking direction is the same as the second ferric core portion, and the switching pitch of induced voltage can be 180 degrees in electrical angle. This allows for rotation of the rotor in two directions and improves the feasibility and stability of sensorless driving (e.g., position detection using induced voltage).

Preferably, the first and second ferric core portions are arranged so that a circumferential angle at a radially outer side is in an electrical angle range of 5 degrees to 24 degrees.

In this structure, the ferric core portions are arranged so that a circumferential angle at a radially outer side is in an electrical angle range of 5 degrees to 24 degrees. Thus, as shown in FIG. 13, the decrease amount of the effective value of the induced voltage is kept within 5% or less, and the cogging torque can be reduced by 28.8%.

Preferably, the rotor includes a first rotor portion, a second rotor portion, and a magnetic resistance portion. The magnetic pole portions of the first rotor portion have a polarity that is one of north and south poles. The second rotor portion is overlapped with the first rotor portion in the axial direction through the magnetic resistance portion. The magnetic pole portions of the second rotor portion have a polarity that differs from that of the magnetic pole portions in the first rotor portion. The first and second ferric core portions of the second rotor portion have the same polarity as the magnetic pole portions of the first rotor portion. The first and second ferric core portions of the second rotor portion are overlapped with the magnetic pole portions of the first rotor portion in the axial direction. The first and second ferric core portions of the first rotor portion have the same polarity as the magnetic pole portions of the second rotor portion. The first and second ferric core portions of the first rotor portion are overlapped with the magnetic pole portions of the second rotor portion in the axial direction.

In this structure, the rotor includes a first rotor portion, in which the magnetic pole portions have a polarity that is one of north and south poles, and a second rotor portion, in which the magnetic pole portions have a polarity that differs from that of the magnetic pole portions in the first rotor portion. The second rotor portion is overlapped with the first rotor portion in the axial direction by way of a magnetic resistance. In this manner, the magnetic pole portions that generate magnetic flux are arranged in the first rotor portion and the second rotor portion with different polarities. This allows for magnetic balancing. Further, the magnetic pole portions of the first rotor portion and the ferric core portion of the second rotor portion that has the same polarity as the magnetic pole portions of the first rotor portion are overlapped in the axial direction, and the magnetic pole portions of the second rotor portion and the ferric core portion of the first rotor portion that has the same polarity as the magnetic pole portions of the second rotor portion are overlapped in the axial direction. The ferric core portions include a ferric core portion inclined in the first circumferential side and a ferric core portion inclined in the second circumferential side. This separates the peaks of the cogging torque in the ferric core portion inclined toward the first circumferential side and the ferric core portion inclined toward the second circumferential side and thereby suppresses the cogging torque.

Preferably, the first ferric core portion is arranged on only the first rotor portion, and the second ferric core portion is arranged on only the second rotor portion.

In this structure, the ferric core portion inclined toward the first circumferential side is arranged on only the first rotor portion, and the second ferric core portion inclined toward the second circumferential side is arranged on only the second rotor portion. This simplifies the shape of each rotor portion.

Preferably, the first ferric core portion is inclined toward the first circumferential side on a plane that is orthogonal to an axial direction, and the second ferric core portion is inclined toward the second circumferential side on a plane that is orthogonal to the axial direction.

In this structure, the first ferric core portion is inclined toward the first circumferential side on a plane that is orthogonal to an axial direction, and the second ferric core portion is inclined toward the second circumferential side on a plane that is orthogonal to the axial direction. Thus, each rotor portion can be formed without using different types of rotor cores.

Preferably, the rotor includes a first rotor portion, a second rotor portion, and a magnetic resistance portion. The magnetic pole portions of the first rotor portion have a polarity that is one of north and south poles. The second rotor portion is overlapped with the first rotor portion in the axial direction through the magnetic resistance portion. The magnetic pole portions of the second rotor portion have a polarity that differs from that of the magnetic pole portions of the first rotor portion. The first and second ferric core portions of the second rotor portion have the same polarity as the magnetic pole portions of the first rotor portion. The first and second ferric core portions of the second rotor portion are overlapped with the magnetic pole portions of the first rotor portion in the axial direction. The first and second ferric core portions of the first rotor portion have the same polarity as the magnetic pole portions of the second rotor portion. The first and second ferric core portions of the first rotor portion are overlapped with the magnetic pole portions of the second rotor portion in the axial direction. A total circumferential width of the first gap is equal to a total circumferential width of the second gap.

In this structure, the rotor includes a first rotor portion, in which the magnetic pole portions have a polarity that is one of north and south poles, and a second rotor portion, in which the magnetic pole portions have a polarity that differs from that of the magnetic pole portions in the first rotor portion. The second rotor portion is overlapped with the first rotor portion in the axial direction by way of a magnetic resistance. In this manner, the magnetic pole portions that generate magnetic flux are arranged in the first rotor portion and the second rotor portion with different polarities. This allows for magnetic balancing. Further, the magnetic pole portions of the first rotor portion and the ferric core portion of the second rotor portion that has the same polarity as the magnetic pole portions of the first rotor portion are overlapped in the axial direction, and the magnetic pole portions of the second rotor portion and the ferric core portion of the first rotor portion that has the same polarity as the magnetic pole portions of the second rotor portion are overlapped in the axial direction. The gap at the first circumferential side of a ferric core portion differs from the gap at the second circumferential side of the ferric core portion. A total circumferential width of the first gap is equal to a total circumferential width of the second gap. In this manner, the gap at the first circumferential side of a ferric core portion differs from the gap at the second circumferential side of the ferric core portion. This substantially changes the locations and shapes of the magnetic pole portions between the ferric core portions and cancels out the cogging torques generated by the ferric core portions. Thus, the peaks of the cogging torque generated by the ferric core portions can be separated and cogging torque can be suppressed.

Preferably, the magnetic pole portions include at least one of a magnetic pole portion of which magnetic direction is inclined toward the first circumferential side and a magnetic pole portion of which magnetic direction is inclined toward the second circumferential side.

In this structure, the magnetic pole portions include at least one of a magnetic pole portion of which magnetic direction is inclined toward the first circumferential side and a magnetic pole portion of which magnetic direction is inclined toward the second circumferential side. The ferric core portion includes the first ferric core portion inclined toward the first circumferential side and the second ferric core portion inclined toward the second circumferential side. As shown in FIGS. 99 and 100, this increases the primary component of the induced voltage and increases the torque.

Preferably, the rotor includes a first rotor portion and a second rotor portion. The magnetic pole portions of the first rotor portion have a polarity that is one of north and south poles. The second rotor portion is overlapped with the first rotor portion in the axial direction. The magnetic pole portions of the second rotor portion have a polarity that differs from that of the magnetic pole portions of the first rotor portion. The first and second ferric core portions of the second rotor portion have the same polarity as the magnetic pole portions of the first rotor portion. The first and second ferric core portions of the second rotor portion are overlapped with the magnetic pole portions of the first rotor portion in the axial direction. The first and second ferric core portions of the first rotor portion have the same polarity as the magnetic pole portions of the second rotor portion. The first and second ferric core portions of the first rotor portion are overlapped with the magnetic pole portions of the second rotor portion in the axial direction.

In this structure, the rotor includes a first rotor portion, in which the magnetic pole portions have a polarity that is one of north and south poles, and a second rotor portion, in which the magnetic pole portions have a polarity that differs from that of the magnetic pole portions in the first rotor portion. The second rotor portion is overlapped with the first rotor portion in the axial direction. The first and second ferric core portions of the second rotor portion are overlapped with the magnetic pole portions of the first rotor portion in the axial direction. The first and second ferric core portions of the first rotor portion have the same polarity as the magnetic pole portions of the second rotor portion. The first and second ferric core portions of the first rotor portion are overlapped with the magnetic pole portions of the second rotor portion in the axial direction. In this manner, the magnetic pole portions that generate magnetic flux are arranged in the first rotor portion and the second rotor portion with different polarities. This allows for magnetic balancing.

Preferably, the rotor includes a first rotor portion and a second rotor portion. The magnetic pole portions of the first rotor portion have a polarity that is one of north and south poles. The second rotor portion is overlapped with the first rotor portion in the axial direction. The magnetic pole portions of the second rotor portion have a polarity that differs from that of the magnetic pole portions of the first rotor portion. The first ferric core portion is arranged on only the first rotor portion. The second ferric core portion is arranged on only the second rotor portion.

In this structure, the ferric core portion inclined toward the first circumferential side is arranged on only the first rotor portion, and the ferric core portion inclined toward the second circumferential side is arranged on only the second rotor portion. This simplifies the shapes of the rotor portions.

Preferably, the rotor includes a first rotor portion and a second rotor portion. The magnetic pole portions of the first rotor portion have a polarity that is one of north and south poles. The second rotor portion is overlapped with the first rotor portion in an axial direction. The magnetic pole portions of the second rotor portion have a polarity that differs from that of the magnetic pole portions of the first rotor portion. The first ferric core portion is inclined toward the first circumferential side on a plane that is orthogonal to the axial direction. The second ferric core portion is inclined toward the second circumferential side on a plane that is orthogonal to the axial direction.

In this structure, the rotor includes a first rotor portion and a second rotor portion include ferric core portions inclined toward the first circumferential side and the second circumferential side on planes orthogonal to the axial direction. This allows each rotor portion to be formed without using different types of rotor cores.

Preferably, a motor includes the above rotor.

This structure provides a motor that obtains the advantages of the above embodiments.

A further aspect of the present invention provides a rotor including a plurality of magnetic pole portions arranged along a circumferential direction of a rotor core. Each of the magnetic pole portions includes a magnet forming one of two magnetic poles. First and second ferric core portions are located between the magnetic pole portions. Each of the first and second ferric core portions functions as the other one of the magnetic poles. A first gap is formed between each of the first and second ferric core portions and a magnetic pole portion located at a first circumferential side. A second gap is formed between each of the first and second ferric core portions and a magnetic pole portion located at a second circumferential side. The first gap and the second gap have different circumferential widths. A total circumferential width of the first gap is equal to a total circumferential width of the second gap.

In this structure, the total circumferential width of the first gap at the first circumferential side of each ferric core portion is equal to a total circumferential width of the second gap at the second circumferential side of each ferric core portion. This allows for magnetic balancing at the two circumferential sides of the ferric core portions.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 58 is a side view showing a rotor of an IPM-type structure in another example;
FIGS. 59A and 59B are diagrams showing the pitch of the induced voltage at a rotor of another example;

FIGS. 60A and 60B are diagrams showing the pitch of induced voltage at a rotor of a comparative example;

FIG. 64 is a side view showing a rotor of an SPM-type structure in another example;

FIG. 65 is a side view showing a rotor of an SPM-type structure in another example;

FIG. 66 is a side view showing a rotor of an SPM-type structure in another example;

FIGS. 73A and 73B are plan views of a rotor according to a fifth embodiment;

FIG. 74 is a perspective view showing the rotor of the fifth embodiment;

FIGS. 81A and 81B are plan views showing a rotor in another example;

FIG. 82 is a perspective view showing the rotor of the example;

FIG. 85 is a schematic plan view showing a motor of another example;

FIG. 86A is a plan view showing a first rotor portion in a state where a magnet retaining cover is removed;

FIG. 86B is a plan view of a second rotor portion in a state where a magnet retaining cover is removed;

FIG. 89A is a plan view showing the first rotor portion in a state where the magnet retaining cover is removed;

FIG. 89B is a plan view showing the second rotor portion in a state where the magnet retaining cover is removed;

FIG. 90 is a perspective view showing the first and second rotor portions in the state where the magnet retaining cover is removed;

FIG. 93A is a plan view showing the first rotor portion in the state where the magnet retaining cover is removed;

FIG. 93B is a plan view showing the second rotor portion in the state where the magnet retaining cover is removed;

FIG. 94 is a perspective view showing the first and second rotor portions in the state where the magnet retaining cover is removed;

FIGS. 105A and 105B are plan views showing a rotor in another example;

FIG. 106 is a perspective view showing the rotor of the example;

FIGS. 111A and 111B are plan views showing a rotor in another example;

FIGS. 112A and 112B are plan views showing a rotor in another example;

FIGS. 120A and 120B are plan views showing a rotor in another example;

FIG. 121 is a perspective view showing the rotor of the example;

DETAILED DESCRIPTION OF THE PREFERRED EMBODIMENTS

First Embodiment

A first embodiment of the present invention will now be described with reference to the drawings.

Figure 1:
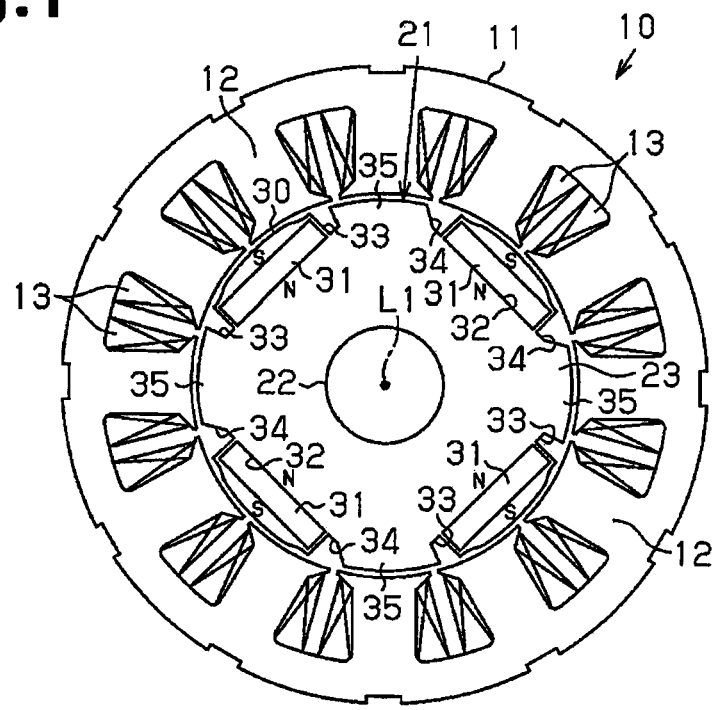
FIG. 1 is a schematic plan view showing a motor according to a first embodiment.

As shown in FIG. 1, a motor 10 includes an annular stator 11 arranged along an inner circumferential surface of a motor housing (not shown), and a rotor 21 rotatably arranged in the stator 11.

The stator 11 includes a plurality of (twelve in this embodiment) teeth 12. The teeth 12 are annularly arranged, and a plurality of (twelve in this embodiment) slots are formed between the teeth 12. A winding 13 is wound around each tooth 12 in a concentrated winding manner, and three-phase alternating current flows through the winding 13.

Figure 2:
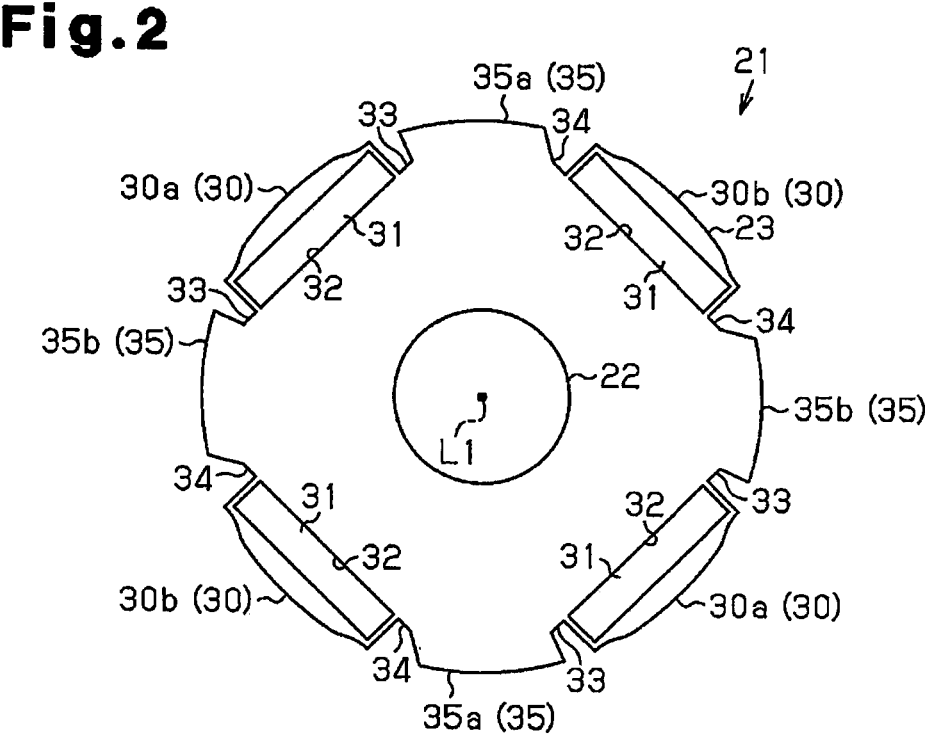
FIG. 2 is a plan view showing a rotor.
Figure 3:
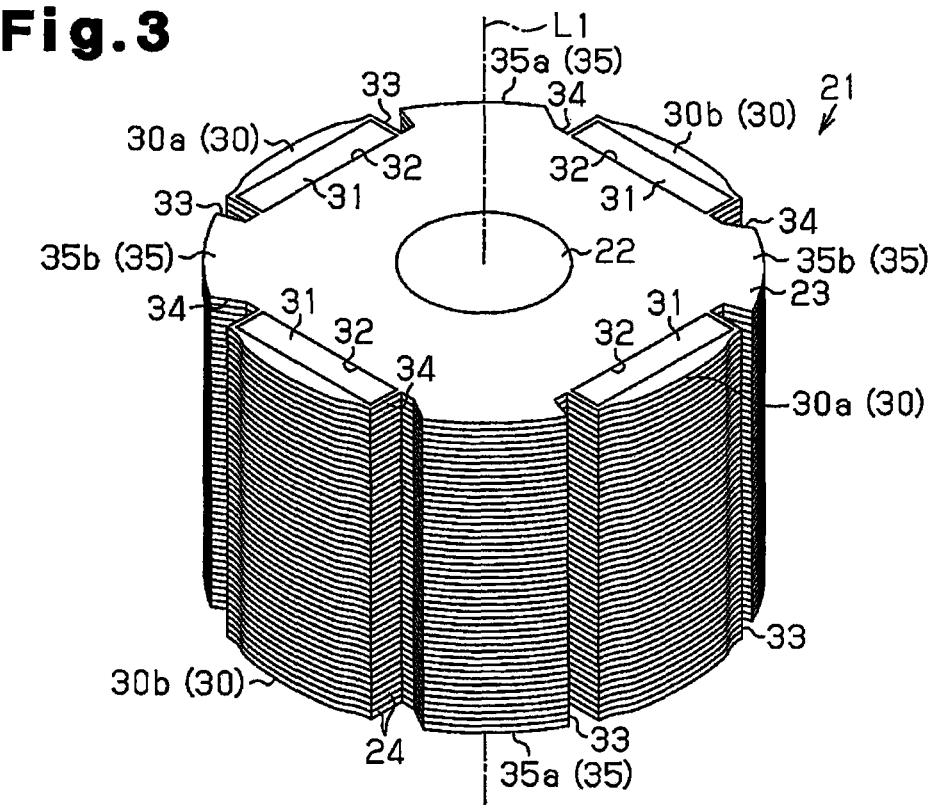
FIG. 3 is a perspective view of the rotor.

As shown in FIGS. 1 to 3, the rotor 21 includes a rotation shaft 22 and a cylindrical rotor core 23 fixed to the rotation shaft 22. The rotation shaft 22 is arranged so that its center axis L1 conforms to the center axis of the annular stator 11. The two axial ends of the rotation shaft 22 are rotatably supported by bearings (not shown), which are arranged in a motor housing. Accordingly, the rotor 21 is supported in the stator 11 so that the rotor 21 is rotatable about the center axis L1.

As shown in FIG. 3, the rotor core 23 is formed by stacking a plurality of core sheets 24 having identical shapes. A plurality of magnetic pole portions 30 are formed in a peripheral part of the rotor core 23. The magnetic pole portions 30 are opposed, in the radial direction, to the teeth 12 of the stator 11 surrounding the rotor core 23.

More specifically, as shown in FIGS. 1 to 3, in this embodiment, each magnetic pole portion 30 is formed by embedding a planar magnet 31 in the peripheral part of the rotor core 23. That is, the motor 10 of the present embodiment is a so-called IPM motor having a magnet-embedded type rotor. More specifically, magnet receptacles 32, which extend in the axial direction, are formed in the peripheral part of the rotor core 23 at equal angular intervals (90° intervals) in the circumferential direction. The magnetic pole portions 30 are formed by accommodating and fixing the magnets 31 in the magnet receptacles 32 so that the magnets 31 are orthogonal to the radial direction of the rotor core 23.

The magnets 31 are arranged so that magnetic pole surfaces located at the radially outer side of the rotor core 23 have the same polarity (south poles for example). Thus, in the rotor 21 of the present embodiment, the four magnetic pole portions 30 having the same polarities (south poles) are formed at generally equal angular intervals (90° intervals) in the circumferential direction.

The magnetic pole portions 30 include two magnetic pole portions 30a and two magnetic pole portions 30b. Two gaps 33 are formed at the two opposite sides of each magnetic pole portion 30a in its circumferential direction. Two gaps 34 are formed at the two opposite side of each magnetic pole portion 30b in the circumferential direction. The gaps 33 have a circumferential width that differs from that of the gaps 34. The gaps 33 and 34 form magnetic resistance. This forms ferric core portions 35, which are magnetically partitioned from the magnetic pole portions 30, between the magnetic pole portions 30 in the circumferential direction.

More specifically, the magnetic flux of the magnetic pole portions 30 enters the ferric core portions 35 through the interior of the rotor core 23 bypassing the gaps 33 and 34 formed at the two circumferential sides of each magnetic pole portion 30. Since the magnetic flux passes through the ferric core portion 35 and is directed outward in the radial direction, a pseudo-magnetic pole having a polarity differing from that of the adjacent magnetic pole portion 30 is formed in each ferric core portion 35. In this manner, the rotor 21 of the present embodiment is a so-called consequent pole type rotor.

As shown in FIGS. 2 and 3, the ferric core portions 35 of the rotor core 23 includes first ferric core portions 35a and second ferric core portions 35b. The gaps 33 and 34 at the two circumferential sides of each ferric core portion have different circumferential widths so that each first ferric core portion 35a is inclined at a first circumferential side and each second ferric core portion 35b is inclined at a second circumferential side, which is opposite to the first circumferential side.

In the first ferric core portion 35a, the gap 34 is located at the second circumferential side (in clockwise direction of FIG. 2), the gap 33 is located at the first circumferential side (in counterclockwise direction of FIG. 2), and the first ferric core portion 35a is inclined toward the first circumferential side (counterclockwise direction in FIG. 2). In the second ferric core portion 35b, the gap 34 is located at the first circumferential side (counterclockwise direction in FIG. 2). The gap 33 having a smaller circumferential width than the gap 34 is located at the second circumferential side (clockwise direction in FIG. 2), and the second ferric core portion 35b is inclined toward the second circumferential side (clockwise direction in FIG. 2). That is, the first ferric core portion 35a and the second ferric core portion 35b are formed to have symmetric shapes obtained by reversing the ferric core portions 35a and 35b at a circumferentially median point between the ferric core portions 35a and 35b. In other words, by reversing the positional relationship of adjacent gaps 33 and 34 that are adjacent to a first ferric core portion 35a in the circumferential direction, the shape of the first ferric core portion 35a becomes identical to the shape of the second ferric core portion 35b. In the circumferential direction of the rotor core 23, the total width of the gaps 33 and 34 at the first circumferential side is set to be equal to the total width of the gaps 33 and 34 at the second circumferential side.

The rotor core 23 is formed so that the first ferric core portions 35a having identical shapes are arranged at opposite sides separated by 180° in the circumferential direction and the second ferric core portions 35b having identical shapes are arranged at opposite sides separated by 180° in the circumferential direction.

The operation of the present embodiment will now be described.

Figure 4:
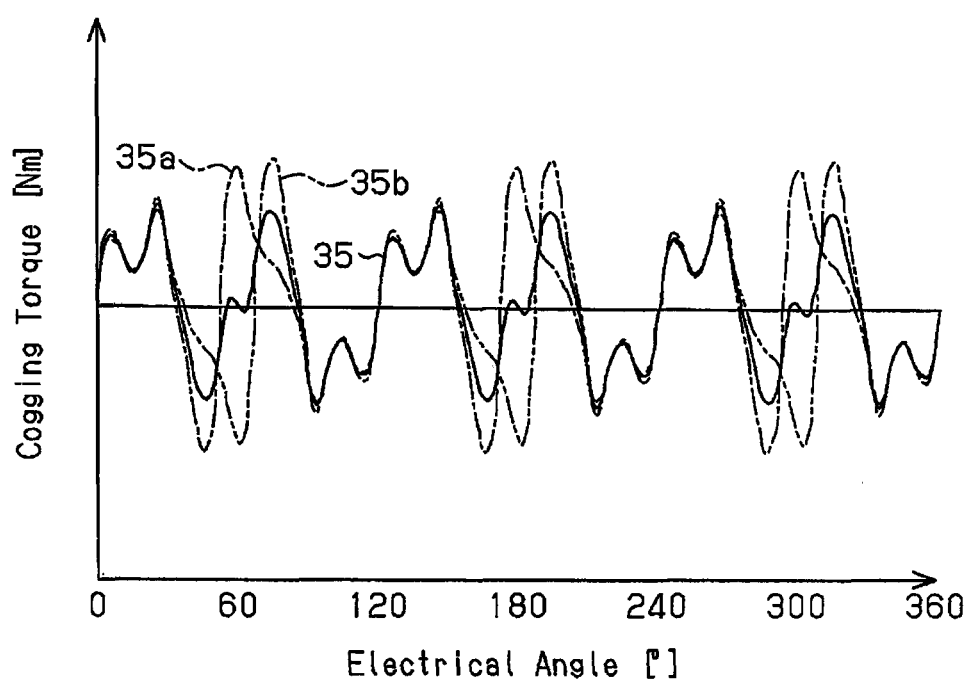
FIG. 4 is a graph of the relationship between an electrical angle and cogging torque.
Figure 5:
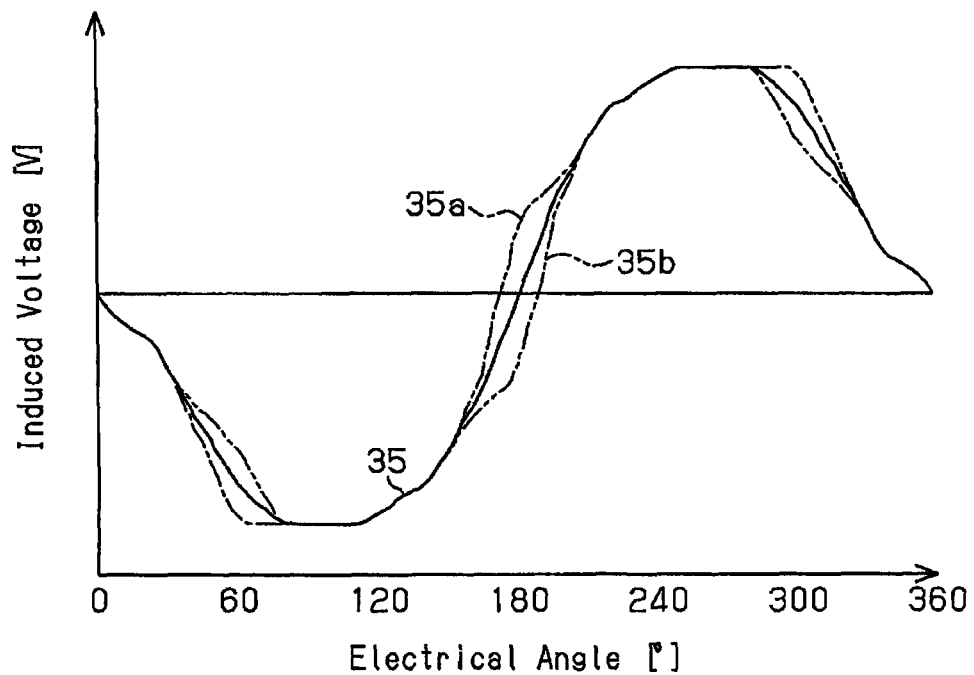
FIG. 5 is a graph of the relationship between the electrical angle and induced voltage.

When current is supplied to the winding 13 of the stator 11, the motor 10 of the present embodiment generates a rotating magnetic field that rotates the rotor 21. This rotates the rotor 21. Here, the rotor core 23 of the rotor 21 includes the first ferric core portions 35a, which are inclined toward the first circumferential side, and the second ferric core portions 35b, which are inclined toward the opposite circumferential side (second circumferential side). This separates the peak values of the cogging torques generated by the ferric core portions 35a and 35b as shown in FIG. 4 while reducing the components of the cogging torque generated by conventional ferric core portions. Thus, the cogging torques generated by the ferric core portions 35a and 35b cancel out each other and obtains induced voltage as shown in FIG. 5. Although the induced voltage varies in the electrical angle range of 360° due to influence of the ferric core portions 35a and 35b, the combination of the ferric core portions 35a and 35b evens the switching pitch. This allows for the rotor 21 to rotate in two directions. Further, the feasibility and stability of sensorless driving (e.g., position detection using induced voltage) are enhanced.

The advantages of the present embodiment will now be described.

(1) The ferric core portions 35 include the first ferric core portions 35a, which are inclined toward the first circumferential side, and the second ferric core portions 35b, which are inclined toward the second circumferential side. This reduces the components of the cogging torque generated by the conventional ferric core portions, and the cogging torques generated by the ferric core portions 35a and 35b, which have different shapes, cancel out each other thereby further suppressing cogging torque. Although the induced voltage varies in the electrical angle range of 360° due to influence of the ferric core portions 35a and 35b, the combination of the ferric core portions 35a and 35b evens the switching pitch. This allows for the rotor 21 to rotate in two directions. Further, the feasibility and stability of sensorless driving (e.g., position detection using induced voltage) are enhanced.

(2) The rotor core 23 is formed by stacking the plurality of core sheets 24, which have identical shapes. Since there is no need to use core sheets of different shapes, there are not many different types of parts. This reduces the number of steps when forming the core sheets through pressing.

(3) The first ferric core portions 35a, which have identical shapes are located at opposite sides and separated from each other by 180° in the circumferential direction. The second ferric core portions 35b, which have identical shapes are located at opposite sides and separated from each other by 180° in the circumferential direction. This balances the weight and allows for smooth rotation of the rotor 21.

Second Embodiment

A second embodiment of the present invention will now be described with reference to the drawings.

In the second embodiment, the shapes of the gaps and ferric core portions differ from those of the first embodiment. Like or same reference numerals are given to those components that are the same as the corresponding components of the first embodiment. Such components will not be described in detail.

Figure 19:
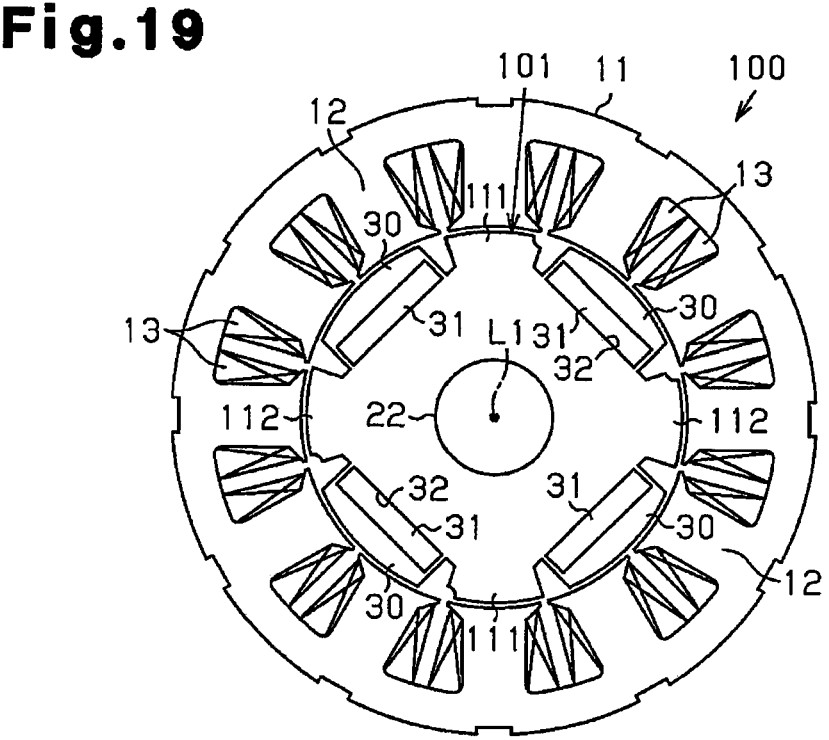
FIG. 19 is a schematic plan view showing a motor according to a second embodiment.

As shown in FIG. 19, a motor 100 of the present embodiment includes a stator 11 and a rotor 101, which is rotatably supported in the stator 11.

Figure 20:
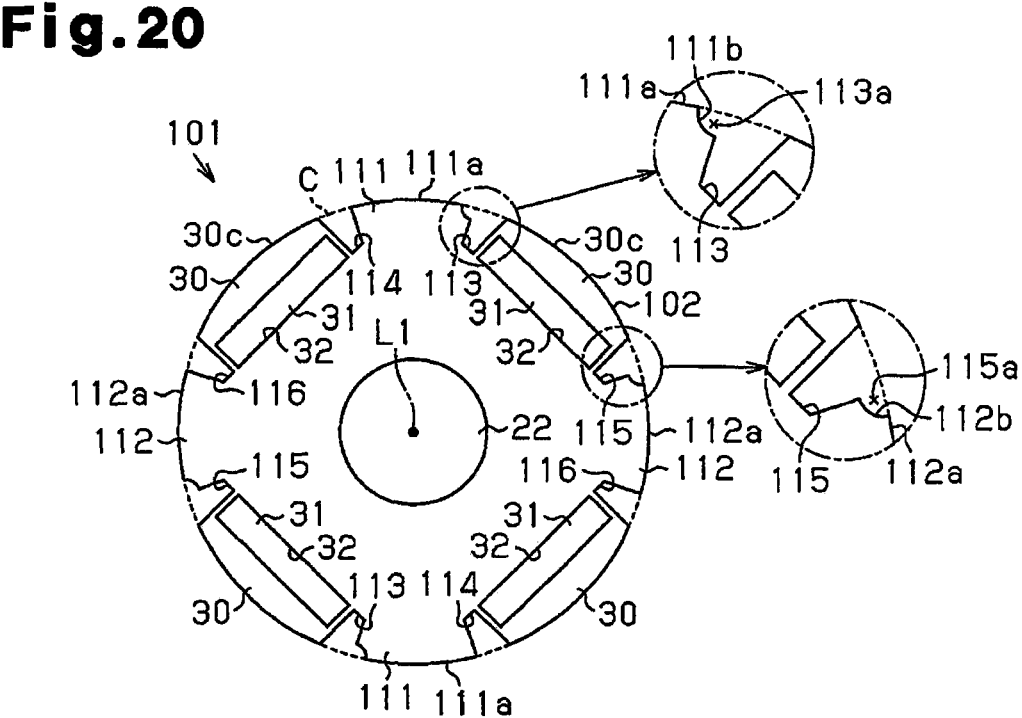
FIG. 20 is a plan view showing a rotor of FIG. 19.

As shown in FIGS. 19 and 20, a rotor core 102 of the rotor 101 includes magnetic pole portions 30, each formed by accommodating a magnet 31 in a magnet receptacle 32, and first and second ferric core portions 111 and 112, which project in the radial direction and which are arranged between the magnetic pole portions 30.

As shown in FIG. 20, the rotor core 102 includes two first ferric core portions 111 located at positions separated from each other by 180° in the circumferential direction. Each first ferric core portion 111 includes first and second outer surfaces 111a and 111b, which are continuous with each other in the circumferential direction.

As shown in FIG. 20, the first outer surface 111a of the first ferric core portion 111 is located on a circle C, which extends along an outer surface 30c of the magnetic pole portion 30 as viewed from the axial direction.

As shown in FIG. 20, the second outer surface 111b of the first ferric core portion 111 is curved inward in the radial direction to be concave and has a smaller circumferential width than the first outer surface 111a. The second outer surface 111b is located inward in the radial direction from the circle C, which is overlapped with the first outer surface 111a as viewed from the axial direction. Thus, a gap 113 at the second circumferential side (clockwise direction in FIG. 20) of each first ferric core portion 111 includes a gap extension 113a, which extends to the second outer surface 111b in the circumferential direction. Thus, the gap 113 differs in shape from a gap 114 located at the first circumferential side (counterclockwise direction in FIG. 20) of each first ferric core portion 111. As a result, the gaps 113 have a larger width in the circumferential direction of the rotor core 102 than the gaps 114. Further, the first ferric core portions 111, which are poles separated in the circumferential direction are rotationally symmetric.

As shown in FIG. 20, the two second ferric core portions 112 are arranged at positions separated from the first ferric core portions 111 by 90° in the circumferential direction. The two second ferric core portions 112 are formed at positions separated from each other by 180° in the circumferential direction. Each second ferric core portion 112 includes first and second outer surfaces 112a and 112b, which are continuous with each other in the circumferential direction.

The first outer surface 112a of the second ferric core portion 112 is located on the circle C as viewed from the axial direction.

The second outer surface 112b of the second ferric core portion 112 is located at the first circumferential side of the first outer surface 112a and is curved inward in the radial direction to be concave. The second outer surface 112b of the second ferric core portion 112 as viewed from the first outer surface 112a is formed at the opposite side in the circumferential direction of the second outer surface 111b of the first ferric core portion 111 as viewed from the first outer surface 111a.

As shown in FIG. 20, the second outer surface 112b has a smaller circumferential width than the first outer surface 112a. The second outer surface 112b is located inward in the radial direction from the circle C, which is overlapped with the first outer surface 112a as viewed from the axial direction. Thus, a gap 115 at the first circumferential side (counterclockwise direction in FIG. 20) of each second ferric core portion 112 includes a gap extension 115a, which extends to the second outer surface 112b in the circumferential direction. Thus, the gap 115 differs in shape from a gap 116 located at the second circumferential side (clockwise direction in FIG. 20) of each second ferric core portion 112. As a result, the gaps 115 have a larger width in the circumferential direction of the rotor core 102 than the gaps 116. The second ferric core portion 112 is rotationally asymmetrical to the first ferric core portion 111 that is the pole separated from the second ferric core portion 112 by 90° (360/number of poles) in the circumferential direction. The second ferric core portions 112 that are poles separated from each other in the circumferential direction by 180° are rotationally symmetrical to each other.

The operation of the present embodiment will now be described.

Figure 21:
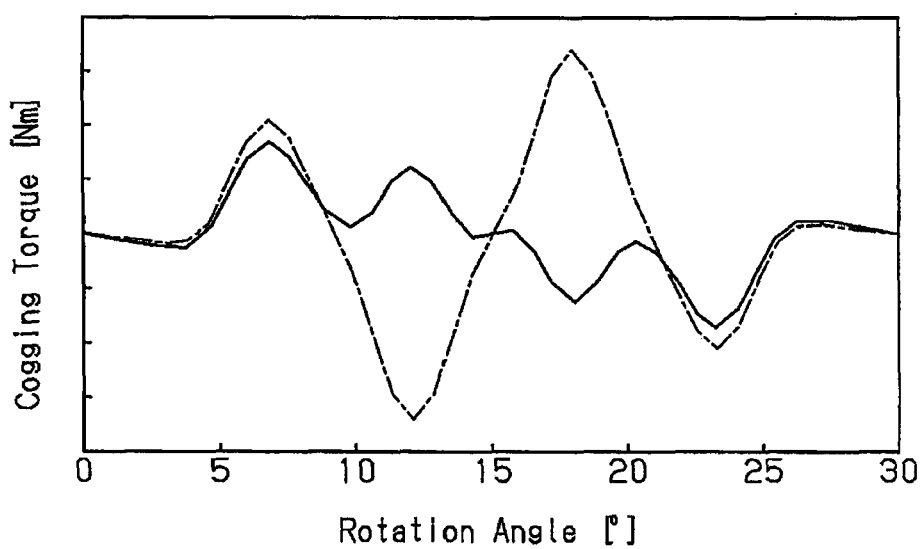
FIG. 21 is a graph of the cogging torque in the rotor shown in FIG. 19.
Figure 22:
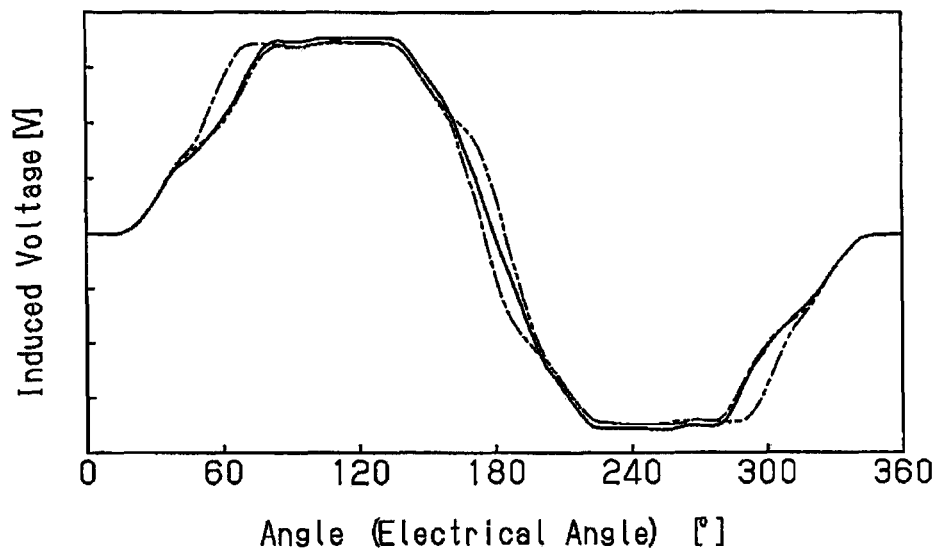
FIG. 22 is a graph of the induced voltage in the rotor shown in FIG. 19.

When current is supplied to the winding 13 of the stator 11, the motor 10 of the present embodiment generates a rotating magnetic field that rotates the rotor 101. This rotates the rotor 101. The rotor 101 (rotor core 102) includes the first ferric core portions 111 and the second ferric core portions 112. Each first ferric core portion 111 is located between the gap 114 at the first circumferential side and the gap 113 at the second circumferential side. The gap 113 has a larger circumferential width than the gap 114. Each second ferric core portion 112 is located between the gap 116 at the second circumferential side and the gap 115 at the first circumferential side. The gap 115 has a larger circumferential width than the gap 116. The first ferric core portion 111 and the second ferric core portion 112, which include the gap extensions 113a and 115a in the adjacent gaps 113 and 115, are laterally asymmetric to each other with respect to the centers of the ferric core portions 111 and 112 in the circumferential direction. Thus, cogging torque can be suppressed as shown in FIG. 21. The first ferric core portion 111 and the second ferric core portion 112 that are separated from each other in the circumferential direction by 90° are line symmetric to each other with respect to a center between the first ferric core portion 111 and the second ferric core portion 112. As shown in FIG. 22, this evens the induced voltage pitch (switching pitch). In this structure, the rotor 101 can rotate in two directions. Further, the ferric core portions 111 and 112 that are rotationally symmetric to each other are formed on the rotor core 102 at positions separated from each other by 180°. This suppresses the application of a biased load to the rotor core 102 (rotor 101).

In addition to advantages (1) to (3) of the first embodiment, the second embodiment has the following advantage.

(4) The first gap includes the gap extension that extends to the outer surface of the ferric core portion or the magnetic pole portion, and the second gap has a smaller circumferential width than the first gap. Thus, the circumferential width of the first gap can be adjusted by adjusting the size of the gap extension, which extends to the outer surface, when the rotor is in an assembled state. This allows for further accurate adjustment of the magnetic balance and suppresses cogging torque.

Third Embodiment

A third embodiment of the present invention will now be described with reference to the drawings.

In the third embodiment, the shapes of gaps and magnetic pole portions differ from the first embodiment. The differences will be described in detail. Like or same reference numerals are given to those components that are the same as the corresponding components of the first and second embodiments. Such components will not be described in detail.

Figure 23:
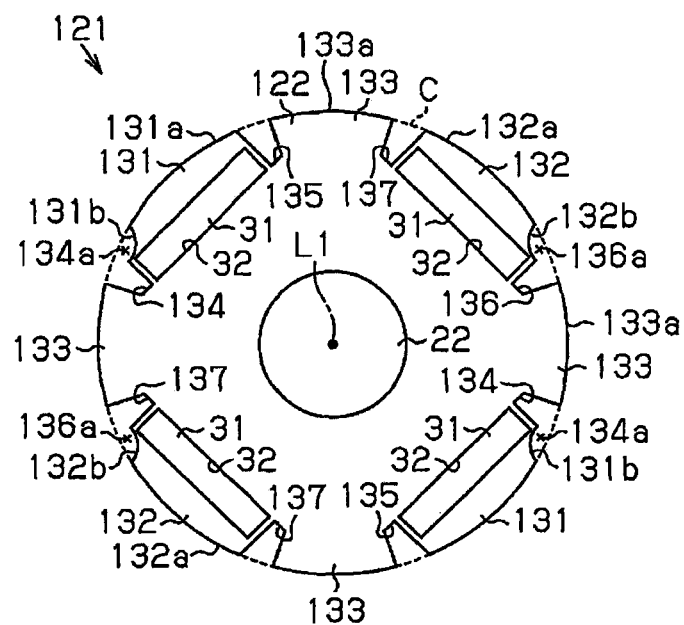
FIG. 23 is a plan view showing a rotor according to a third embodiment.

As shown in FIG. 23, a rotor core 122 of a rotor 121 includes first and second magnetic pole portions 131 and 132, which are formed by accommodating magnets 31 in magnet receptacles 32, and ferric core portions 133, which project in a radial direction of the rotor core 122. The ferric core portions 133 are arranged between the magnetic pole portions 131 and 132 and each include an outer surface 133a, which is arc-shape as viewed from an axial direction of the rotor core 122.

As shown in FIG. 23, the rotor core 122 includes two first magnetic pole portions 131 formed at positions separated from each other by 180° in a circumferential direction of the rotor core 122. Each first magnetic pole portion 131 includes first and second outer surfaces 131a and 131b, which are continuous with each other in the circumferential direction.

The first outer surface 131a of the first magnetic pole portion 131 is located on a circle C extending along the outer surface 133a of the ferric core portion 133 as viewed from the axial direction.

As shown in FIG. 23, the second outer surface 131b of each first magnetic pole portion 131 is curved inward in the radial direction to be concave and has a smaller circumferential width than the first outer surface 131a. The second outer surface 131b is located inward in the radial direction from the circle C, which is overlapped with the first outer surface 131a as viewed from the axial direction. A gap 134 at the first circumferential side (counterclockwise direction in FIG. 23) of the first magnetic pole portion 131 extends in the circumferential direction to the second outer surface 131b and includes a gap extension 134a. Thus, the gap 134 differs in shape from a gap 135 at the second circumferential side (clockwise direction in FIG. 23) of the first magnetic pole portion 131. As a result, the gap 134 has a larger width in the circumferential direction of the rotor core 122 than the gap 135. The first magnetic pole portions 131 that are poles separated from each other in the circumferential direction are rotationally symmetric to each other.

As shown in FIG. 23, the second magnetic pole portions 132 are arranged at positions separated from the first magnetic pole portions 131 in the circumferential direction by 90°, and the second magnetic pole portions 132 are formed at positions separated from each other in the circumferential direction by 180°. Each second magnetic pole portion 132 includes first and second outer surfaces 132a and 132b, which are continuous with each other in the circumferential direction.

The first outer surface 132a of the second magnetic pole portion 132 is located along the circle C as viewed from the axial direction.

The second outer surface 132b of the second magnetic pole portion 132 is located at the second circumferential side of the first outer surface 132a and is curved inward in the radial direction to be concave. The second outer surface 132b of the second magnetic pole portion 132 as viewed from the first outer surface 132a is located at an opposite side in the circumferential direction of the second outer surface 131b of the first magnetic pole portion 131 as viewed from the first outer surface 131a.

As shown in FIG. 23, the second outer surface 132b has a smaller circumferential width than the first outer surface 132a. The second outer surface 132b is located inward in the radial direction from the circle C, which is overlapped with the first outer surface 132a as viewed from the axial direction. In this structure, a gap 136 at the second circumferential side (clockwise direction in FIG. 23) of the second magnetic pole portion 132 extends to the second outer surfaces 132b in the circumferential direction and includes a gap extension 136a. The gap 136 differs in shape from a gap 137 located at the first circumferential side (counterclockwise direction in FIG. 23) of the second magnetic pole portion 132. Thus, the gap 136 has a larger width in the circumferential direction of the rotor core 122 than the gap 137. The second magnetic pole portion 132 is rotationally asymmetrical to the first magnetic pole portion 131, which is a pole separated from the second magnetic pole portion 132 by 90° (360/number of poles) in the circumferential direction. The second magnetic pole portions 132, which are poles separated from each other in the circumferential direction by 180°, are rotationally symmetrical to each other.

The present embodiment has the same advantage as advantage (4) of the second embodiment.

Each embodiment of the present invention may be modified as described below.

In the first embodiment, the magnetic pole surface located at the radially outer side of the rotor core 23 is a south pole due to the magnet 31. However, the magnetic pole surface may have the opposite polarity, that is, a north pole.

Although the first ferric core portions 35*a* and the second ferric core portion 35*b* are arranged alternately in the circumferential direction of the rotor core 23 in the first embodiment, the invention is not limited to this structure.

Figure 6:
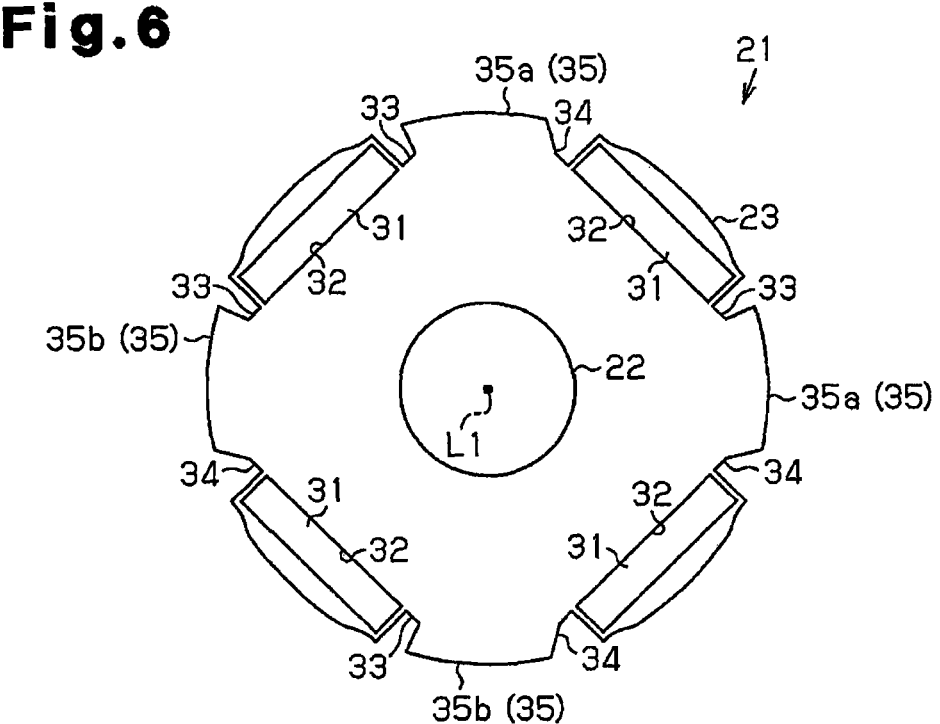
FIG. 6 is a plan view showing a rotor in another example.

As shown in FIG. 6, for example, a plurality of (two in FIG. 6) first ferric core portions 35*a* may be arranged consecutively and then the same number of second ferric core portion 35*b* can be arranged consecutively.

Figure 8:
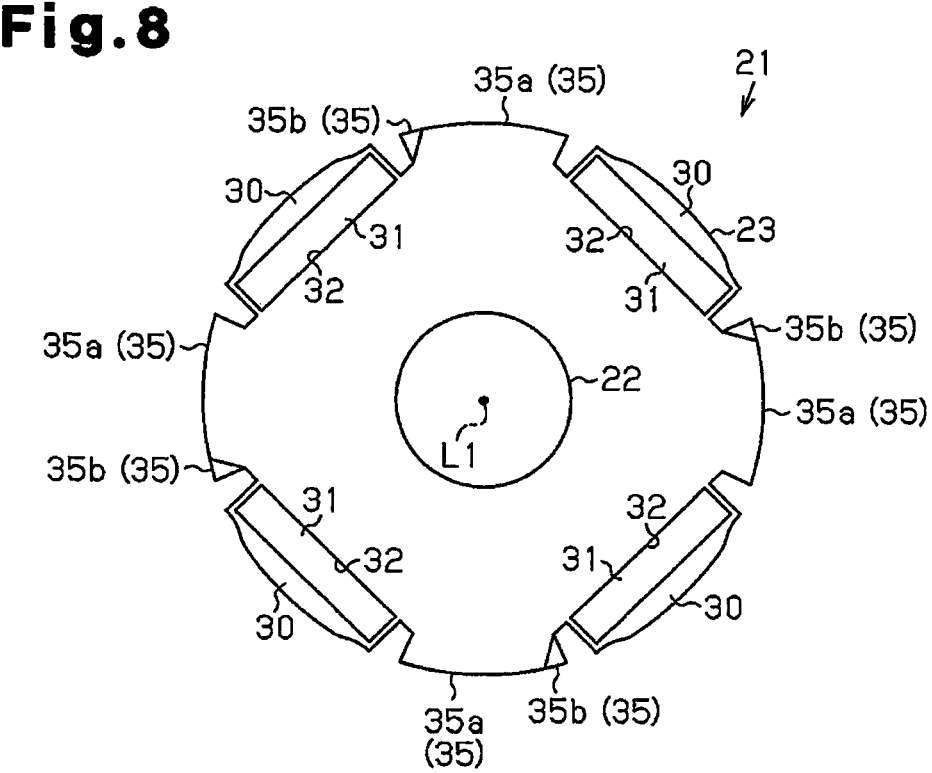
FIG. 8 is a plan view showing a rotor in another example.
Figure 9A:
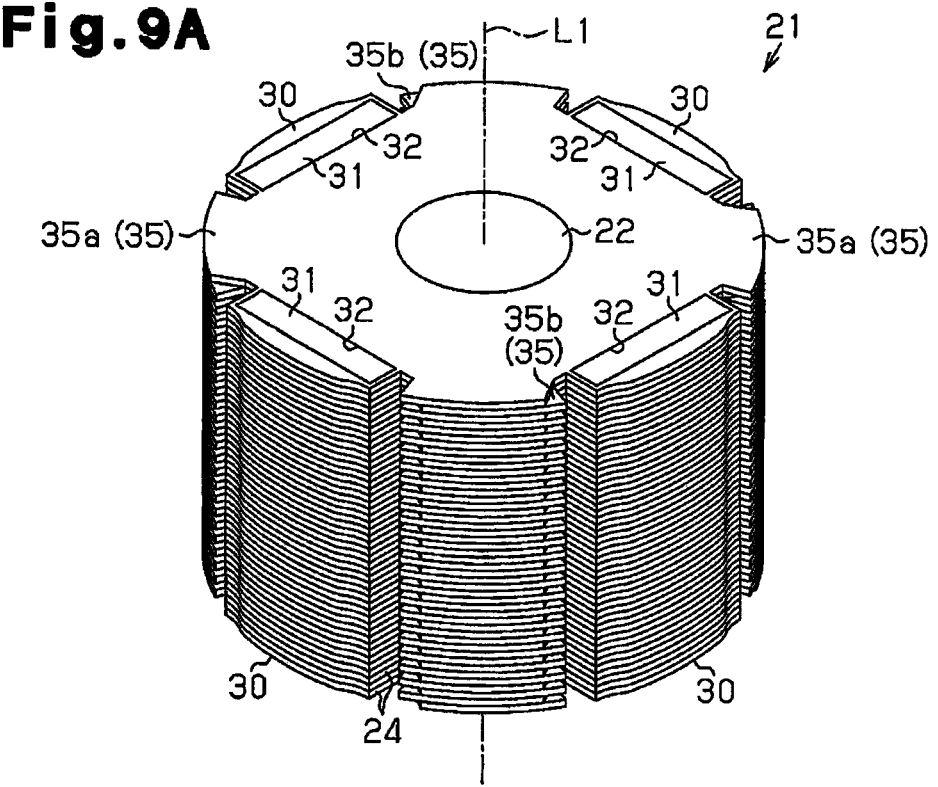
FIG. 9A is a perspective view showing a rotor in another example.
Figure 9B:
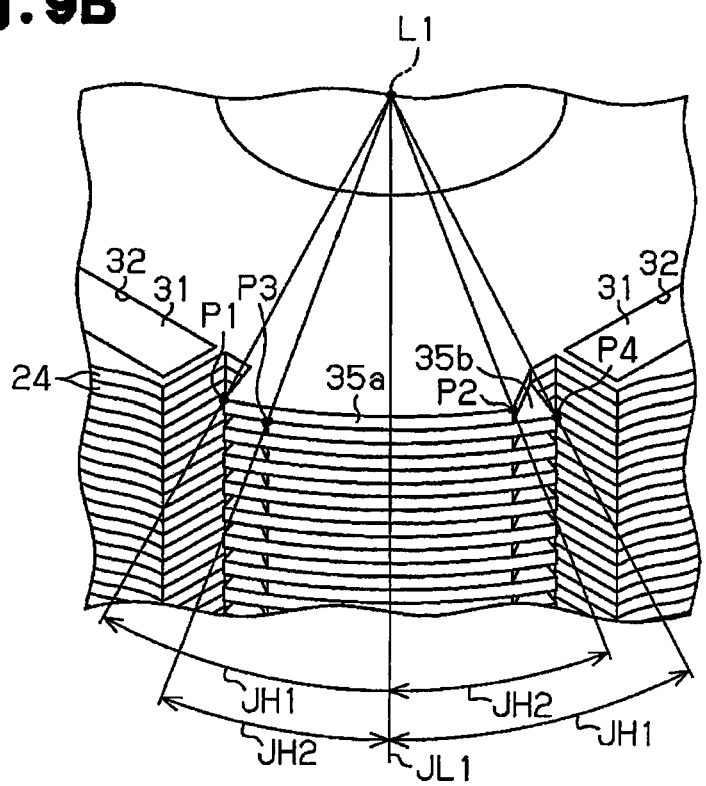
FIG. 9B is a partially enlarged view of FIG. 9A.

As shown in FIGS. 8 to 9B, the first ferric core portions 35*a* and the second ferric core portions 35*b* may be overlapped with each other in a stacking direction of the core sheet 24 (axial direction L1). It is preferable that the first ferric core portions 35*a* and the second ferric core portions 35*b* be stacked as described below.

As shown in FIG. 9B, the core sheets 24 are stacked so that the ferric core portions 35*a* and 35*b* are overlapped with one another so that the weight is balanced in the circumferential direction with respect to a straight line JL1 that extends through the center of adjacent magnets 31 and intersects with the center axis L1. The circumferential width of the first ferric core portion 35*a* from the straight line JL1 to an end P1 at the second circumferential side is indicated as JH1, and the circumferential width of the first ferric core portion 35*a* from the straight line JL1 to an end P2 at a first circumferential end P2 is indicated as JH2. The circumferential width of the second ferric core portion 35*b* from the straight line JL1 to an end P3 at the second circumferential side is indicated as JH2, and the circumferential width of the second ferric core portion 35*b* from the straight line JL1 to an end P4 at the first circumferential side is indicated as JH1. By balancing the weight in this manner, the rotor 21 can be smoothly rotated.

Figure 10A:
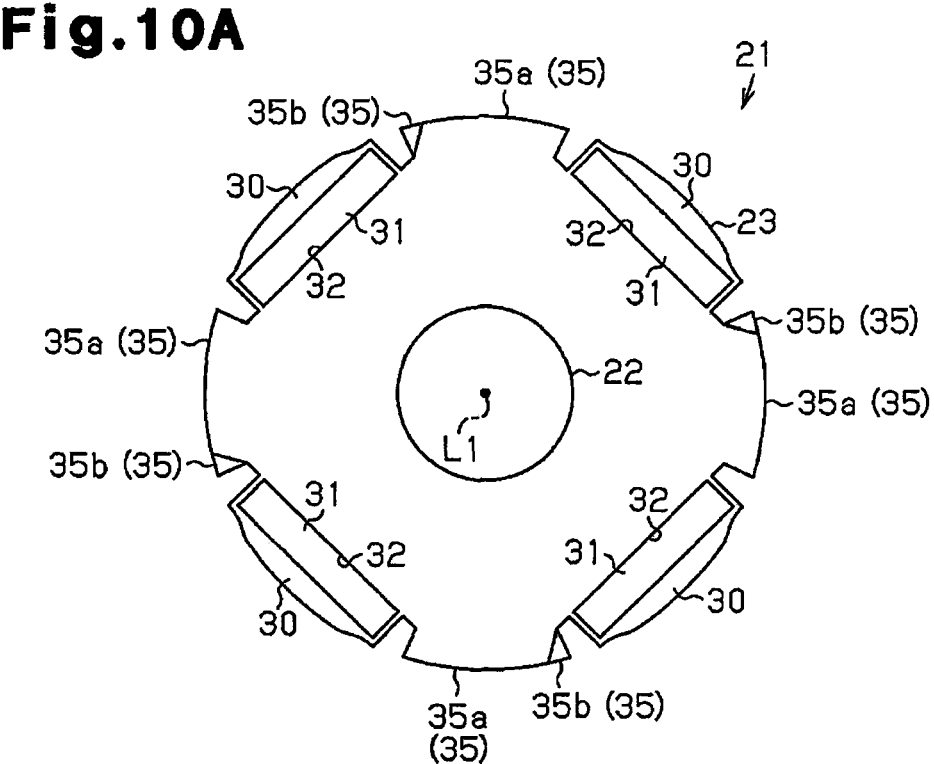
FIG. 10A is a plan view showing a rotor in another example.
Figure 10B:
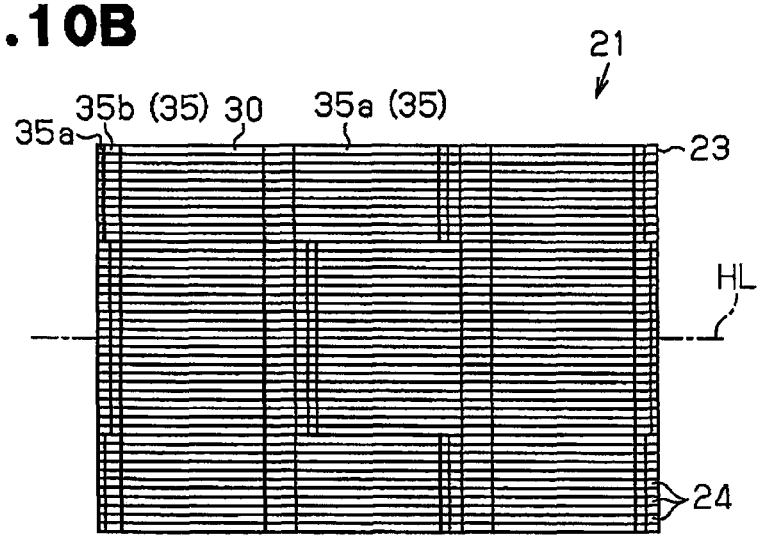
FIG. 10B is a side view of the rotor.
Figure 11:
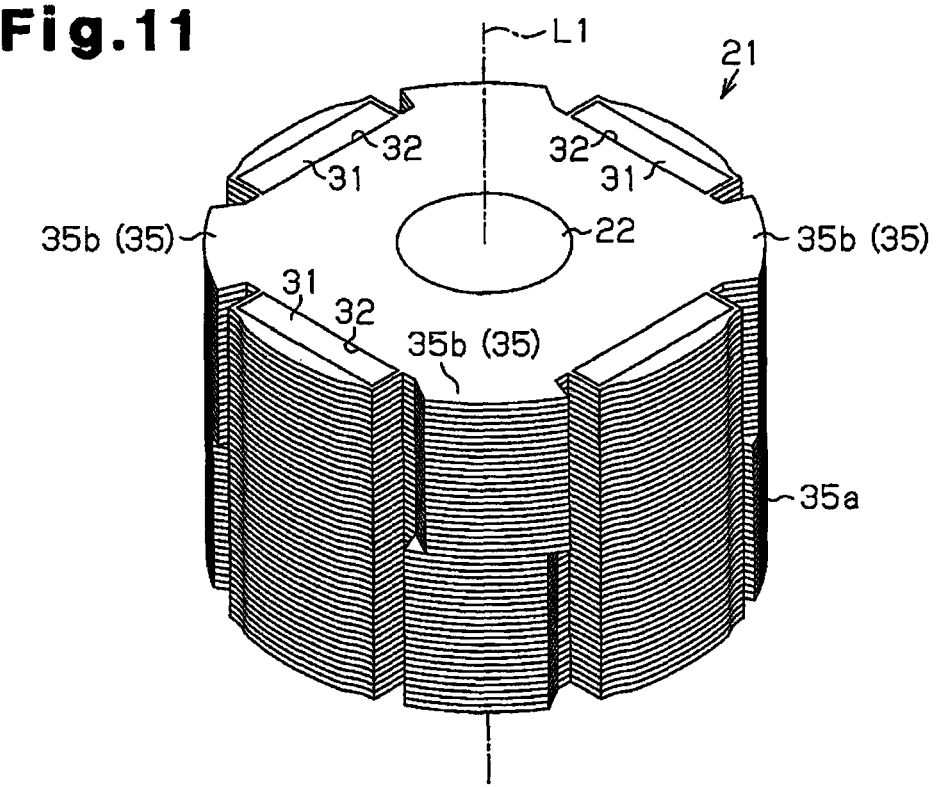
FIG. 11 is a perspective view showing a rotor in another example.

When the first ferric core portions 35*a* and the second ferric core portions 35*b* are stacked upon one another in the stacking direction in this manner, it is preferable that the same number of first and second ferric core portions 35*a* and 35*b* be stacked so that they are symmetric in the stacking direction with respect to a center of the stacking direction of the core sheets 24 in the rotor core 23. This allows the number of the first ferric core portions and the number of second ferric core portions in the stacking direction to be the same or the surface area of the first ferric core portions and the surface area of the second ferric core portions in the stacking direction to be the same. Further, the switching pitch of induced voltage can be set to an electrical angle of 180°. In this manner, the rotor can rotate in two directions, and the feasibility and stability of sensorless driving (e.g., position detection using induced voltage) are enhanced. As shown in FIG. 9, the first ferric core portions 35*a* and the second ferric core portions 35*b* may be alternately stacked in the stacking direction of the core sheets 24. Alternatively, as shown in FIGS. 10A and 10B, the first ferric core portions 35*a* may be arranged at two opposite sides in the stacking direction and the second ferric core portions 35*b* may be sandwiched in between in the stacking direction. As another option, as shown in FIG. 11, the first ferric core portions 35*a* may be stacked at one a first from the center of the core sheets 24 in the stacking direction, and the second ferric core portions 35*b* may be stacked at the opposite second side.

The same number of first ferric core portions 35*a* and second ferric core portions 35*b* are arranged in the stacking direction so that they are symmetric in the stacking direction in the above structures. However, these structures are based under the assumption that no load is applied (current is small). That is, when no load is applied (current is small), the switching pitch of induced voltage can be 180° (electrical angle) as shown in FIG. 60A. However, when the motor is operated by a rated current determined by the specification of the motor (when load is applied and the current is large) as shown in FIG. 60B, the magnetic flux generated by the ferric core portions 35*a* and 35*b* differ from the magnetic flux generated by the magnetic pole portion 30 (magnetic pole portion of magnet) (magnetic flux of magnetic pole portion 30>magnetic flux of ferric core portions 35*a* and 35*b*). This shifts the switching pitch of the induced voltage.

Figure 61:
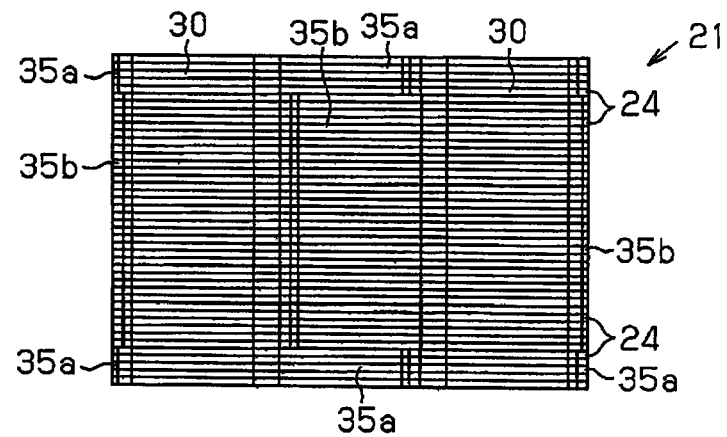
FIG. 61 is a side view showing a rotor of an IPM-type structure in another example.
Figure 62:
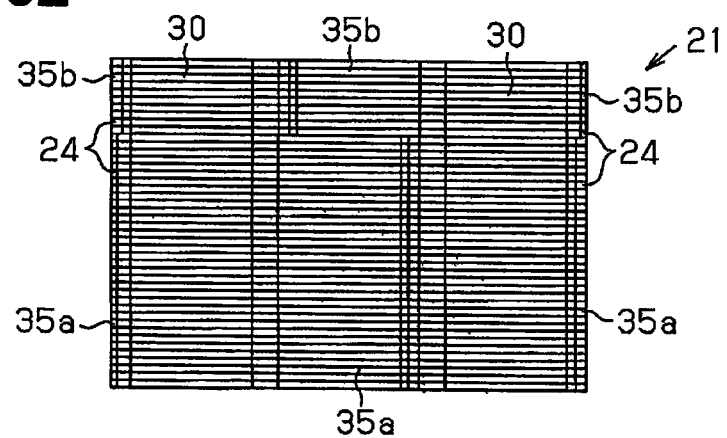
FIG. 62 is a side view showing a rotor of IPM-type structure in another example.
Figure 63:
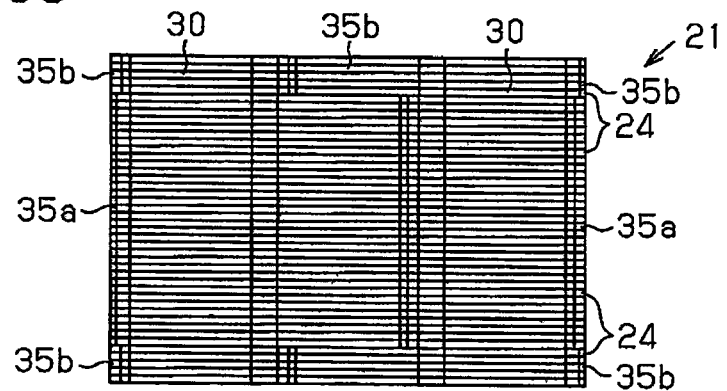
FIG. 63 is a side view showing a rotor of IPM-type structure in another example.

Taking these facts into consideration, as shown in FIG. 58, when the first ferric core portions 35*a* and the second ferric core portion 35*b* are stacked upon one another in the stacking direction, the total number of stacked core sheets 24 forming the first ferric core portions 35*a* may differ from the total number of stacked core sheets 24 forming the second ferric core portions 35*b* so that the total length in the stacking direction of the first ferric core portions 35*a* inclined toward the first circumferential side differs from the total length in the stacking direction of the second ferric core portions 35*b* inclined toward the second circumferential side. In this structure, even if the switching pitch is shifted when no load is applied as shown in FIG. 59A, when the rotor is operated under the rated current as shown in FIG. 59B, the switching pitch becomes even at the induced voltage to 180° (electrical angle). Thus, the motor can rotate in two directions, and feasibility and stability of the sensorless driving (e.g., position detection using induced voltage) are enhanced. FIGS. 58 and 61 to 63 show such stacking methods that can be employed. As shown in FIG. 58, the number of stacked core sheets 24 forming the first ferric core portions 35*a* inclined toward the first circumferential side is less than the number of stacked core sheets 24 forming the second ferric core portions 35*b* inclined toward the second circumferential side. The core sheets 24 forming the first ferric core portions 35*a* are arranged at the first side in the stacking direction (axial direction), and the core sheets 24 forming the second ferric core portions 35*b* are arranged at the second side in the stacking direction. As shown in FIG. 61, the number of stacked core sheets 24 forming the first ferric core portions 35*a* inclined toward the first circumferential side is less than the number of stacked core sheets 24 forming the second ferric core portion 35*b* inclined toward the second circumferential side. The core sheets 24 forming the first ferric core portions 35*a* sandwich, in the axial direction, the core sheets 24 forming the second ferric core portions 35*b*. As shown in FIG. 62, the number of stacked core sheets 24 forming the first ferric core portions 35*a* inclined toward the first circumferential side is greater than the number of stacked core sheets 24 forming the second ferric core portions 35*b* inclined toward the second circumferential side. The core sheets 24 forming the first ferric core portions 35*a* are arranged at the first side in the stacking direction (axial direction), and the core sheets 24 forming the second ferric core portions 35*b* are arranged at the second side in the stacking direction. As shown in FIG. 63, the number of stacked core sheets 24 forming the first ferric core portions 35*a* inclined toward the first circumferential side is greater than the number of stacked core sheets 24 forming the second ferric core portions 35*b* inclined toward the second circumferential side, and the core sheets 24 forming the second ferric core portions 35*b* sandwich, in the axial direction, the core sheets 24 forming the first ferric core portions 35*a*.

Figure 7:
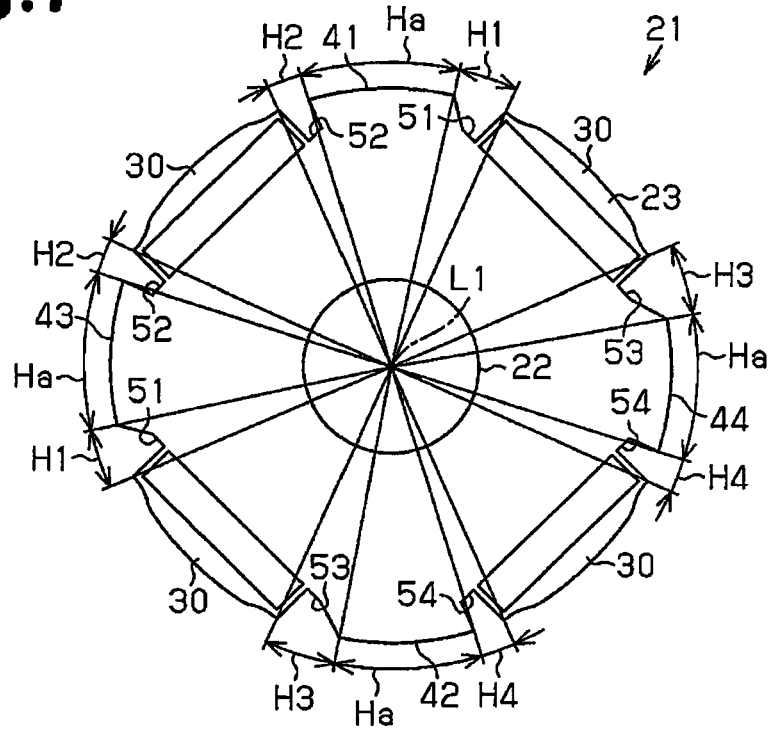
FIG. 7 is a plan view showing a rotor in another example.

Although not particularly mentioned in the first embodiment, for example, the circumferential widths of the gaps 33 and 34 formed at the two circumferential sides of the first ferric core portion 35*a* may be the same, and the circumferential widths of the gaps 33 and 34 formed at the two circumferential sides of the second ferric core portion 35*b* may be the same. Further, a structure in which the circumferential widths are different may be employed. For example, first ferric core portions inclined in the same direction and having different shapes and second ferric core portions inclined in the opposite direction and having different shapes may be used. As shown in FIG. 7, for example, the rotor core 23 of the rotor 21 may include first ferric core portions 41 and 42 inclined toward the first circumferential side and having different shapes, and second ferric core portions 43 and 44 inclining toward the opposite side (second circumferential side) and having different shapes. Here, the first ferric core portion 41 includes a gap 51 having a circumferential width H1 at the second circumferential side (clockwise direction in FIG. 7) and a gap 52 having a circumferential width H2 at the first circumferential side (counterclockwise direction in FIG. 7). The other first ferric core portion 42 include a gap 53 having a circumferential width H3 at the second circumferential side (clockwise direction in FIG. 7) and a gap 54 having a circumferential width H4 at the first circumferential side (counterclockwise direction in FIG. 7). The first ferric core portions 41 and 42 are formed so that circumferential widths of the gaps 51 and 53 at the second circumferential side satisfy H1<H3, and circumferential widths of the gaps 52 and 54 at the first circumferential side satisfy H2<H4. Circumferential widths of the ferric core portions 41 and 42 are both indicated by Ha and are the same. The second ferric core portion 43 includes a gap 52 having a circumferential width H2 at the second circumferential side (clockwise direction in FIG. 7) and a gap 51 each having a circumferential width H1 at the first circumferential side (counterclockwise direction in FIG. 7). That is, the second ferric core portion 43 is formed by reversing the first ferric core portion 41. The other second ferric core portion 44 includes a gap 54 having a circumferential width H4 at the second circumferential side (clockwise direction in FIG. 7) and a gap 53 having a circumferential width H3 at the first circumferential side (counterclockwise direction in FIG. 7). That is, the second ferric core portion 44 is formed by reversing the first ferric core portion 42. Circumferential widths of the ferric core portions 43 and 44 are both indicated by Ha and are the same.

Even when the first ferric core portions 41 and 42 and the second ferric core portions 43 and 44 have different shapes, the number of the second ferric core portions 43 and 44 formed by reversing the first ferric core portions 41 and 42 is the same as the number of the first ferric core portions 41 and 42. This obtains advantage (1) of the above embodiment.

In the first embodiment, the first ferric core portions 35*a* located at opposite sides and separated by 180° have identical shapes that are inclined toward the first circumferential side, and the second ferric core portions 35*b* located at opposite sides and separated by 180° have identical shapes that are inclined toward the second circumferential side. However, the present invention is not limited in such a manner.

Figure 14:
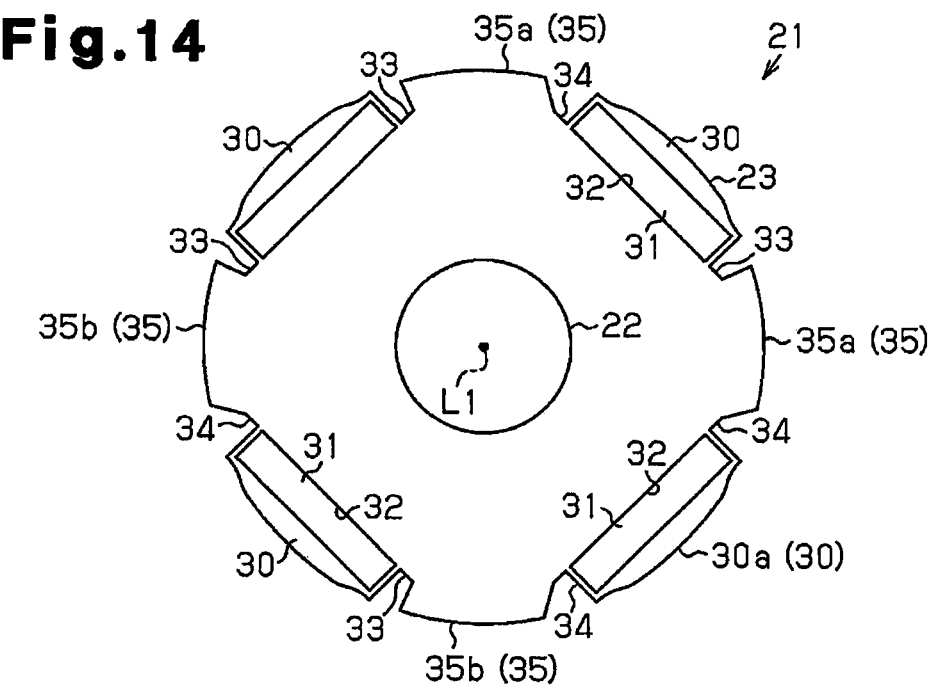
FIG. 14 is a plan view showing a rotor of another example.
Figure 15:
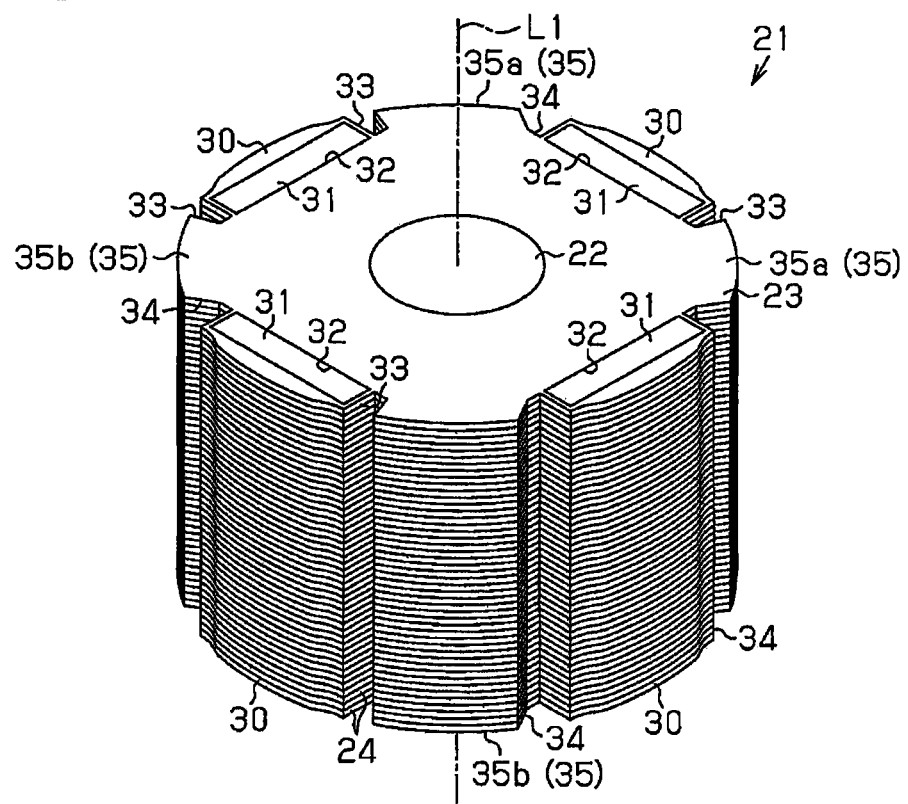
FIG. 15 is a perspective view showing a rotor of another example.

For example, as shown in FIG. 14, a second ferric core portion 35*b* shaped differently from the first ferric core portion 35*a* and inclined toward the second circumferential side is formed on the opposite side of the first ferric core portion 35*a* and separated by 180° in the circumferential direction. When the same number of ferric core portions 35*a* and 35*b* (two each in FIG. 14) are provided, and the ferric core portions are generally arranged at 90° intervals in the circumferential direction, the rotor core 23 of the rotor 21 is formed so that first ferric core portions 35*a* are first consecutively arranged in the circumferential direction and then the second ferric core portions 35*b* are consecutively arranged. The rotor core 23 is formed by stacking core sheets 24 having the same shapes as shown in FIG. 15.

Figure 16:
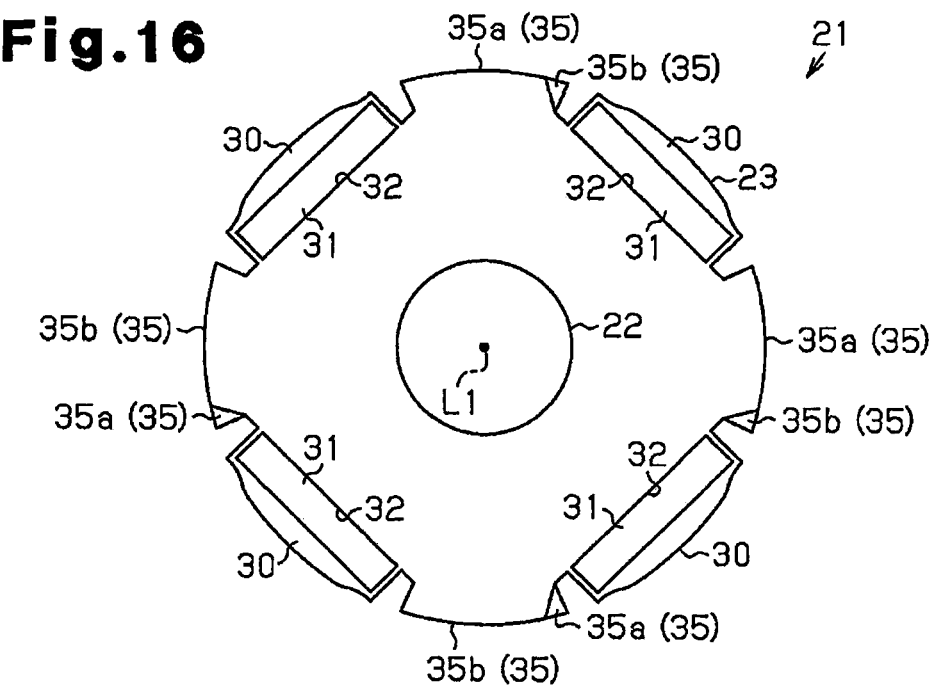
FIG. 16 is a plan view showing a rotor of another example.
Figure 17:
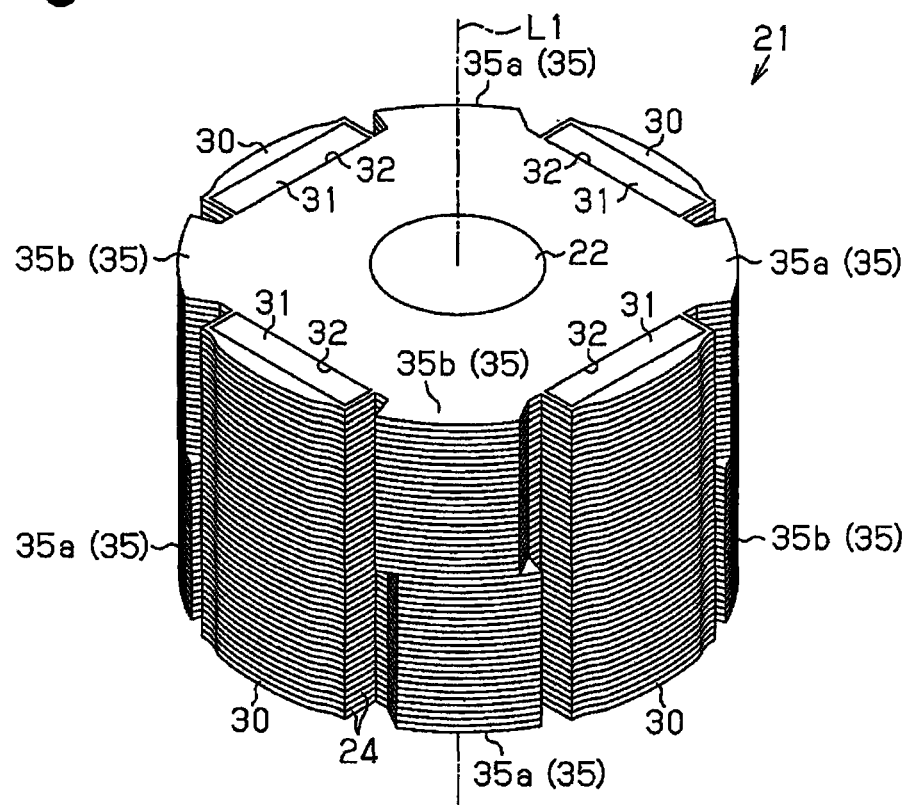
FIG. 17 is a perspective view showing a rotor of another example.

When second ferric core portions 35*b*, which are inclined toward the second circumferential side, and the first ferric core portions 35*a* are formed with different shapes on opposite sides and separated by 180° in the circumferential direction, as shown in FIGS. 16 and 17, the rotor core 23 may be formed by overlapping the first and second ferric core portions 35*a* and 35*b* in the axial direction when the core sheets 24 are stacked upon one another. When viewing the ferric core portions 35*a* and 35*b* in the axial direction, the first ferric core portions 35*a* are stacked on the first side of the center of the core sheet 24 in the stacking direction, and the second ferric core portions 35*b* are stacked on the second side.

Figure 18:
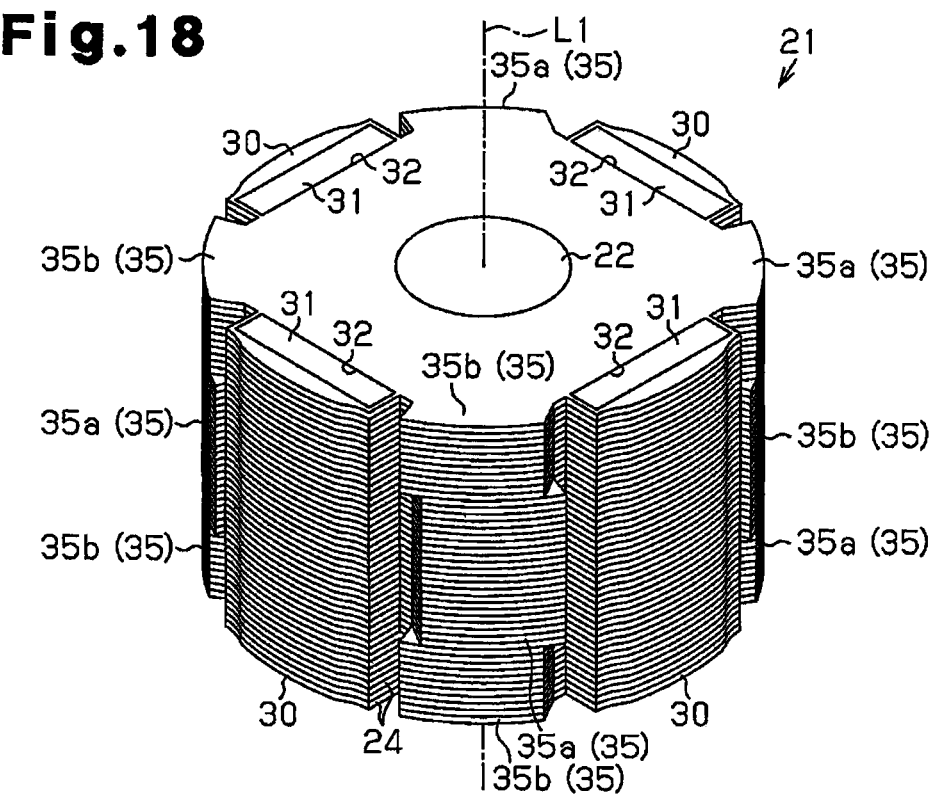
FIG. 18 is a perspective view showing a rotor of another example.

Alternatively, as shown in FIG. 18, one of the ferric core portions 35*a* and 35*b* may be arranged at the two sides in the stacking direction to sandwich the other one of the ferric core portions in the stacking direction.

Figure 12:
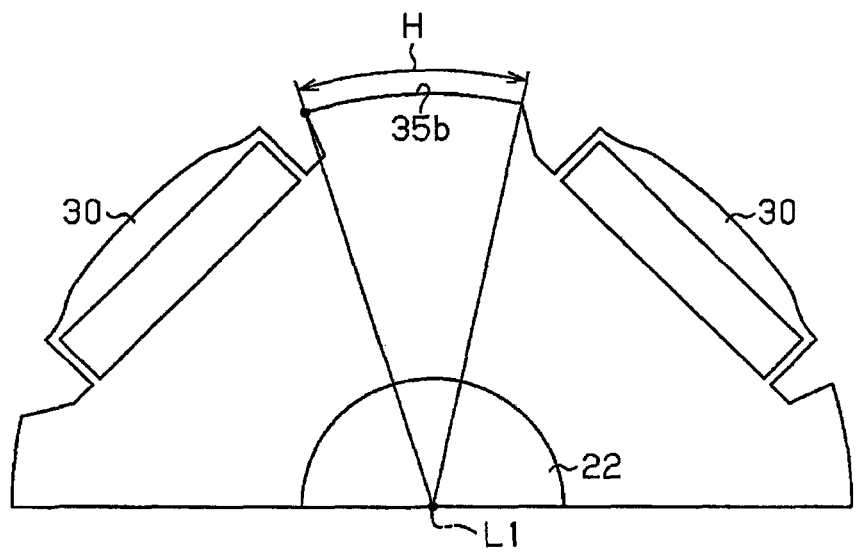
FIG. 12 is a diagram showing an inclination angle of a ferric core portion in a rotor of another example.
Figure 13A:
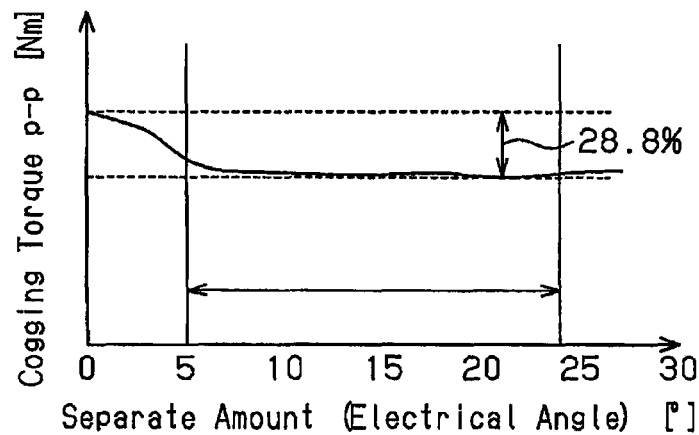
FIG. 13A is a graph of the relationship between the cogging torque and inclination angle of a ferric core portion in a rotor of another example.
Figure 13B:
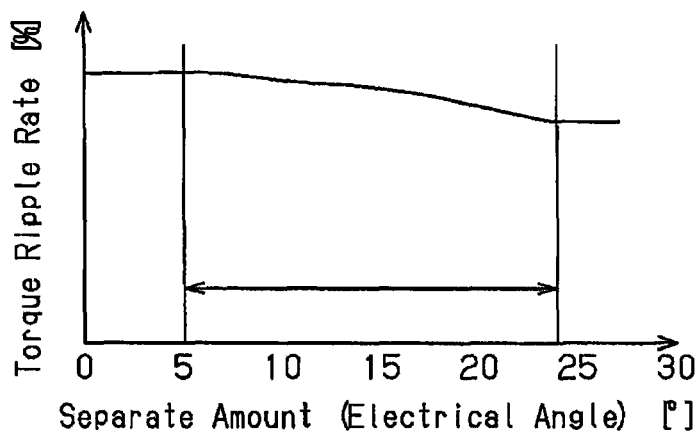
FIG. 13B is a graph of the relationship between the torque ripple and inclination angle of a ferric core portion in a rotor of another example.
Figure 13C:
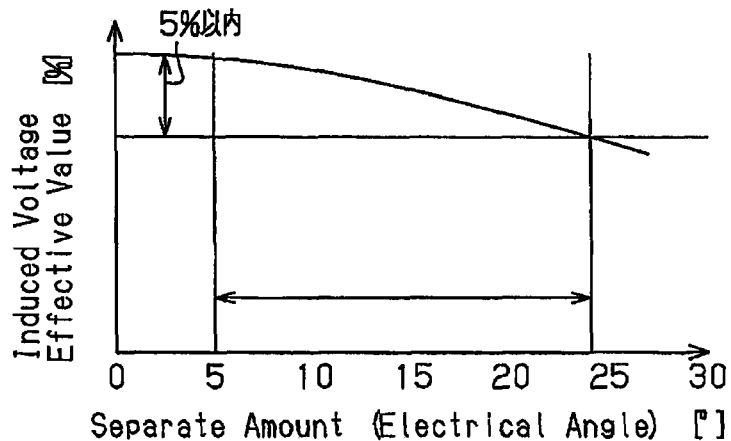
FIG. 13C is a graph of the relationship between induced voltage and an inclination angle of a ferric core portion in a rotor of another example.

Although not particularly mentioned in the above embodiments, for example, as shown in FIG. 12, it is preferable that the circumferential width H of the outer surface of the second ferric core portion 35*b* be set in the electrical angle range of 5° to 24°. In the same manner, it is preferable that the circumferential width of the outer surface of the first ferric core portion 35*a* be set in the electrical angle range of 5° to 24°. This obtains a preferable cogging torque and torque ripple ratio as shown in FIGS. 13A and 13B. With regard to the cogging torque, when the circumferential width is set in the electrical angle range of 5° to 24°, the cogging torque can be reduced by 28.8%. Further, the reduction amount of the induced voltage can be suppressed to 5% or less as shown in FIG. 13C.

In the first embodiment, the core sheet 24 includes the two first ferric core portions 35*a* and the two second ferric core portions 35*b*. However, as long as the number of the ferric core portions 35*a* is the same as the number of the ferric core portions 35*b*, the number may be freely changed. However, it is preferable that, for example, the first ferric core portions 35*a* be arranged at opposite sides separated by 180° in the circumferential direction, and the second ferric core portion 35*b* be arranged at opposite sides separated by 180° in the circumferential direction. The number of ferric core portions may be changed in the same manner in the second and third embodiments and later-described structures A to I.

Although the core sheets 24 are stacked to form the rotor core 23 in the first embodiment, the present invention is not limited to such a structure.

In the third embodiment, the gap extension 134*a* is arranged at the first circumferential side of the first magnetic pole portion 131, and the gap extension 136*a* is arranged at the second circumferential side of the second magnetic pole portion 132. However, the gap extensions may be arranged at both sides of the magnetic pole portions 131 and 132 in the circumferential direction. Such examples will now be described as structure A and structure B.

Structure A

Figure 24:
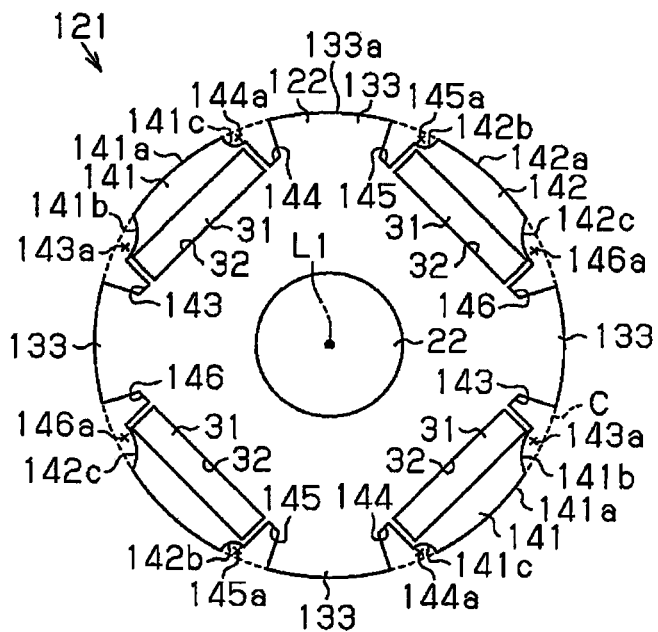
FIG. 24 is a plan view showing a rotor in another example.

As shown in FIG. 24, a first magnetic pole portion 141 includes a first outer surface 141a, which is located at a central portion in the circumferential direction, and second and third outer surfaces 141b and 141c, which are located at two circumferential sides of the first outer surface 141a. The first outer surface 141a of the first magnetic pole portion 141 is formed so that the outer surface 133a is located on a circle C extending along the outer surface 133a of the ferric core portion 133, which is arc-shaped as viewed from the axial direction.

The second outer surface 141b of the first magnetic pole portion 141 is located at the first circumferential side (counterclockwise direction in FIG. 24) of the first outer surface 141a and curved inward in the radial direction to be concave. The circumferential width of the second outer surface 141b is smaller than that the first outer surface 141a. The second outer surface 141b is located inward in the radial direction from the circle C, which extends along the first outer surface 141a as viewed from the axial direction. Thus, a gap 143 located at the first circumferential side of the first magnetic pole portions 141 extends to the second outer surfaces 141b in the circumferential direction and includes a gap extension 143a.

The third outer surface 141c of the first magnetic pole portion 141 is curved inward in the radial direction to be concave at the opposite side of the second outer surface 141b in the circumferential direction (second circumferential side) so as to sandwich the first outer surface 141a of the first magnetic pole portion 141. The circumferential width of the third outer surface 141c is smaller than the first outer surface 141a and the second outer surface 141b. In this structure, a gap 144 located at the second circumferential side of the first magnetic pole portions 141 (clockwise direction in FIG. 24) extend to the third outer surface 141c in the circumferential direction and includes a gap extension 144a. The volume and circumferential width of the gap extension 144a at the second circumferential side of the first magnetic pole portion 141 are smaller than those of the gap extension 143a at the first circumferential side. Thus, the gap 144 including the gap extension 144a at the second circumferential side has a smaller volume and circumferential width than the gap 143 including the gap extension 143a at the first circumferential side.

A second magnetic pole portion 142 includes a first outer surface 142a, which is located at a central portion in the circumferential direction, and second and third outer surfaces 142b and 142c, which are located at two circumferential sides of the first outer surface 142a. The first outer surface 142a of the second magnetic pole portion 142 extends along the circle C.

The second outer surface 142b of the second magnetic pole portion 142 is located at the first circumferential side (counterclockwise direction in FIG. 24) of the first outer surface 141a and curved inward in the radial direction to be concave. The circumferential width of the second outer surface 142b is smaller than the first outer surface 142a. The second outer surface 142b is located inward in the radial direction from the circle C, which is overlapped with the first outer surface 142a as viewed from the axial direction. A gap 145 at the first circumferential side of the second magnetic pole portion 142 extends to the second outer surface 142b in the circumferential direction and includes a gap extension 145a. The gap 145 has a shape obtained by reversing the gap 144, which is located on the second circumferential side of the first magnetic pole portion 141.

The third outer surface 142c of the second magnetic pole portion 142 is curved inward in the radial direction to be concave at the opposite side of the second outer surface 142b in the circumferential direction so as to sandwich the first outer surface 142a of the second magnetic pole portion 142. The circumferential width of the third outer surface 142c is smaller than the first outer surface 142a and greater than the second outer surface 142b. A gap 146 at the second circumferential side of the second magnetic pole portion 142 (clockwise direction in FIG. 24) extends to the third outer surface 142c in the circumferential direction and includes a gap extension 146a. The volume and circumferential width of the gap extension 146a at the second circumferential side of the second magnetic pole portion 142 are greater than those of the gap extension 145a at the second circumferential side, and the gap 146 including the gap extension 146a at the second circumferential side has a larger volume and circumferential width than those of the gap 146 including the gap extension 145a at the first circumferential side. The gap 146 has a shape obtained by reversing the gap 143, which is located at the first circumferential side of the first magnetic pole portion 141. That is, the second magnetic pole portion 142 of this structure has a shape obtained by reversing the first magnetic pole portion 141.

As described above, at the two circumferential sides of the magnetic pole portions 141 and 142, the gaps 143, 144, 145 and 146 including the gap extensions 143a, 144a, 145a and 146a have different circumferential widths (volumes). This obtains advantage (4) of the second embodiment.

Structure B

Figure 25:
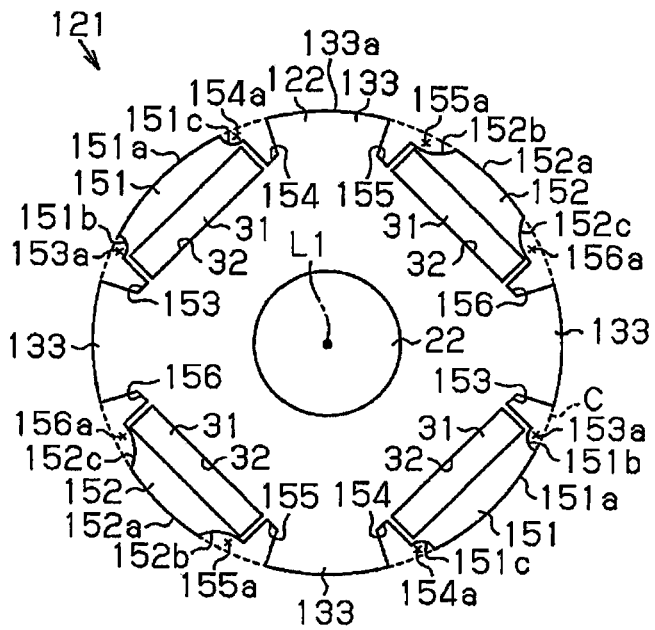
FIG. 25 is a plan view showing a rotor in another example.

As shown in FIG. 25, a first magnetic pole portion 151 includes a first outer surface 151a, which is located at a central portion in the circumferential direction, and second and third outer surfaces 151b and 151c, which are located at two circumferential sides of the first outer surface 151a. The first outer surface 151a of the first magnetic pole portion 151 extends along a circle C, which extends along the outer surface 133a of the ferric core portion 133 that is arc-shaped as viewed from the axial direction.

The second and third outer surfaces 151b and 151c of the first magnetic pole portion 151 are located at two circumferential sides of the first outer surface 151a and curved inward in the radial direction to be concave. The circumferential widths of the second and third outer surfaces 151b and 151c are smaller than the first outer surface 151a. The second and third outer surfaces 151b and 151c are located inward in the radial direction from the circle C, which is overlapped with the first outer surface 151a as viewed from the axial direction. Gaps 153 and 154 at the two circumferential sides of the first magnetic pole portion 151 are extended to the second and third outer surfaces 151b and 151c in the circumferential direction and include gap extensions 153a and 154a. When the gap extension 153a is reversed, its shape becomes the same as that of the other gap extension 154a, and the two gap extensions generally have the same volume and circumferential width. Thus, when the gap 153 is reversed, its shape becomes the same as that of the gap 154, and the two gaps generally have the same volume and circumferential width.

A second magnetic pole portion 152 includes a first outer surface 152a, which is located at a central portion in the circumferential direction, and second and third outer surfaces 152b and 152c, which are located at two circumferential sides of the first outer surface 152a. The first outer surface 152a of the second magnetic pole portion 152 is formed along the circle C.

The second and third outer surfaces 152b and 152c of the second magnetic pole portion 152 are located at two circumferential sides of the first outer surface 152a and curved inward in the radial direction to be concave. The circumferential widths of the second and third outer surfaces 152b and 152c are smaller than that of the first outer surface 151a. The second outer surface 152b is located inward in the radial direction from the circle C, which is overlapped with the first outer surface 152a as viewed from the axial direction. Gaps 155 and 156 at the two circumferential sides of the second magnetic pole portions 152 extend to the second and third outer surfaces 152b and 152c in the circumferential direction and include gap extensions 155a and 156a. The gap extensions 155a and 156a generally have the same volume and circumferential width, and the gaps 155 and 156 including the gap extensions 155a and 156a generally have the same volume and circumferential width.

The second and third outer surfaces 152b and 152c of the second magnetic pole portion 152 have larger circumferential widths than the second and third outer surfaces 151b and 151c of the first magnetic pole portion 151. Thus, the gaps 155 and 156 located at the two circumferential sides of the second magnetic pole portion 152 have larger volumes and circumferential widths than the gaps 153 and 154 located at the two circumferential sides of the first magnetic pole portion 151.

As described above, the gaps 153, 154, 155 and 156 including the gap extensions 153a, 154a, 155a and 156a at the two circumferential sides of the magnetic pole portions 151 and 152 have different circumferential widths (volumes). This obtains advantage (4) of the second embodiment.

Gap extensions are located at the two circumferential sides of each magnetic pole portion in structures A and B. However, when gap extensions are arranged in the ferric core portions as in the second embodiment, the gap extensions may be arranged at the two circumferential sides.

Although not particularly mentioned in the second and third embodiments, for example, rotor core may include a magnetic pole portion that is provided with a gap extension in a gap at the first circumferential side and a magnetic pole portion that is provided with a gap extension in a gap at the second circumferential side.

When core sheets are stacked to form a rotor core as in the first embodiment, the core sheets may include ferric core portions having different shapes. One example of such a rotor will now be described.

Structure C

Figure 27:
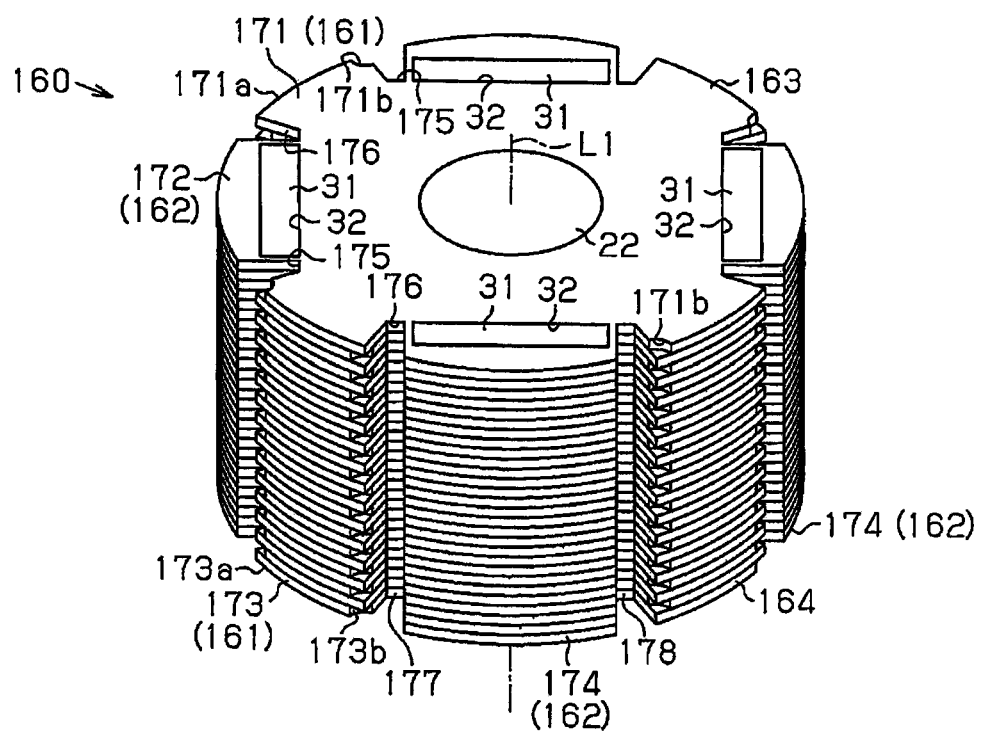
FIG. 27 is a perspective view showing a rotor in another example.

As shown in FIG. 27, a rotor 160 includes ferric core portions 161 and magnetic pole portions 162. The rotor 160 is formed by alternately stacking two types of core sheets, namely, first and second core sheets 163 and 164.

Figure 26A:
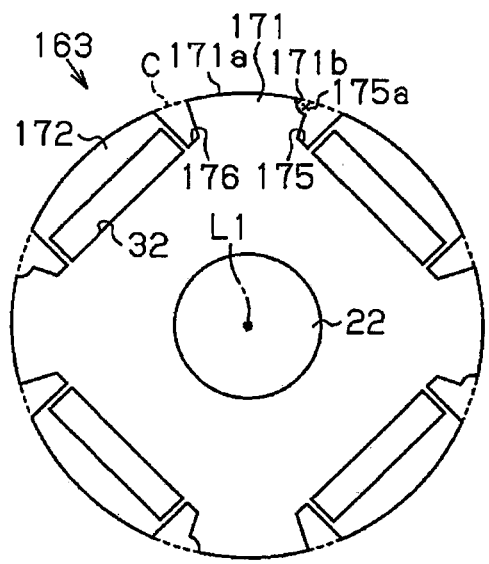
FIGS. 26A and 26B are plan views of a rotor in another example.
Figure 26B:
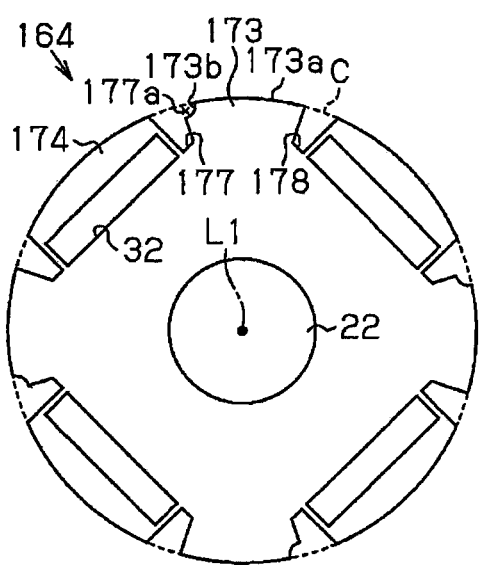

As shown in FIG. 26A, each first core sheet 163 includes ferric core portion pieces 171, which form the ferric core portion 161, and magnetic pole pieces 172, which form the magnetic pole portion 162. As shown in FIG. 26B, each second core sheet 164 includes ferric core portion pieces 173, which form the ferric core portions 161 in cooperation with the ferric core portion pieces 171 of the first core sheets 163, and magnetic pole pieces 174, which form the magnetic pole portions 162 in cooperation with the magnetic pole pieces 172 of the first core sheet 163.

As shown in FIGS. 26A and 26B, the first core sheet 163 includes four magnetic pole pieces 172, and the second core sheet 164 includes four magnetic pole pieces 174. The four magnetic pole pieces 172 and the four magnetic pole pieces 174 are arranged at intervals of 90° in the circumferential direction. The magnetic pole pieces 172 and the magnetic pole pieces 174 include magnet receptacles 32 that receive planar magnets 31 (see FIG. 27). The magnetic pole pieces 172 and 174 have identical shapes. When the magnetic pole pieces 172 of the first core sheet 163 and the magnetic pole pieces 174 of the second core sheet 164 are stacked upon one another in the axial direction, the magnets 31, each formed by a single member, can be received in the magnet receptacles 32.

As shown in FIG. 26A, the first core sheet 163 includes four ferric core portion pieces 171 arranged at intervals of 90° in the circumferential direction. Each ferric core portion piece 171 includes a first outer surface 171a, which is curved outward in the radial direction to be convex, and a second outer surface 171b, which is continuous from the first outer surface 171a and curved inward in the radial direction to be concave. The second outer surface 171b is located at the second circumferential side (clockwise side as viewed in the drawing) of the first outer surface 171a and located inward in the radial direction from the circle C, which extends along the first outer surface 171a. A gap 175 at the second circumferential side of the ferric core portion piece 171 includes a gap extension 175a, and the gap 175 has a larger circumferential width and volume than a gap 176, which is located at a first circumferential side of the ferric core portion piece 171.

As shown in FIG. 26B, each second core sheet 164 includes four ferric core portion pieces 173 arranged at intervals of 90° in the circumferential direction. Each ferric core portion piece 173 includes a first outer surface 173a, which is curved outward in the radial direction to be convex, and a second outer surface 173b, which is continuous from the first outer surface 173a and curved inward in the radial direction to be concave. Unlike the ferric core portion pieces 171 of the first core sheet 163, the second outer surface 173b of the ferric core portion piece 173 of the second core sheet 164 is formed at the first circumferential side, that is, the opposite side of the ferric core portion piece 171 of the first core sheet 163 in the circumferential direction. In this manner, the second core sheet 164 has a shape obtained by reversing the first core sheet 163. Thus, a gaps 177 located at the first circumferential side of the ferric core portion piece 173 of the second core sheet 164 includes a gap extension 177a, and the gap 177 has a larger circumferential width and volume than a gap 178 located at the second circumferential side of the ferric core portion piece 173.

The first core sheets 163 and the second core sheets 164 are alternately stacked so that the ferric core portion pieces 171 and 173 are overlapped with each other and the magnetic pole pieces 172 and 174 are overlapped with each other in the axial direction of the rotation shaft 22. This forms the rotor 160 shown in FIG. 27.

Figure 28:
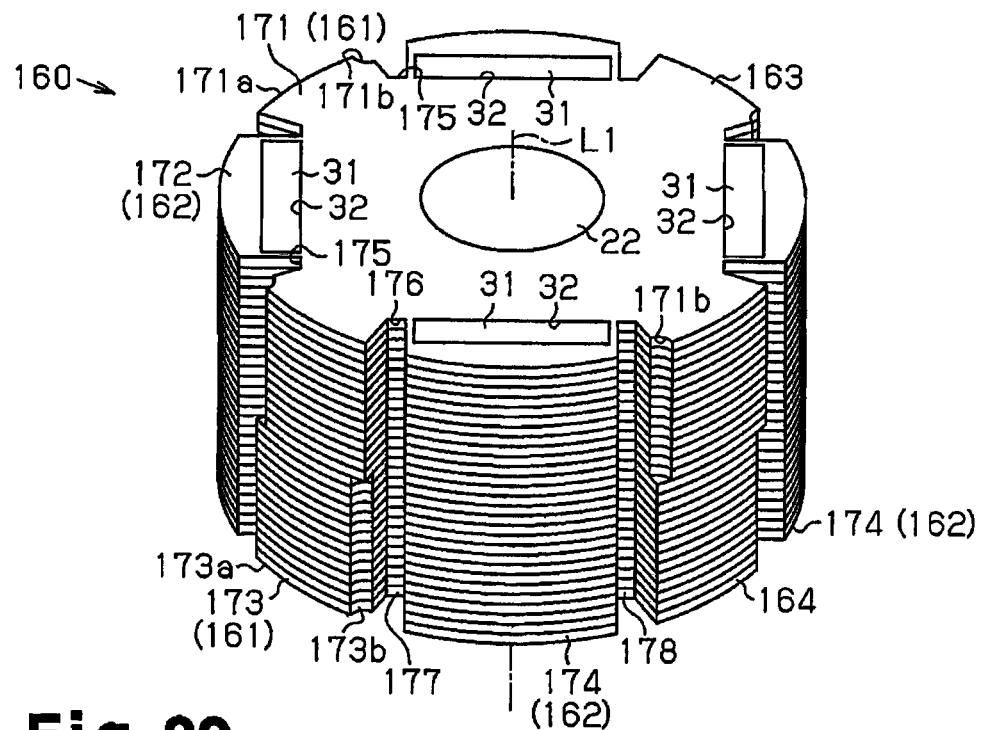
FIG. 28 is a perspective view showing a rotor in another example.
Figure 29:
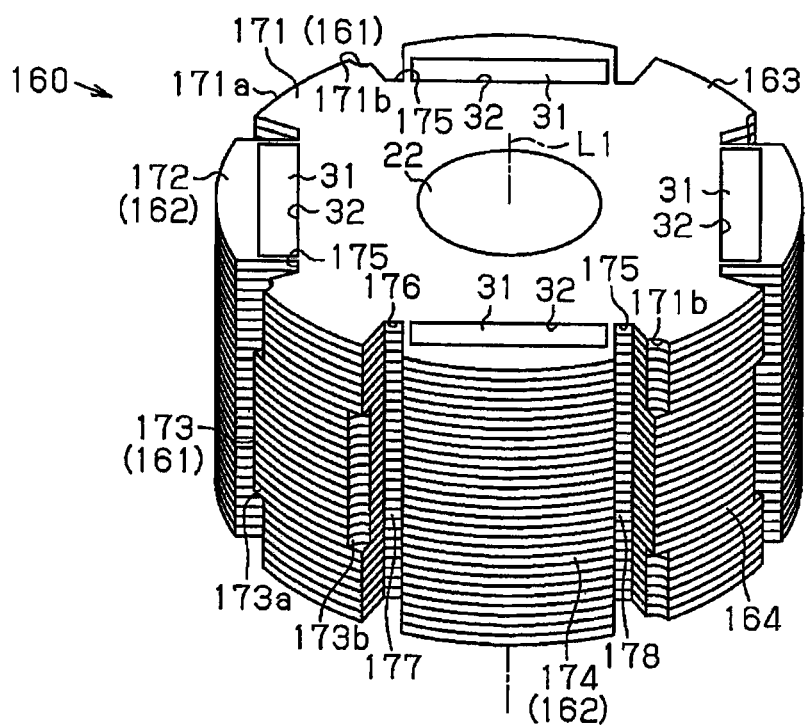
FIG. 29 is a perspective view showing a rotor in another example.

The stacking of the first core sheets 163 and the second core sheets 164 is not limited in such a manner. As shown in FIG. 28, the first core sheets 163 may be consecutively stacked to form a first rotor portion, and the same number of second core sheets 164 may be consecutively stacked to form the second rotor portion. Alternatively, as shown in FIG. 29, a first rotor portion may be formed by stacking the first core sheets 163 from both sides in the axial direction (stacking direction) to sandwich the second core sheets 164 stacked to form the second rotor portion. In any one of these methods, when the first core sheet 163 and the second core sheet 164 have reversed shapes, it is preferable that the number of the core sheets 163 be the same as the number of the core sheets 164.

Although the gap extensions are arranged in the ferric core portions (ferric core portion pieces) in the above structure, the gap extensions may be arranged in the magnetic pole portions (magnetic pole pieces) like in the third embodiment. Such an example will now be described.

Structure D

Figure 30A:
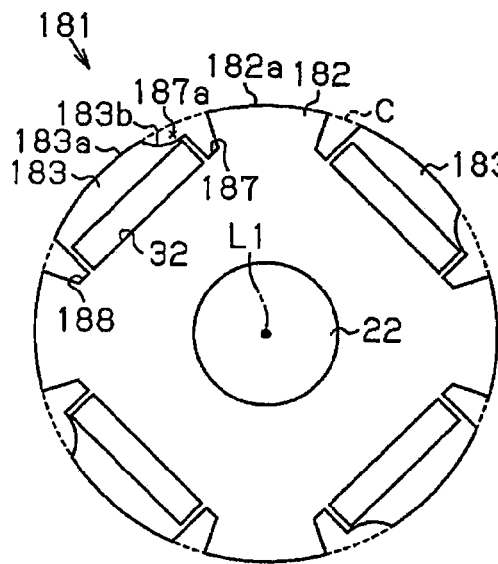
FIGS. 30A and 30B are plan views of a rotor in another example.
Figure 30B:
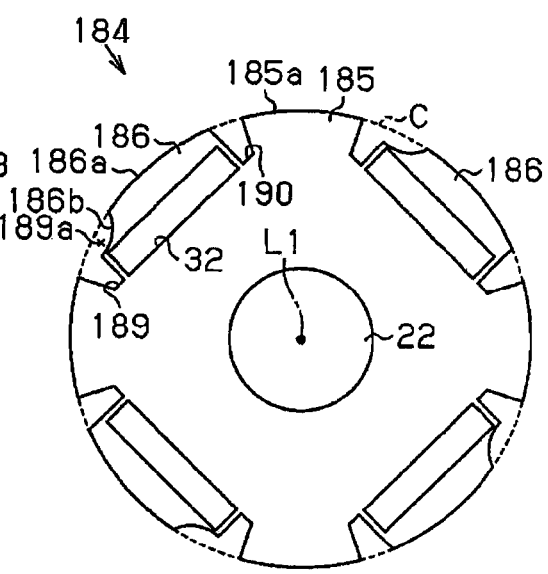

As shown in FIG. 30A, a first core sheet 181 includes ferric core portion pieces 182, which form ferric core portions, and magnetic pole pieces 183, which form magnetic pole portions. As shown in FIG. 30B, a second core sheet 184 includes ferric core portion pieces 185, which form ferric core portions in cooperation with the ferric core portion pieces 182 of the first core sheet 181, and magnetic pole pieces 186, which form magnetic pole portions in cooperation with the magnetic pole pieces 183 of the first core sheet 181.

As shown in FIGS. 30A and 30B, four ferric core portion pieces 182 and four ferric core portion pieces 185 are formed at intervals of 90° in the circumferential direction so that outer surfaces 182a and 185a are curved in the radial direction. Further, the ferric core portion pieces 182 and 185 are fan-shaped in the axial direction.

As shown in FIG. 30A, four magnetic pole pieces 183 are formed at intervals of 90° in the circumferential direction. Each magnetic pole piece 183 includes a first outer surface 183a, which is curved outward in the radial direction to be convex, and a second outer surface 183b, which is formed continuously from the first outer surface 183a and curved inward in the radial direction to be concave. The second outer surface 183b is located at the second circumferential side (clockwise side as viewed in the drawing) of the first outer surface 183a and inward in the radial direction from the circle C, which extends along the first outer surface 183a. A gap 187 located at the second circumferential side of the magnetic pole piece 183 includes a gap extension 187a, and the gap 187 has a larger circumferential width and volume than a gap 188, which is located at the first circumferential side of the magnetic pole piece 183.

As shown in FIG. 30B, four magnetic pole pieces 186 are formed at intervals of 90° in the circumferential direction. Each magnetic pole piece 186 includes a first outer surface 186a, which is curved outward in the radial direction to be convex, and a second outer surface 186b, which is formed continuously from the first outer surface 186a and curved inward in the radial direction to be concave. Unlike the magnetic pole pieces 183 of the first core sheet 181, the second outer surface 186b of the magnetic pole piece 186 of the second core sheet 184 is located at the first circumferential side, that is, the opposite side of the magnetic pole piece 183 of the first core sheet 181 in the circumferential direction. In this manner, the second core sheet 184 has a shape obtained by reversing the first core sheet 181. A gap 189 located at a the first circumferential side of the magnetic pole piece 186 includes a gap extension 189a, and the gap 189 has a larger circumferential width and volume greater than a gap 190 located at a second circumferential side of the magnetic pole piece 186.

The first core sheets 181 and the second core sheets 184 are stacked upon one another so that the ferric core portion pieces 182 and 185 are overlapped and the magnetic pole pieces 183 and 186 are overlapped.

Structure E

Figure 31A:
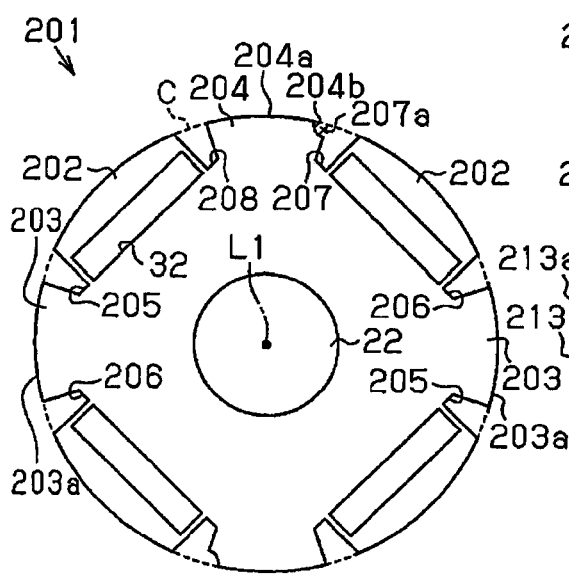
FIGS. 31A and 31B are plan views of a rotor in another example.

FIG. 31A shows a first core sheet 201 including, the magnet receptacles 32, which receive magnets, magnetic pole pieces 202, first ferric core portion pieces 203, and second ferric core portion pieces 204.

As shown in FIG. 31A, the two first ferric core portion pieces 203 extend outward in the radial direction and are fan-shaped. The two first ferric core portion pieces 203 are located at 180° symmetric positions in the circumferential direction of the first core sheet 201. Gaps 205 and 206 are located at both circumferential sides of each first ferric core portion piece 203. The shape of the gap 205 is obtained by reversing the gap 206. Thus, the gaps 205 and 206 at both circumferential sides of the first ferric core portion piece 203 generally have the same circumferential width and volume.

As shown in FIG. 31A, each second ferric core portion piece 204 extends in the radial direction and includes a first outer surface 204a and a second outer surface 204b. The first outer surface 204a of the second ferric core portion piece 204 is curved outward in the radial direction to be convex and lies along the circle C that extends along the outer surfaces 203a of the first ferric core portion pieces 203. The second outer surface 204b of the second ferric core portion piece 204 is located at the second circumferential side (clockwise side as viewed in the drawing) of the first outer surface 204a and curved inward in the radial direction to be concave. The second outer surface 204b has a smaller circumferential width than the first outer surface 204a. The second outer surface 204b is located inward in the radial direction from the circle C, which is overlapped with the first outer surface 204a as viewed from the axial direction. Thus, a gap 207 at the second circumferential side of the second ferric core portion piece 204 extends to the second outer surface 204b in the circumferential direction and includes a gap extension 207a. Thus, the gap 207 has a larger circumferential width and volume greater than a gap 208.

Figure 31B:
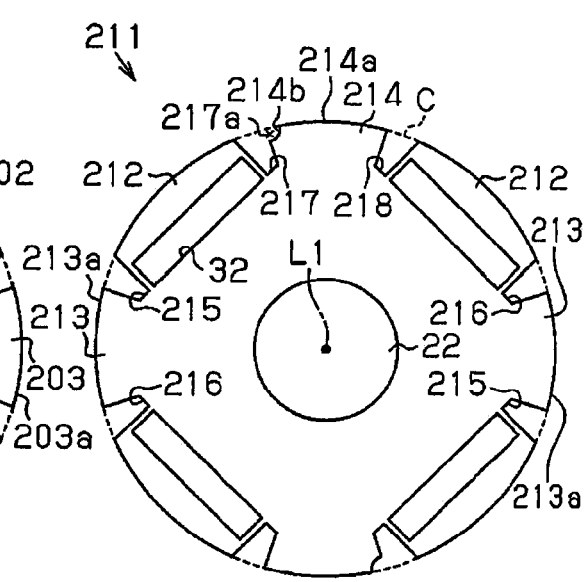

FIG. 31B shows a second core sheet 211 including magnetic pole pieces 212, first ferric core portion pieces 213, and second ferric core portion pieces 214. The magnetic pole pieces 212 have substantially the same shape as the magnetic pole piece 202 of the first core sheet 201.

The first ferric core portion pieces 213 of the second core sheet 211 have the same shape as the first ferric core portion pieces 203 of the first core sheet 201. As shown in FIG. 31B, the two first ferric core portion pieces 213 are formed at 180° symmetric positions in the circumferential direction of the second core sheet 211. The two first ferric core portion pieces 213 extend outward in the radial direction and are fan-shaped. Gaps 215 and 216 are formed at both circumferential sides of the first ferric core portion piece 213. The shape of the gap 215 is obtained by reversing the gap 216. Thus, the gaps 215 and 216 at both circumferential sides of the first ferric core portion piece 213 generally have the same circumferential width and volume.

As shown in FIG. 31B, each second ferric core portion piece 214 extends in the radial direction and includes a first outer surface 214a and a second outer surface 214b. The first outer surface 214a of the second ferric core portion piece 214 is curved outward in the radial direction to be convex so that the first outer surface 214a lies along the circle C, which extends along an outer surface 213a of the first ferric core portion piece 213. The second outer surface 214b of the second ferric core portion piece 214 is located on the first circumferential side (counterclockwise side as viewed in the drawing) of the first outer surface 214a and curved inward in the radial direction to be concave. The second outer surface 214b has a smaller circumferential width than the first outer surface 214a. The second outer surface 214b is located inward in the radial direction from the circle C, which is overlapped with the first outer surface 214a as viewed from the axial direction. A gap 217 at the first circumferential side of the second ferric core portion piece 214 extends to the second outer surface 214*b* in the circumferential direction and includes a gap extension 217*a*. Thus, the gap 217 has a larger circumferential width and volume than a gap 218. The gaps 217, which is located at the first circumferential side of each second ferric core portion piece 214 in the second core sheet 211, has a shape obtained by reversing the gap 207, which is located at the second circumferential side of each second ferric core portion piece 204 in the first core sheet 201.

The first and second core sheets 201 and 211 are stacked upon one another so that the magnetic pole pieces 202 and 212 are overlapped with each other, the first ferric core portion pieces 203 and 213 are overlapped with each other, and the second ferric core portion pieces 204 and 214 are overlapped with each other in the axial direction. Further, the number of the first core sheets 201 that are stacked is the same as the number of second core sheets 211 that are stacked. The magnetic pole pieces 202 and 212 are overlapped with each other in the axial direction, and magnets are received in the magnet receptacles 32 of the magnetic pole pieces 202 and 212 thereby forming magnetic pole portions. The first ferric core portion pieces 203 and 213 are overlapped with each other, and the second ferric core portion pieces 204 and 214 are overlapped with each other in the axial direction. This forms the ferric core portions.

Structure F

Figure 32A:
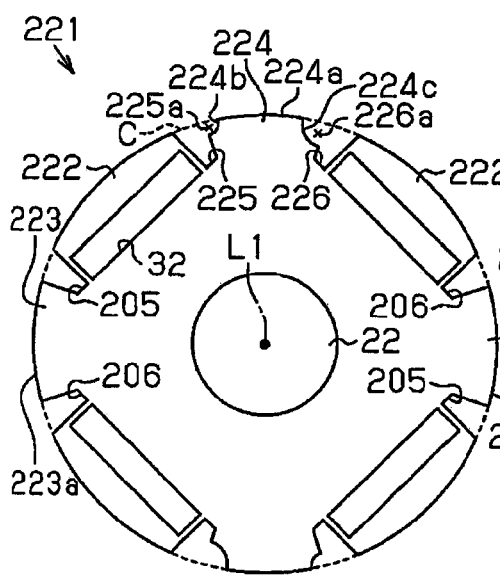
FIGS. 32A and 32B are plan views of a rotor in another example.

FIG. 32A shows a first core sheet 221 including magnetic pole pieces 222, first ferric core portion pieces 223, and second ferric core portion pieces 224. The magnetic pole pieces 222 and the first ferric core portion pieces 223 have the same shapes as the magnetic pole piece 202 and first ferric core portion piece 203 in the first core sheet 201 of the structure E and thus will not be described.

As shown in FIG. 32A, each second ferric core portion piece 224 of the first core sheet 221 includes a first outer surface 224*a*, which is located at a central portion in the circumferential direction, and second and third outer surfaces 224*b* and 224*c*, which are located at both circumferential sides of the first outer surface 224*a*.

As shown in FIG. 32A, the first outer surface 224*a* is curved outward in the radial direction to be convex so that the first outer surface 224*a* lies along the circle C, which extends along an outer surface 223*a* of the first ferric core portion piece 223 as viewed from the axial direction.

As shown in FIG. 32A, the second outer surface 224*b* of the second ferric core portion piece 224 is located at the first circumferential side (counterclockwise side as viewed in the drawing) of the first outer surface 224*a* and curved inward in the radial direction to be concave. The second outer surface 224*b* has a smaller circumferential width than the first outer surface 224*a*. The second outer surface 224*b* is located inward in the radial direction from the circle C, which is overlapped with the first outer surface 224*a* as viewed from the axial direction. A gap 225 at the first circumferential side of the second ferric core portion piece 224 extends to the second outer surface 224*b* in the circumferential direction and includes a gap extension 225*a*.

As shown in FIG. 32A, the third outer surface 224*c* of the second ferric core portion piece 224 is located at the second circumferential side (clockwise side as viewed in the drawing) of the first outer surface 224*a* and is curved inward in the radial direction to be concave. The third outer surface 224*c* has a circumferential width that is smaller than the first outer surface 224*a* and larger than the second outer surface 224*b*. The third outer surface 224*c* is located inward in the radial direction from the circle C, which extends along the first outer surface 224*a* as viewed from the axial direction. A gap 226 at the second circumferential side of the second ferric core portion piece 224 extends to the third outer surface 224*c* in the circumferential direction and includes a gap extension 226*a*. The gap extension 226*a* at the second circumferential side of the second ferric core portion piece 224 has a larger circumferential width than the gap extension 225*a* at the first circumferential side. Thus, the gap 226 including the gap extension 226*a* at the second circumferential side has a larger volume and circumferential width than the gap 225 including the gap extension 225*a* at the first circumferential side.

Figure 32B:
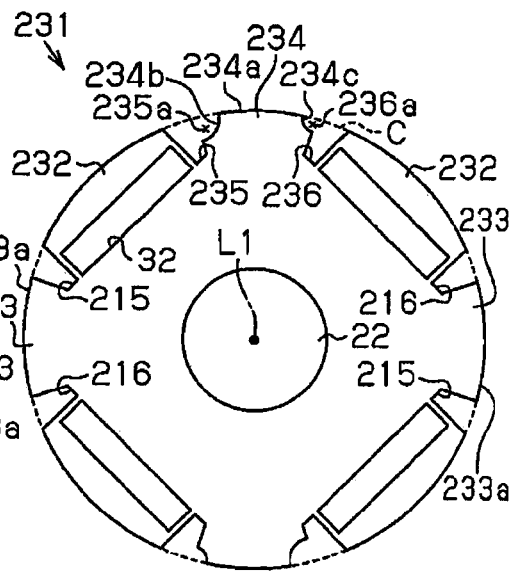

FIG. 32B shows a second core sheet 231 including magnetic pole pieces 232, first ferric core portion pieces 233, and second ferric core portion pieces 234. The magnetic pole pieces 232 and the first ferric core portion pieces 233 have the same shapes as the magnetic pole pieces 212 and the first ferric core portion pieces 213 in the second core sheet 211 of structure E and thus will not be described.

As shown in FIG. 32B, each second ferric core portion piece 234 of the second core sheet 231 includes a first outer surface 234*a*, which is located at a central portion in the circumferential direction, and second and third outer surfaces 234*b* and 234, which are located at both circumferential sides of the first outer surface 234*a*.

As shown in FIG. 32B, the first outer surface 234*a* is curved outward in the radial direction to be convex so that the first outer surface 234*a* lies along the circle C, which extends along an outer surface 233*a* of the first ferric core portion piece 233 as viewed from the axial direction.

As shown in FIG. 32B, the second outer surface 234*b* of the second ferric core portion piece 234 is located at the first circumferential side of the first outer surface 234*a* (counterclockwise side as viewed in the drawing) and curved inward in the radial direction to be concave. The second outer surface 234*b* has a smaller circumferential width than the first outer surface 234*a*. The second outer surface 234*b* is located inward in the radial direction from the circle C, which extends along the first outer surface 234*a* as viewed from the axial direction. A gap 235 at the first circumferential side of the second ferric core portion piece 234 extends to the second outer surface 234*b* in the circumferential direction and includes a gap extension 235*a*.

As shown in FIG. 32B, the third outer surface 234*c* of the second ferric core portion piece 234 is located at the second circumferential side (clockwise side as viewed in the drawing) of the first outer surface 234*a* and curved inward in the radial direction to be concave. The third outer surface 234*c* has a smaller circumferential width than the first outer surface 234*a* and the second outer surface 234*b*. The third outer surface 234*c* is located inward in the radial direction from the circle C, which extends along the first outer surface 234*a* as viewed from the axial direction. A gap 236 at the second circumferential side of the second ferric core portion piece 234 extends to the third outer surface 234*c* in the circumferential direction and includes a gap extension 236*a*. The gap extension 236*a* at the second circumferential side of the second ferric core portion piece 234 has a smaller volume and circumferential width than the gap extension 235*a* at the first circumferential side. Thus, the gap 236 including the gap extension 236*a* at the second circumferential side has a smaller volume and circumferential width than the gap 235 including the gap extension 235*a* at the first circumferential side.

The first and second core sheets 221 and 231 are stacked upon one another so that the magnetic pole pieces 222 and 232 are overlapped with one another in the axial direction, the first ferric core portion pieces 223 and 233 are overlapped with one another in the axial direction, the second ferric core portion pieces 224 and 234 are overlapped with one another in the axial direction, and the number of the first core sheets 221 is the same as the number of the second core sheets 231. The magnetic pole pieces 222 and 232 are overlapped with each other in the axial direction, and the magnets are received in the magnet receptacles 32 of the magnetic pole pieces 222 and 232 thereby forming the magnetic pole portions. The first ferric core portion pieces 223 and 233 are overlapped with one another in the axial direction, and the second ferric core portion pieces 224 and 234 are overlapped with one another in the axial direction. This forms the ferric core portions.

Although the number of the first core sheets is the same as the number of the second core sheets in structures C to F, the present invention is not limited in such a manner. For example, when stacking the first and second core sheets in the axial direction, as long as the gaps located at both circumferential sides of the ferric core portion portions and the magnetic pole portions entirely have generally the same volume, the number of the first core sheets may differ from the number of the second core sheets. One example of such a structure will now be described.

Structure G

Figure 33A:
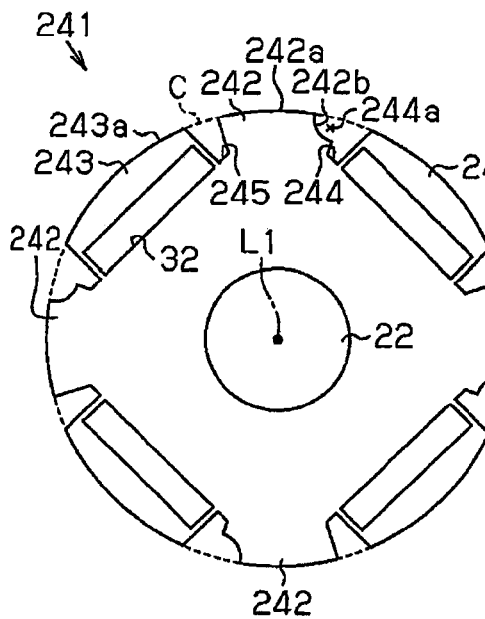
FIGS. 33A and 33B are plan views of a rotor in another example.
Figure 33B:
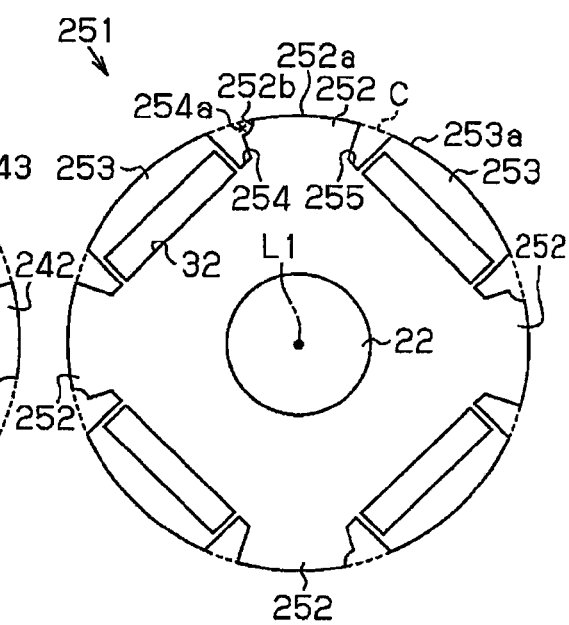

As shown in FIG. 33A, a first core sheet 241 includes ferric core portion pieces 242, which form ferric core portions, and magnetic pole pieces 243, which form magnetic pole portions. As shown in FIG. 33B, a second core sheet 251 includes ferric core portion pieces 252, which form ferric core portions in cooperation with the ferric core portion pieces 242 of the first core sheet 241, and magnetic pole pieces 253, which form magnetic pole portions in cooperation with the magnetic pole pieces 243 of the first core sheet 241.

As shown in FIGS. 33A and 33B, the first core sheet 241 includes four magnetic pole pieces 243, and the second core sheet 251 includes four magnetic pole pieces 253. The magnetic pole pieces 243 and magnetic pole pieces 253 are formed at intervals of 90° in the circumferential direction so that outer surfaces 243a and 253a are curved in the radial direction. Further, the magnetic pole pieces 243 and magnetic pole pieces 253 include the magnet receptacles 32 arranged formed inward in the radial direction from the outer surfaces 243a and 253a.

As shown in FIG. 33A, the first core sheet 241 includes four ferric core portion pieces 242 arranged at intervals of 90° in the circumferential direction. Each ferric core portion piece 242 includes a first outer surface 242a, which is curved outward in the radial direction to be convex, and a second outer surface 242b, which is continuous from the first outer surface 242a and curved inward in the radial direction to be concave. The second outer surface 242b is located at the second circumferential side (clockwise side as viewed in the drawing) of the first outer surface 242a and inward in the radial direction from the circle C, which extends along the first outer surface 242a. A gap 244 located at the second side circumferential of the ferric core portion piece 242 includes a gap extension 244a and has a larger circumferential width and volume than a gap 245 located at a first circumferential side of the ferric core portion piece 242.

As shown in FIG. 33B, the second core sheet 251 includes four ferric core portion pieces 252 arranged at intervals of 90° in the circumferential direction. Each ferric core portion piece 252 includes a first outer surface 252a, which is curved outward in the radial direction to be convex, and a second outer surface 252b, which is continuous from the first outer surface 252a and curved inward in the radial direction to be concave. Unlike the ferric core portion piece 242 of the first core sheet 241, the second outer surface 252b in the ferric core portion piece 252 of the second core sheet 251 is located at the first circumferential side, that is, the opposite circumferential side of the ferric core portion piece 242 in the first core sheet 241. In this manner, the second core sheet 251 has a shape obtained by reversing the first core sheet 241. A gap 254 located at the first circumferential side of the ferric core portion piece 252 in the second core sheet 251 includes a gap extension 254a. The gap 254 has a larger circumferential width and volume greater than a gap 255 located at the second circumferential side of the magnetic pole piece 253.

Figure 34:
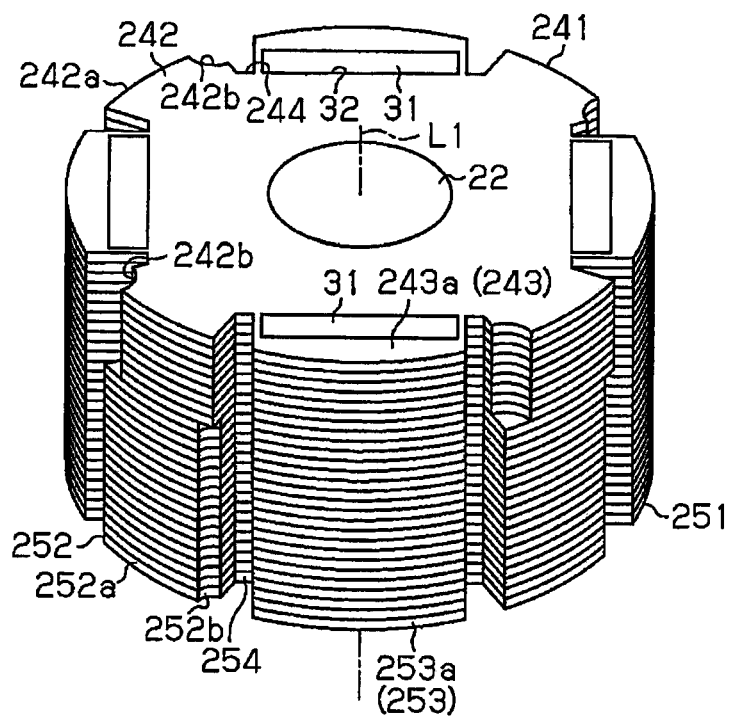
FIG. 34 is a perspective view showing a rotor in another example.
Figure 35:
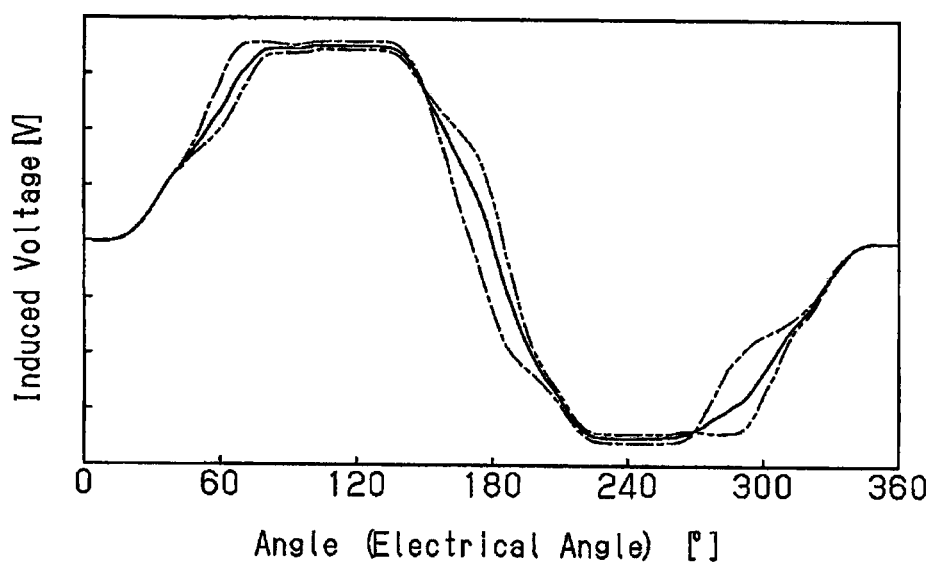
FIG. 35 is a graph of the induced voltage in the rotor shown in FIG. 34.

Here, like the structures C to F, the same number of the first core sheets 241 and the second core sheets 241 and 251 are stacked upon one another so that the magnetic pole pieces 243 and 253 and the ferric core portion pieces 242 and 252 are overlapped in the axial direction. This shifts the circumferential widths of the gaps 244, 245, 254 and 255 in the entire rotor, and the induced voltage pitch becomes uneven. Thus, as shown in FIG. 34, the circumferential widths of the gaps 244, 245, 254 and 255 are balanced by using less first core sheets 241 than the second core sheets 251. This evens the induced voltage pitch as shown by the solid line in FIG. 35.

In structures C to G, core sheets are stacked so that magnetic pole portions with gaps including gap extensions in at least on one circumferential side are overlapped with one another or ferric core portions with gaps including gap extensions in at least one circumferential side are overlapped with one another. However, the present invention is not limited in such a manner. One example will be described below.

Structure H

Figure 36A:
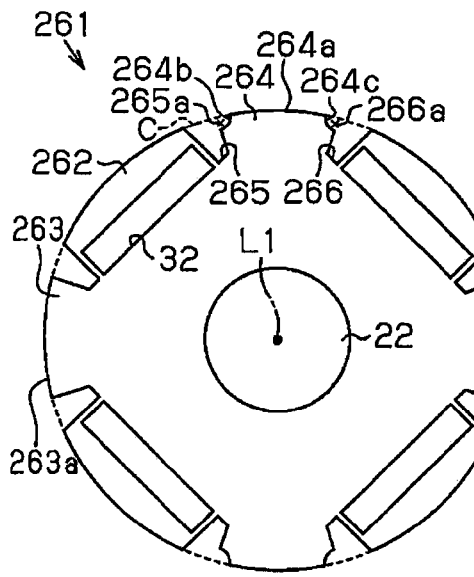
FIGS. 36A and 36B are plan views of a rotor in another example.

A first core sheet 261 shown in FIG. 36A includes magnetic pole pieces 262, first ferric core portion pieces 263, and second ferric core portion pieces 264. The magnetic pole pieces 262 and the first ferric core portion pieces 263 have the same shapes as the magnetic pole pieces 202 and the first ferric core portion pieces 203 of the first core sheet 201 in structure E and thus will not be described.

As shown in FIG. 36A, each second ferric core portion pieces 264 of the first core sheet 261 includes a first outer surface 264a, which is located at a central portion in the circumferential direction, and second and third outer surfaces 264b and 264c, which are located at both circumferential sides of the first outer surface 264a.

As shown in FIG. 36A, the first outer surface 264a is curved outward in the radial direction to be convex so that the first outer surface 264a lies along the circle C, which extends along an outer surface 263a of the first ferric core portion piece 263 as viewed from the axial direction.

As shown in FIG. 36A, the second and third outer surfaces 264b and 264c of the second ferric core portion piece 264 are located at both circumferential sides of the first outer surface 264a and curved inward in the radial direction to be concave. The second and third outer surfaces 264b and 264c have smaller circumferential widths than the first outer surface 264a. The second and third outer surfaces 264b and 264c are located inward in the radial direction from the circle C, which extends along the first outer surface 264a as viewed from the axial direction. Gaps 265 and 266 located at both circumferential sides of the second ferric core portion piece 264 extend to the second and third outer surfaces 264b and 264c in the circumferential direction and include gap extensions 265a and 266a. The shape of the gap extension 266a is obtained by reversing the gap extension 265a. The two gap extensions 265a and 266a generally have the same volume and circumferential width. Thus, the shape of the gap 266 including the gap extension 266a is obtained by reversing the gap 265 including the gap extension 265a, and the gaps 265 and 266 generally have the same volume and circumferential width.

Figure 36B:
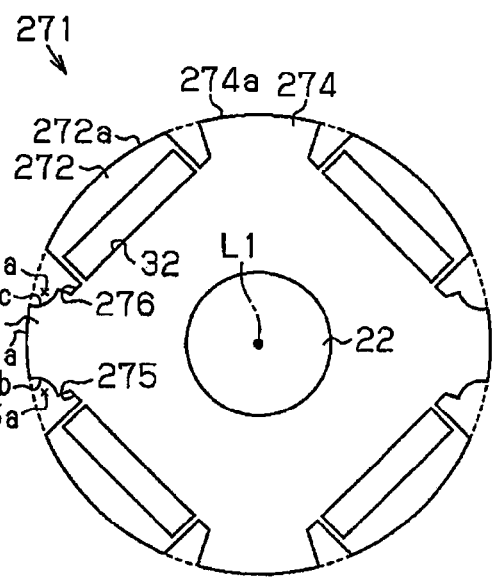

As shown in FIG. 36B, a second core sheet 271 includes magnetic pole pieces 272, first ferric core portion pieces 273, and second ferric core portion pieces 274. The magnetic pole pieces 272 have the same shapes as the magnetic pole pieces 202 in the second core sheets 211 of structure E and thus will not be described.

As shown in FIG. 36B, each first ferric core portion piece 273 of the second core sheet 271 includes a first outer surface 273a, which is located at a central portion in the circumferential direction, and second and third outer surfaces 273b and 273c, which are located at both circumferential sides of the first outer surface 273a.

As shown in FIG. 36B, the first outer surface 273a is curved outward in the radial direction to be convex so that the first outer surface 273a lies along the circle C, which extends along an outer surface 272a of the magnetic pole piece 272 as viewed from the axial direction.

As shown in FIG. 36B, the second and third outer surfaces 273b and 273c of the first ferric core portion piece 273 are located at both circumferential sides of the first outer surface 273a and curved inward in the radial direction to be concave. The second and third outer surfaces 273b and 273c have smaller circumferential widths than the first outer surface 273a. The second and third outer surfaces 273b and 273c are located inward in the radial direction from the circle C, which extends along the first outer surface 273a as viewed from the axial direction. Gaps 275 and 276 at both circumferential sides of the first ferric core portion piece 273 extend to the second and third outer surfaces 273b and 273c in the circumferential direction and include gap extensions 275a and 276a. When the shape of one of the gap extensions 275a and 276b is reversed, the shapes of the gap extensions 275a and 276b become the same, and the gap extensions 275a and 276b have generally the same volume and circumferential width. Thus, when one of the gaps 275 and 276 including the gap extensions 275a and 276b is reversed, the shapes of the gaps 275 and 276 become the same, and the gaps 275 and 276 have generally the same volume and circumferential width. The second and third outer surfaces 273b and 273c have larger circumferential widths and radial lengths than the second and third outer surfaces 264b and 264c of each second ferric core portion piece 264 in the first core sheet 261. Thus, the gaps 275 and 276 including the gap extensions 275a and 276a located at both circumferential sides of the first ferric core portion piece 273 in the second core sheet 271 have larger circumferential widths and volumes than the gaps 265 and 266 including the gap extensions 265a and 266a located at both circumferential sides of the second ferric core portion piece 264 in the first core sheet 261.

As shown in FIG. 36B, each second ferric core portion piece 274 in the second core sheet 271 includes an arc-shaped outer circumferential surface 274a of is fan-shaped as viewed from the axial direction. The second ferric core portion piece 274 of the second core sheet 271 has substantially the same shape as the first ferric core portion piece 263 of the first core sheet 261.

Figure 37:
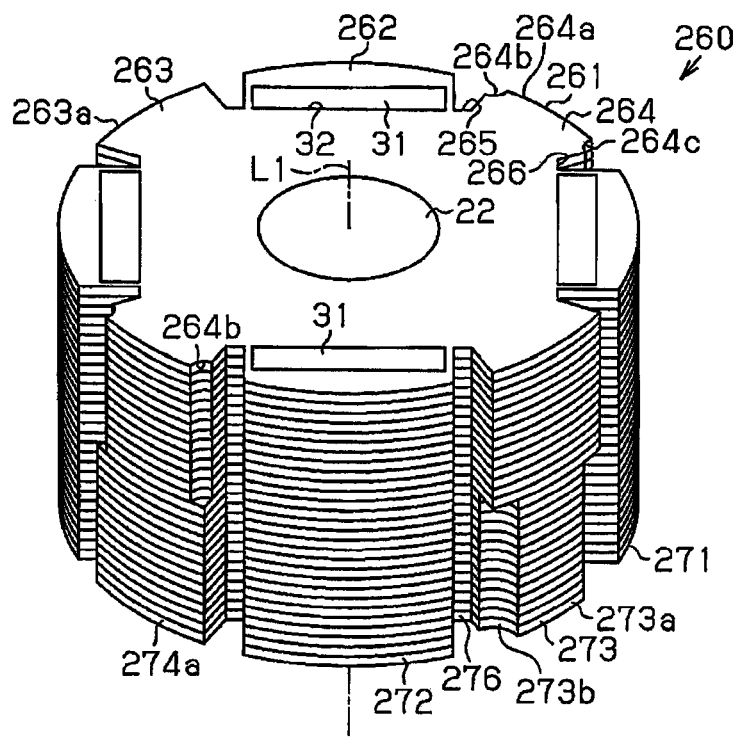
FIG. 37 is a perspective view showing a rotor in another example.

The same number of first and second core sheets 261 and 271 are stacked upon one another so that the magnetic pole pieces 262 and 272 are overlapped in the axial direction, the first ferric core portion pieces 263 and 273 are overlapped in the axial direction on each other, and the second ferric core portion pieces 264 and 274 are overlapped in the axial direction. This forms the rotor 260 shown in FIG. 37. The magnetic pole pieces 262 and 272 are overlapped with each other in the axial direction, and magnets are received in the magnet receptacles 32 of the magnetic pole pieces 262 and 272. This forms the magnetic pole portions. The first ferric core portion pieces 263 and 273 are overlapped in the axial direction, and the second ferric core portion pieces 264 and 274 are overlapped in the axial direction. This forms the ferric core portions.

Figure 38:
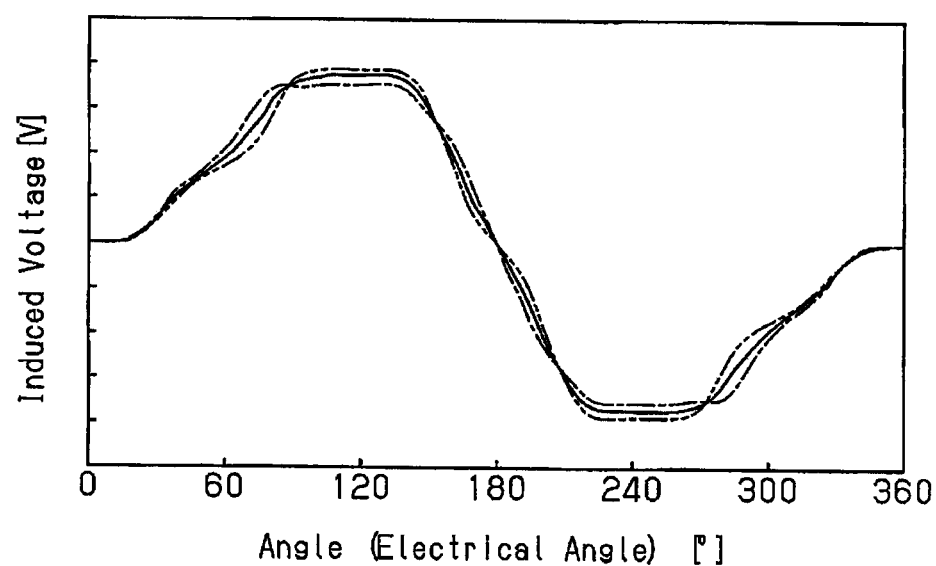
FIG. 38 is a graph of the induced voltage in the rotor shown in FIG. 37.

In this state, the circumferential centers of the first ferric core portion pieces 263 in the first core sheet 261 are aligned with the circumferential centers of the first ferric core portion pieces 273 in the second core sheet 271. Further, the circumferential centers of the second ferric core portion pieces 264 in the first core sheet 261 are aligned with the circumferential centers of the second ferric core portion piece 274 in the second core sheet 271. Thus, even though the circumferential widths of the gaps 265 and 266 in the first core sheet 261 differs from the circumferential widths of the gaps 275 and 276 in the second core sheet 271, the induced voltage pitch can be even as shown by the solid line in FIG. 38, and the number of stacked core sheets 261 does not have to be the same as the number of stacked core sheets 271.

Although the rotor core and the rotor are formed by stacking the plurality of core sheets in structures C to H, the present invention may be applied to an integral type rotor core instead of a stacked type rotor core.

In the above embodiments and the structures A to H, the IPM-type rotors in which magnets are accommodated in the magnet receptacles are constituted, but it is possible to form an SPM-type rotor in which magnets are arranged on an outer circumferential surface of a rotor core. One example of a motor including a rotor of an SPM structure will now be described.

First Example of SPM Structure

Figure 39:
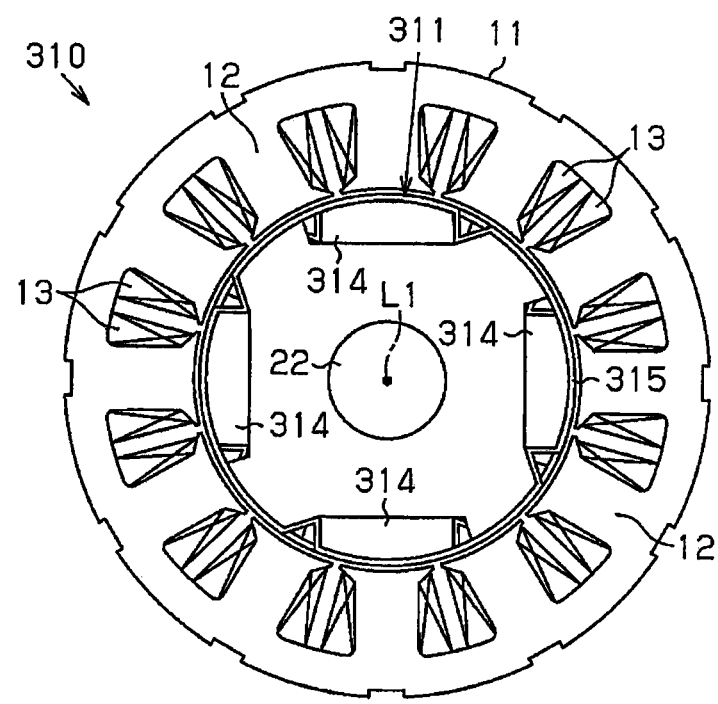
FIG. 39 is a plan view of a motor in another example.

As shown in FIG. 39, a motor 310 includes an annular stator 11, which is arranged along an inner circumferential surface of a motor housing (not shown), and a rotor 311, which is rotatably arranged in the stator 11. The stator 11 has the same structure as the stator 11 of the first embodiment and thus will not be described in detail.

Figure 41A:
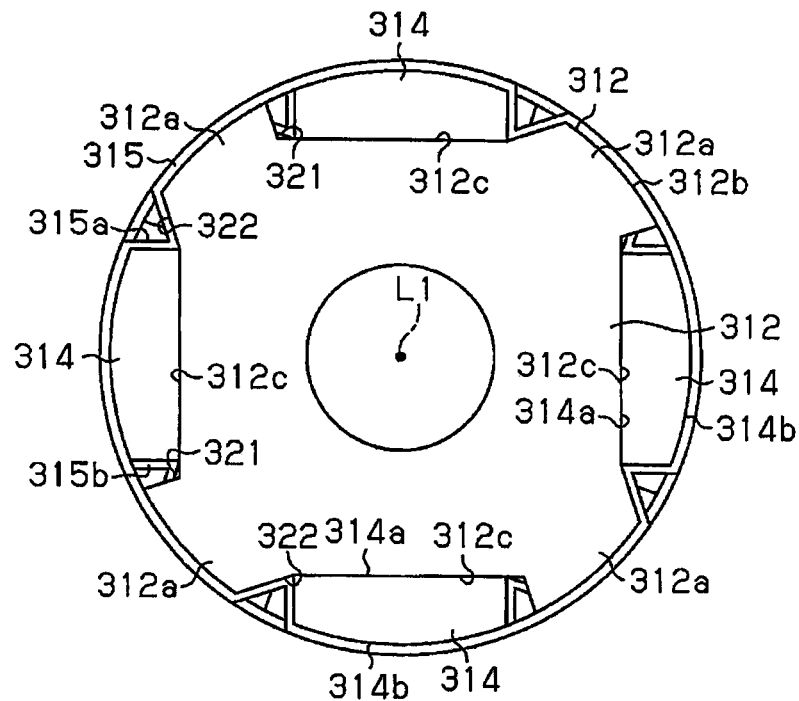
FIG. 41A is a plan view of the rotor shown in FIG. 39 as viewed from a first axial side.
Figure 41B:
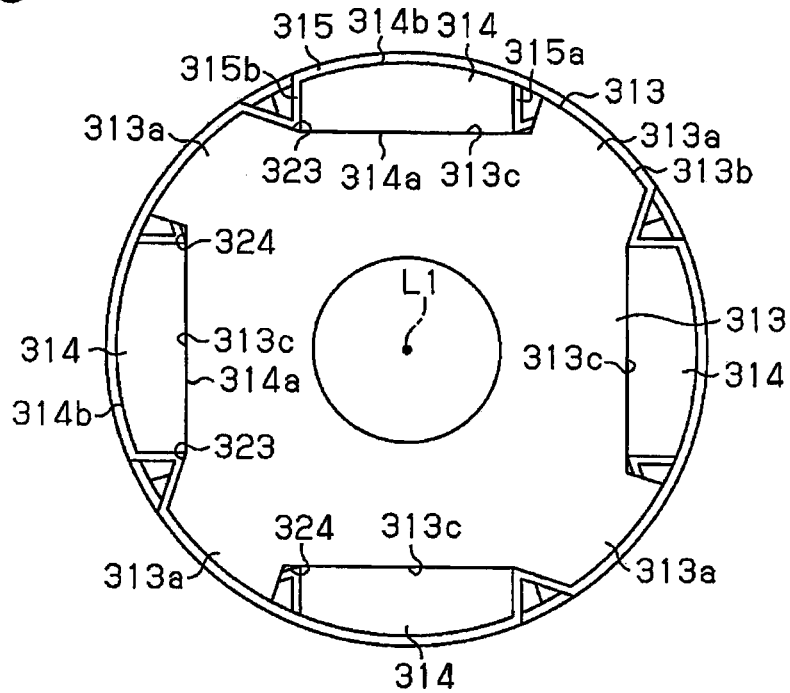
FIG. 41B is a plan view of the rotor shown in FIG. 39 as viewed from the other axial side.

As shown in FIGS. 41A and 41B, the rotor 311 includes first and second rotor cores 312 and 313, magnets 314, which form magnetic pole portions and which are coupled to outer surfaces of the rotor cores 312 and 313, and a retaining cover 315, which is arranged at the outer side of the rotor cores 312 and 313 and the magnets 314.

As shown in FIG. 41A, the first rotor core 312 includes a plurality of ferric core portions 312a, which are magnetized by the magnets 314 and function as one of magnetic poles. Each ferric core portions 312a includes an outer surface 312b extending outward in the radial direction and curved outward in the radial direction. The ferric core portion 312a is inclined toward the second circumferential side. Seat surfaces 312c are arranged between the ferric core portions 312a in the first rotor cores 312. Each seat surface 312c is flat and extends in a direction orthogonal to the radial direction as viewed from the axial direction.

As shown in FIG. 41B, in the same manner as the first rotor core 312, the second rotor core 313 includes a plurality of ferric core portions 313a, which are magnetized by the magnets 314 and function as one of magnetic poles. Each ferric core portion 313a extends outward in the radial direction includes an outer surface 313b extending outward in the radial direction. The ferric core portion 313a is inclined toward the first circumferential side. Seat surfaces 313c are arranged between the ferric core portions 313a in the second rotor core 313. Each seat surfaces 313c is flat and extends in a direction orthogonal to the radial direction as viewed from the axial direction.

Each magnet 314 includes a flat inner surface 314a and a curved outer surface 314b. When the magnet 314 is fixed to the corresponding seat surface 312c or 313c of the first or second rotor core 312 and 313, the inner surface 314a is located at an inner side in the radial direction, and the outer surface 314b is located at an outer side in the radial direction. Gaps 321, 322, 323 and 324 are formed between the magnets 314 and the ferric core portions 312a and 313a that form the magnetic pole portions.

As shown in FIGS. 41A and 41B, the gap 321 at the second circumferential side of each ferric core portion 312a has a smaller circumferential width and volume than the gap 322 at the first circumferential side of the ferric core portion 312a. The gap 323 at the second circumferential side of each ferric core portion 313a has a larger circumferential width and volume than the gap 324 at the first circumferential side of the ferric core portion 313a. The gap 321 at the circumferential second side of the ferric core portion 312a has generally the same circumferential width and volume as the gap 324 at the first circumferential side of the ferric core portion 313a. The gap 322 at the first circumferential side of the ferric core portion 312a has generally the same circumferential width and volume as the gap 323 at the second circumferential side of the ferric core portion 313a.

Figure 40:
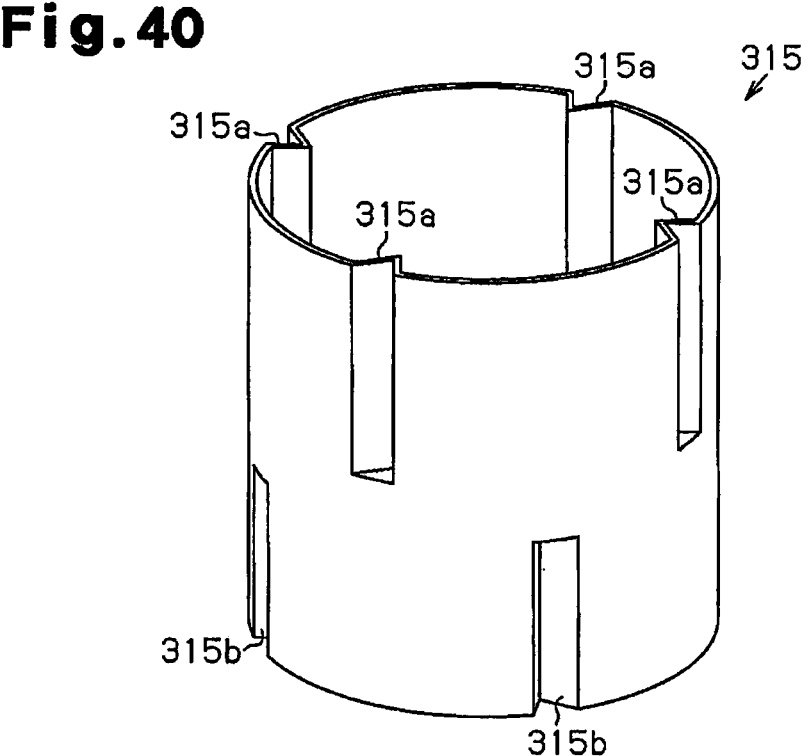
FIG. 40 is a perspective view of a magnet retaining cover of FIG. 39.

Referring to FIG. 40, the retaining cover 315 covers the first and second rotor cores 312 and 313 and the magnets 314. The retaining cover 315 is cylindrical. The retaining cover 315 includes abutment recesses 315a, which enter the gaps 322 between the ferric core portions 312a and the magnets 314 in the first rotor core 312 and abut against the gaps 322 in the circumferential direction, and abutment recesses 315b, which enter the gaps 323 between the ferric core portions 313a and the magnets 314 in the second rotor core 313 and abut against the gaps 323 in the circumferential direction. In this manner, the magnets 314 are sandwiched by the recesses 315a and 315b from opposite sides in the circumferential direction. This prevents displacement of the magnets 314 in the circumferential direction.

Figure 42:
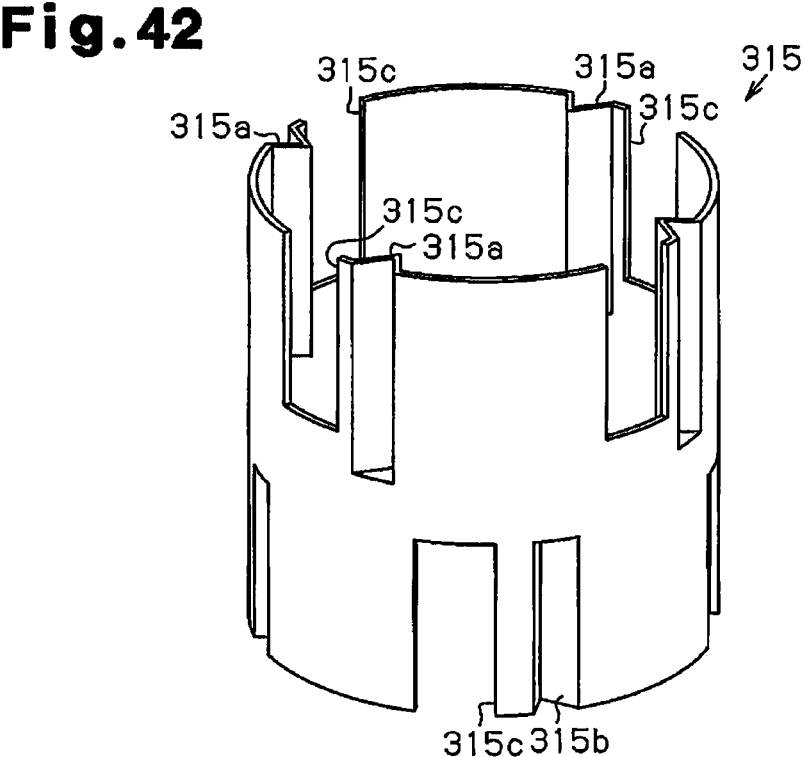
FIG. 42 is a perspective view showing a magnet retaining cover in another example.

Although the retaining cover 315 has a simple cylindrical shape, the shape is not limited in such a manner. For example, as shown in FIG. 42, cutouts 315c extending in the axial direction of the retaining cover 315 may cut through the retaining cover 315 in the radial direction.

Figure 43:
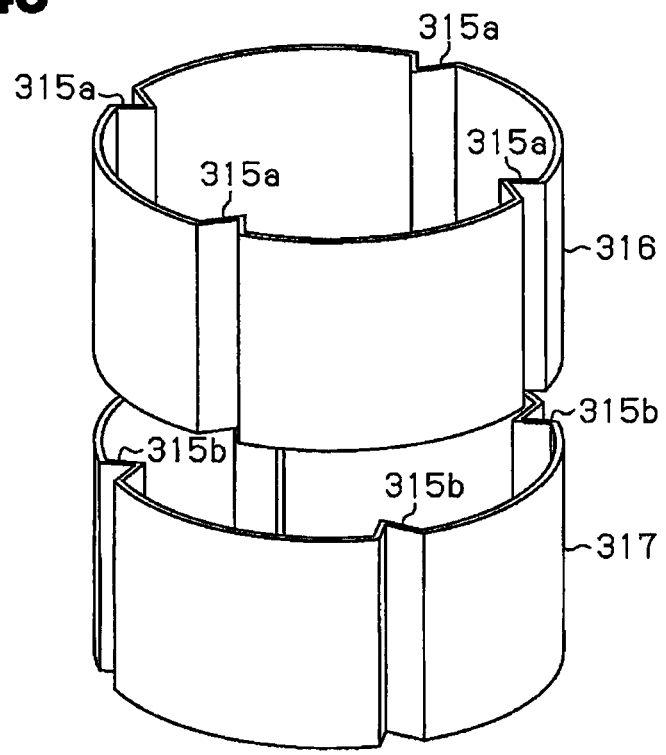
FIG. 43 is a perspective view showing a magnet retaining cover in another example.

Alternatively, as shown in FIG. 43 for example, separate retaining covers 316 and 317 may be used for the first and second rotor cores 312 and 313, respectively.

Figure 44:
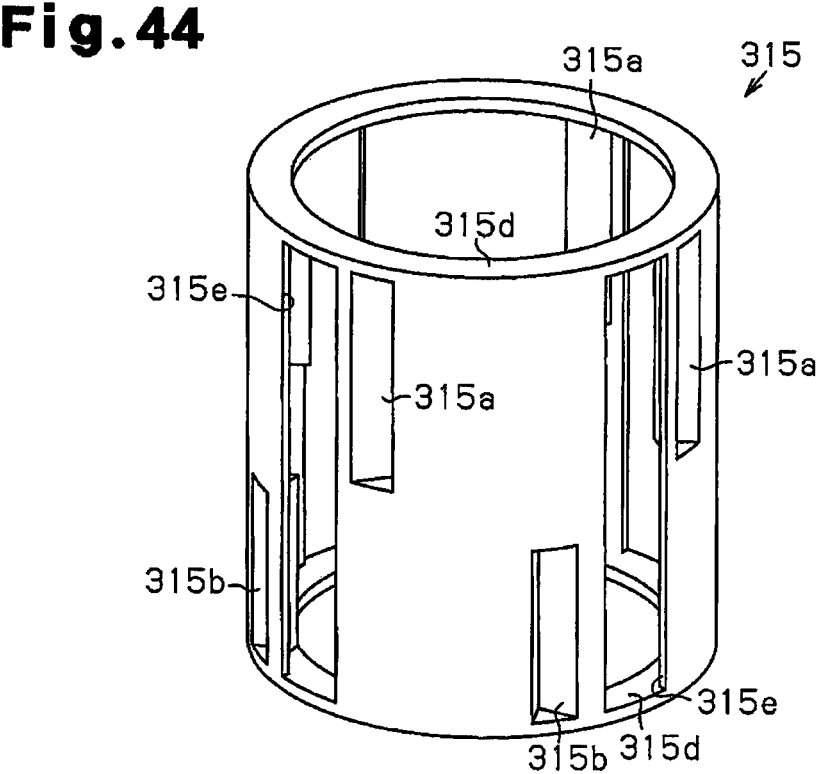
FIG. 44 is a perspective view showing a magnet retaining cover in another example.

Further, as shown in FIG. 44, abutment portions 315d may be used to abut the rotor cores 312 and 313 against each other in the axial direction and restrict movement of the rotor cores 312 and 313 in the axial direction. Further, through holes 315e may be formed at positions of the rotor cores 312 and 313 corresponding to the ferric core portions 312a and 313a.

In the first example of an IPM structure, the two types of rotor cores 312 and 313 are stacked in the axial direction of the first and second rotor cores 312 and 313 in the axial direction. However, the IPM structure may be realized with one rotor core. One example will now be described.

Second Example of SPM Structure

Figure 48:
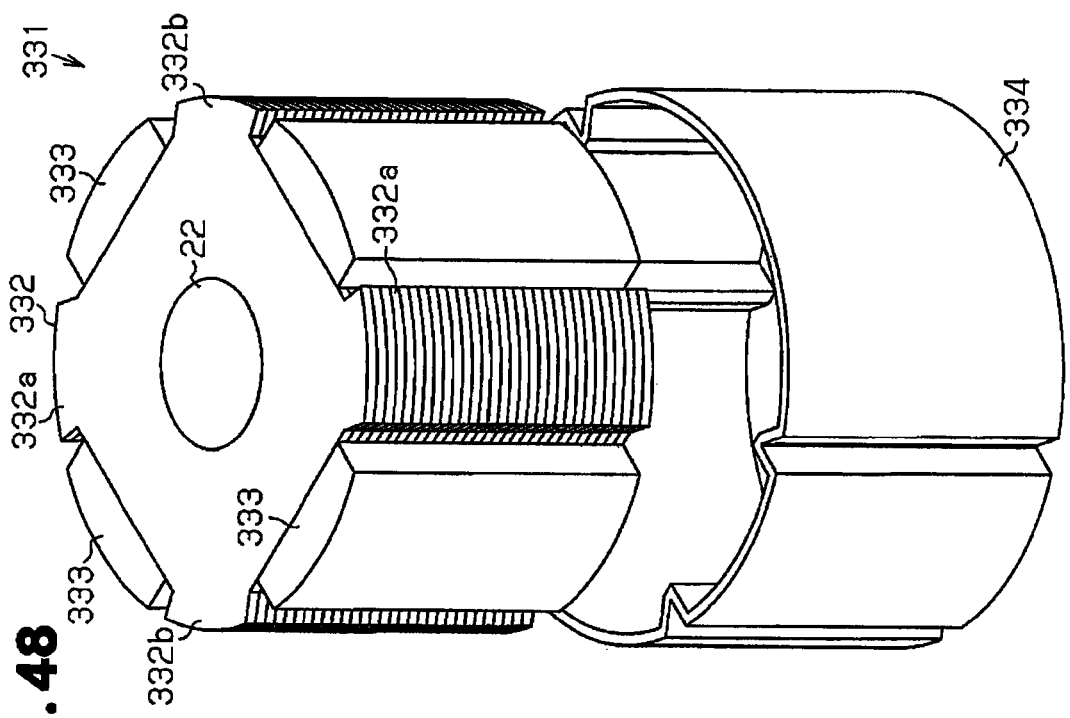
FIG. 48 is a perspective view showing how to attach the magnet retaining cover of FIG. 47.

As shown in FIG. 48, a rotor 331 includes a rotor core 332 including ferric core portions 332a and 332b, magnets 333 coupled to outer surfaces of the rotor core 332 between the ferric core portions 332a and 332b of the rotor core 332, and a retaining cover 334 arranged at the outer side of the rotor core 332 and the magnets 333.

Figure 45:
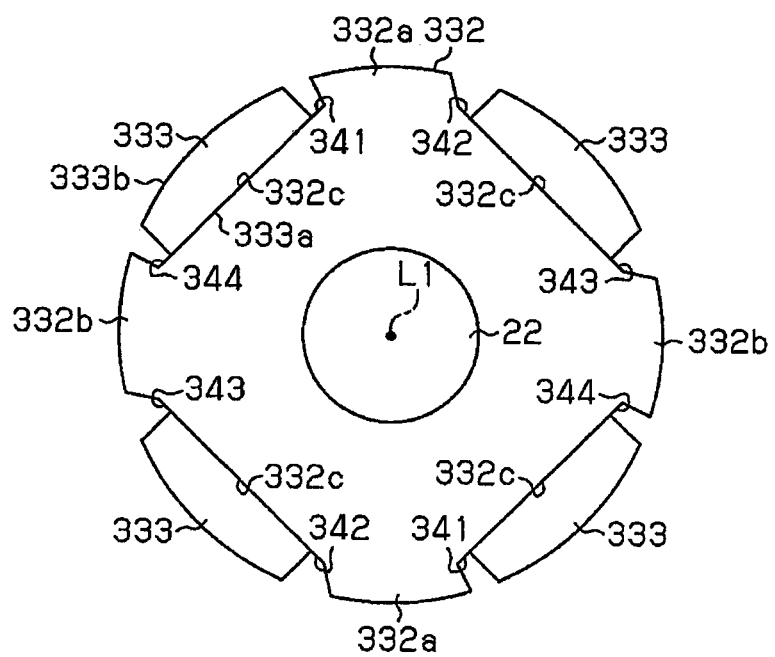
FIG. 45 is a plan view showing a rotor in another example.
Figure 46:
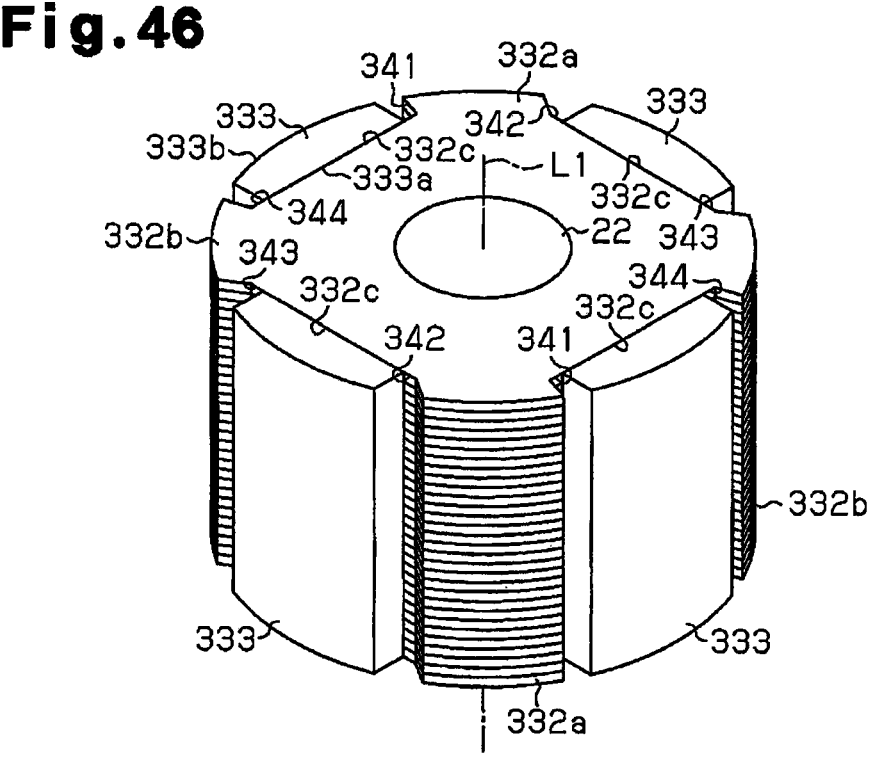
FIG. 46 is a perspective view of the rotor shown in FIG. 45.

As shown in FIGS. 45 and 46, the rotor core 332 includes the ferric core portions 332a and 332b, which are magnetized by the magnets 333 and function as one of the magnetic poles. The ferric core portions 332a are inclined toward the first circumferential side, and the ferric core portions 332b are inclined toward the second circumferential side. The rotor core 332 includes seat surfaces 332c arranged between the ferric core portions 332a and 332b in the rotor core 332. Each seat surface 332c is flat and extends in a direction orthogonal to the axial direction.

As shown in FIGS. 45 and 46, each magnet 333 includes a flat inner surface 333a and a curved outer surface 333b. When the magnet 333 is fixed to the corresponding seat surface 332c of the rotor core 332, the inner surface 333a is located at an inner side in the radial direction, and the outer surface is located at an outer side in the radial direction. Gaps 341, 342, 343 and 344 are formed between the magnets 333 and the ferric core portions 332a and 332b, which form the magnetic pole portions.

As shown in FIGS. 45 and 46, the gap 341 at the first circumferential side of each ferric core portion 332a has a smaller circumferential width and volume than the gap 342 at the second circumferential side of the ferric core portion 332a. The gap 343 formed at the first circumferential side of the ferric core portion 332b has a larger width and volume than the gap 344 formed at the second circumferential side of the ferric core portion 332b. The gap 341 formed at the first circumferential side of the ferric core portion 332a has generally the same circumferential width and volume as the gap 344 formed at the second circumferential side of the ferric core portion 332b. The gap 342 formed at the second circumferential side of the ferric core portion 332a has generally the same circumferential width and volume as the gap 343 at the first circumferential side of the ferric core portion 332b.

Figure 47:
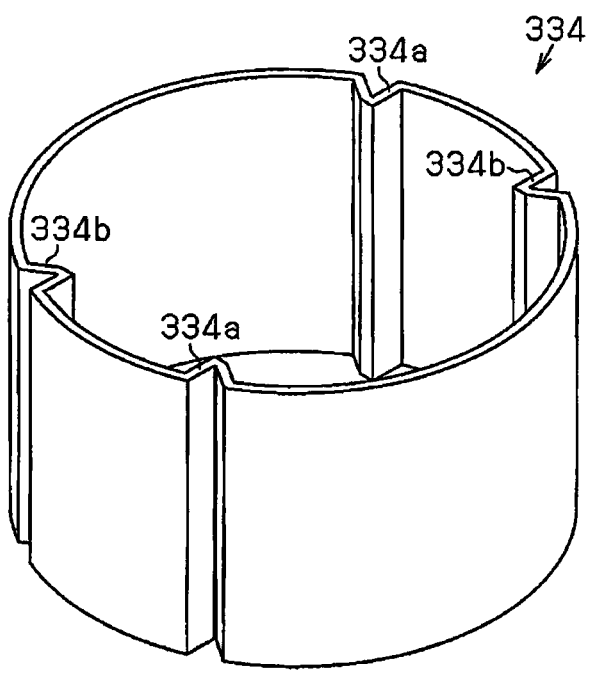
FIG. 47 is a perspective view showing the magnet retaining cover of the rotor shown in FIG. 45.

Referring to FIG. 47, the retaining cover 334 covers the rotor core 332 and the magnets 333 and is cylindrical. The retaining cover 334 includes abutment recesses 334a, which enter the gaps 342 between the ferric core portion 332a and the magnets 333 in the rotor core 332 and abut against the gaps 342 in the circumferential direction, and abutment recesses 334b, which enter the gaps 343 between the ferric core portion 332b and the magnets 333 in the rotor core 332 and abut against the gaps 343 in the circumferential direction. Thus, the magnets 333 are sandwiched by the recesses 334a and 334b from opposite sides in the circumferential direction. This prevents displacement of the magnets 333 in the circumferential direction.

The ferric core portions 332a have identical shapes and are formed at opposite sides separated from each other by 180° in the circumferential direction. The ferric core portions 332b have identical shapes and are formed at opposite sides separated from each other by 180°. This balances the weight and allows for smooth rotation of the rotor.

Figure 51:
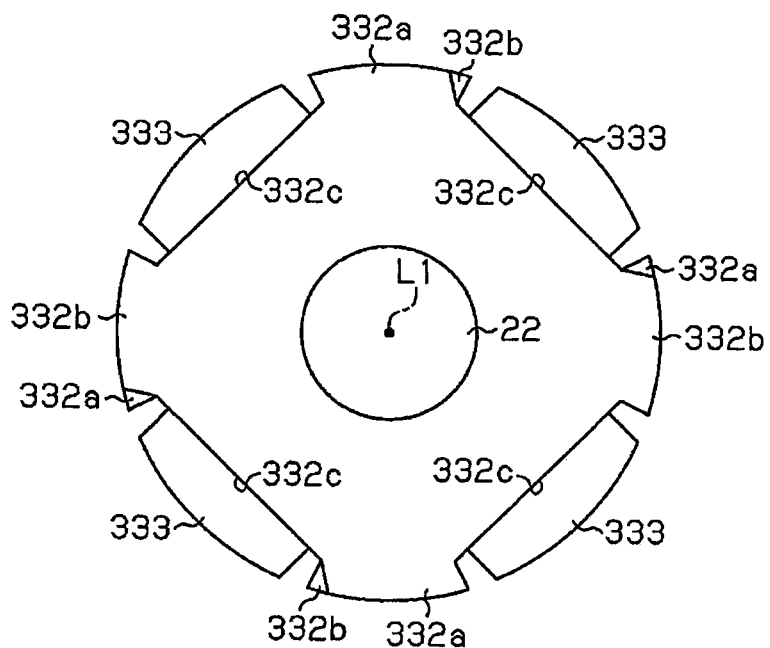
FIG. 51 is a plan view showing a rotor in another example.
Figure 52:
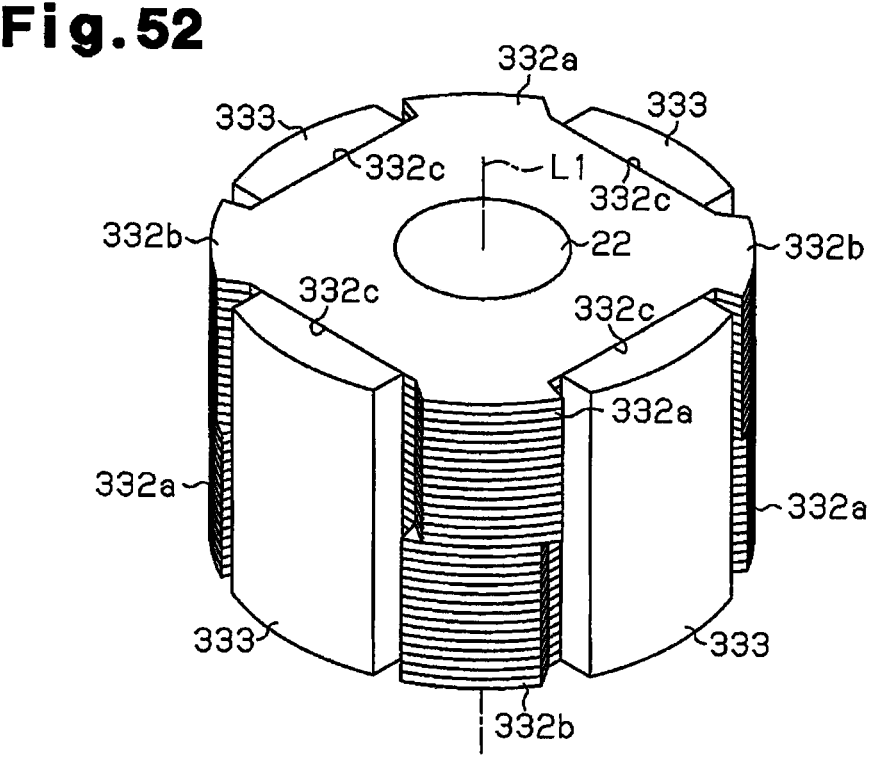
FIG. 52 is a perspective view of the rotor shown in FIG. 51.

Even when the ferric core portions 332a and 332b having identical shapes are formed at opposites sides separated from each other by 180° in the circumferential direction, core sheets may be stacked upon one another so that the ferric core portions 332a and 332b are overlapped with each other in the axial direction as shown in FIGS. 51 and 52.

Figure 49:
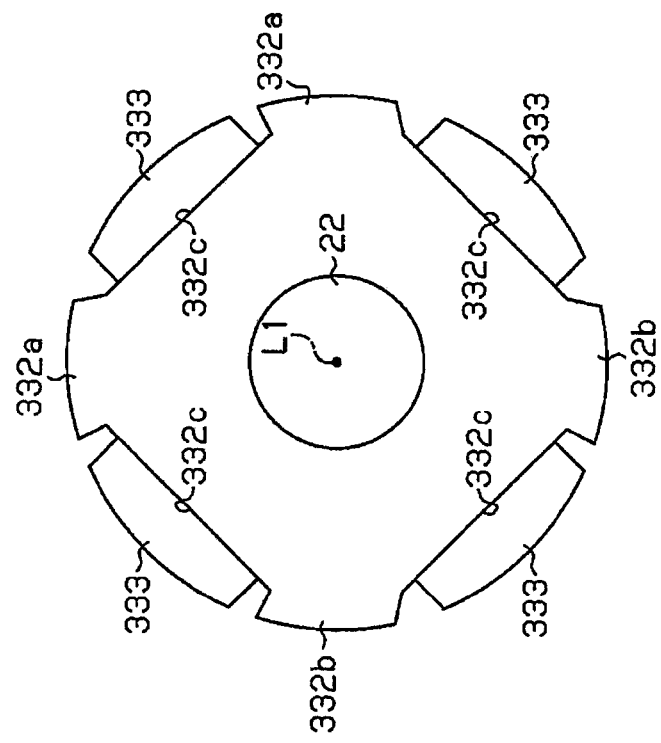
FIG. 49 is a plan view showing a rotor in another example.
Figure 50:
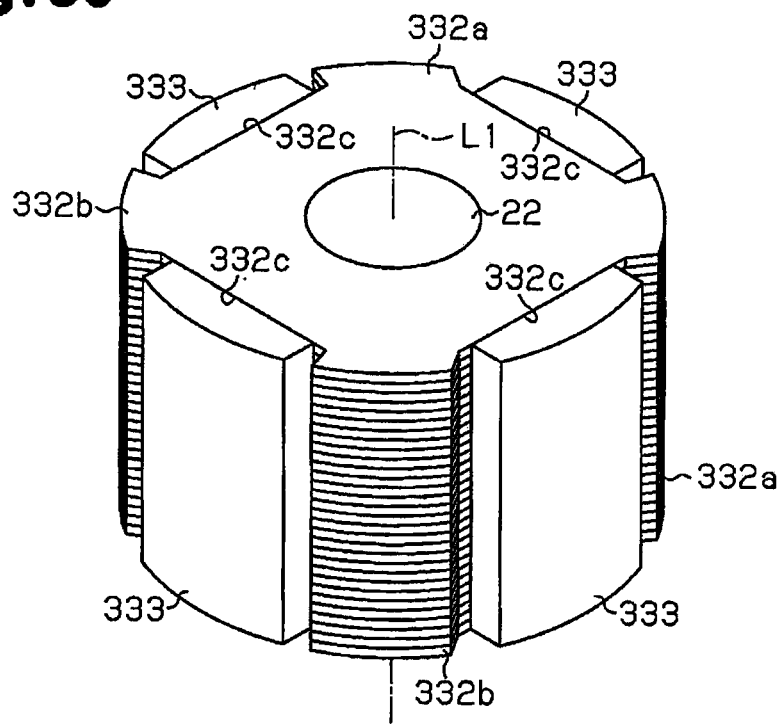
FIG. 50 is a perspective view of the rotor shown in FIG. 49.
Figure 53:
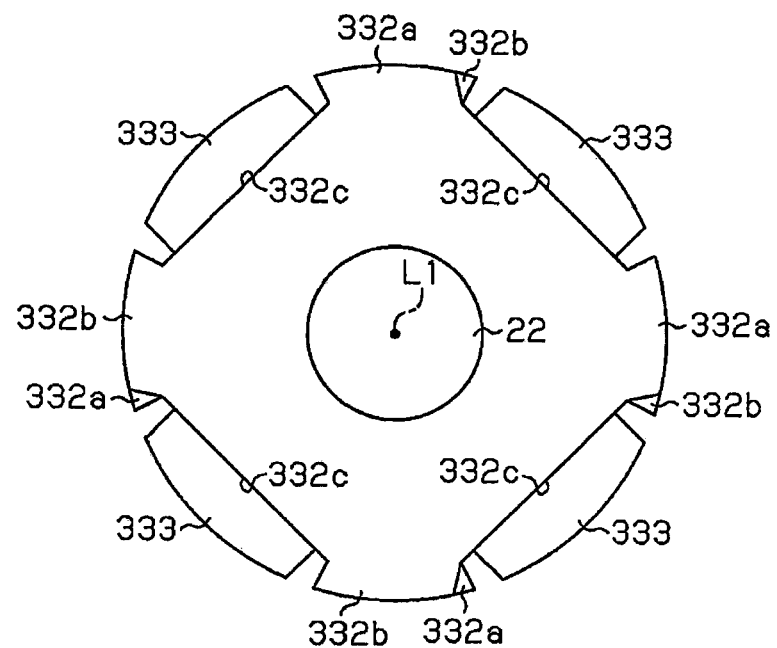
FIG. 53 is a plan view showing a rotor in another example.
Figure 54:
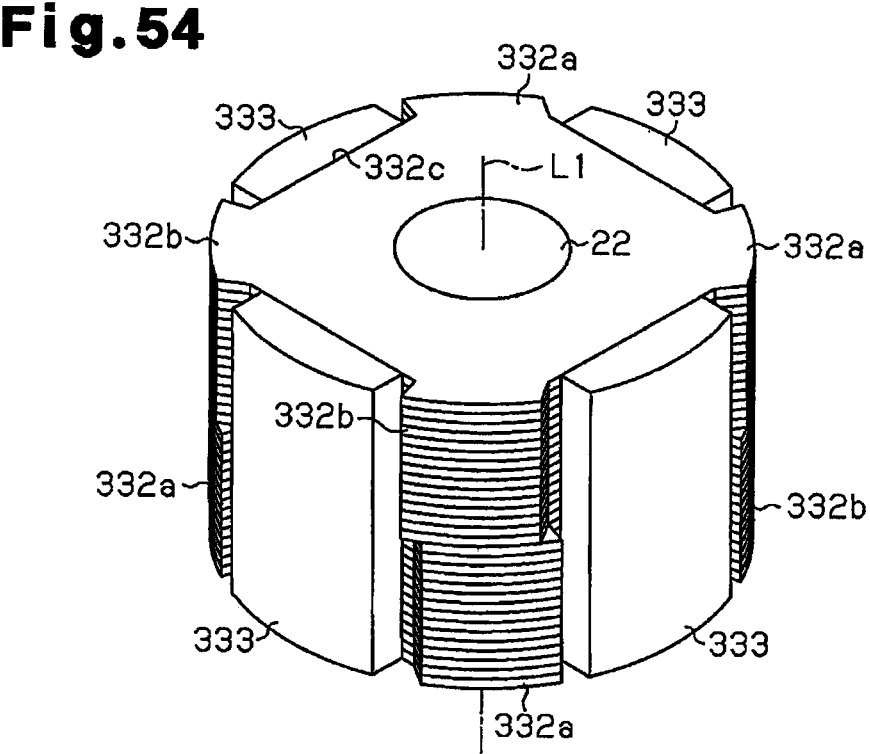
FIG. 54 is a perspective view of the rotor shown in FIG. 53.

In the second example of the IPM structure, the ferric core portions 332a having identical shapes are inclined toward the first circumferential side, located at opposite sides, and separated from each other by 180° in the circumferential direction. Further, the ferric core portions 332b having identical shapes are inclined toward the second circumferential side, located at opposite sides, and separated from each other by 180° in the circumferential direction. However, there is no limit to such a structure. As shown in FIGS. 49 and 50 for example, the ferric core portion 332b that have identical shapes may be inclined toward the second circumferential side at opposite sides separated from each other by 180° in the circumferential direction. In this case, the core sheets are stacked upon one another so that the ferric core portion 332a and the ferric core portion 332b are overlapped with each other in the axial direction as shown in FIGS. 53 and 54. This balances the weight and allows for smooth rotation of the rotor.

Figure 55:
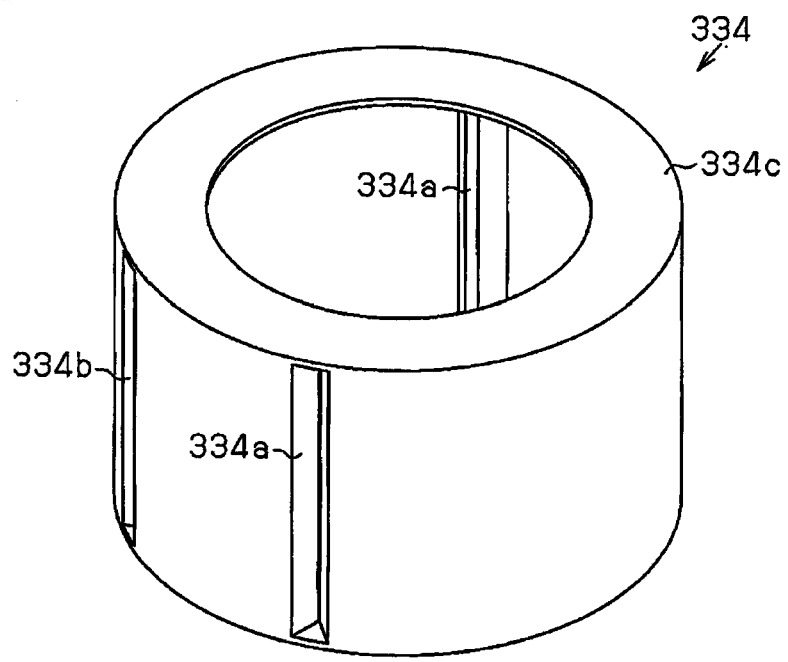
FIG. 55 is a perspective view showing a magnet retaining cover in another example.
Figure 56:
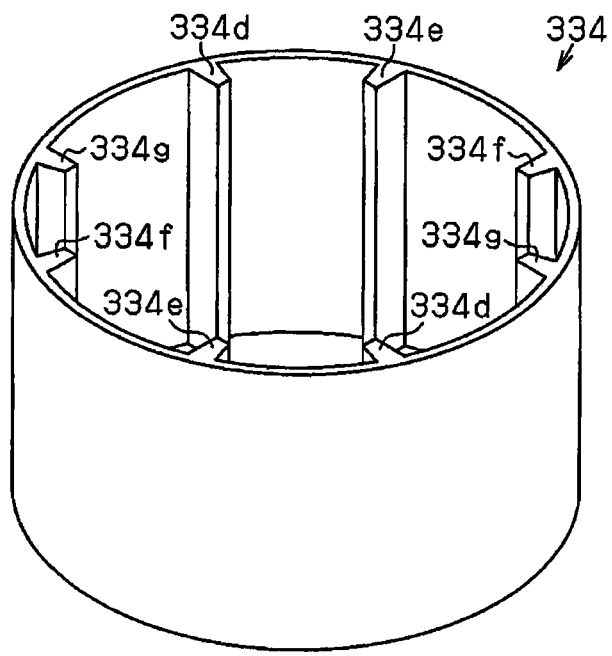
FIG. 56 is a perspective view showing a magnet retaining cover in another example.

Although the retaining cover 334 has a simple cylindrical shape, the shape is not limited in such a manner. For example, as shown in FIG. 55, the retaining cover 334 may includes abutment portions 334c that are abut against the rotor core 332 in the axial direction to restrict movement of the rotor core 332 in the axial direction.

Figure 57:
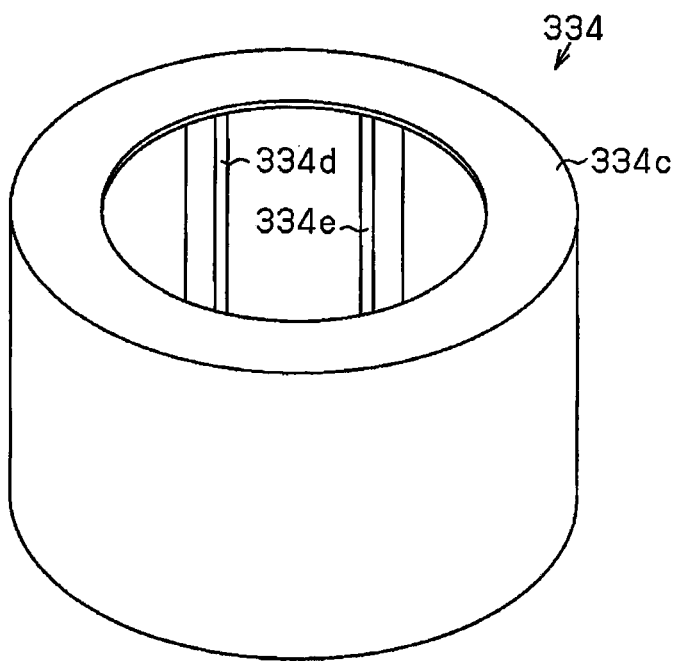
FIG. 57 is a perspective view showing a magnet retaining cover in another example.

Further, instead of the abutment recesses 334a and 334b that correspond to only one of gaps 342 and 343 of the ferric core portions 332a and 332b, the retaining cover 334 may include abutment convex portions 334d to 334g, which enter the gaps 341, 342, 343 and 344 shown in FIG. 45. In such a structure, an abutment portion 334c shown in FIG. 57 may be used.

Figure 67:
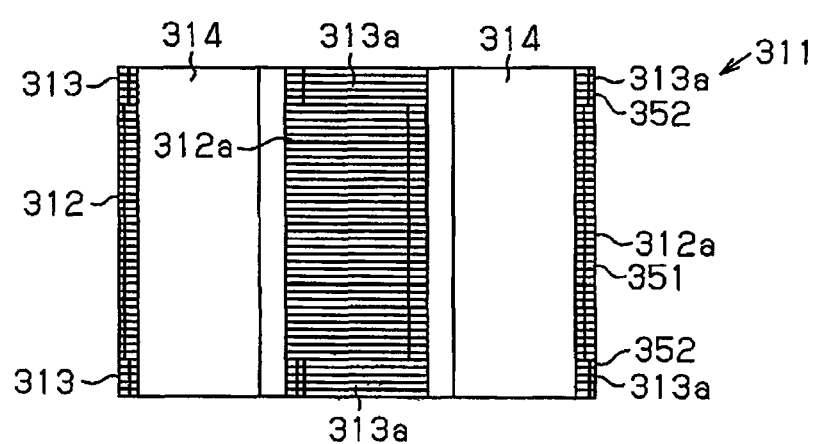
FIG. 67 is a side view showing a rotor of an SPM-type structure in another example.

Further, in the rotor of the SPM structure, when ferric core portions inclined toward the first circumferential side and ferric core portions inclined toward the second circumferential side are overlapped with each other in the stacking direction, as shown in FIGS. 64 to 67, the total length in the stacking direction of the ferric core portions 312a inclined toward the second circumferential side may differ from the total length in the stacking direction of the ferric core portions 313a inclined toward the first circumferential side. The first rotor core 312 shown in FIG. 41A is formed by stacking the core sheets 351 (see FIGS. 64 to 67) having identical shapes upon one another, and the second rotor core 313 shown in FIG. 41B is formed by stacking the core sheets 352 (see FIGS. 64 to 67) having identical shapes upon one another. Thus, the ferric core portion (first ferric core portion) 312a, which is inclined toward the second circumferential side of the first rotor core 312, is formed by stacking the core sheets 351 upon one another, and the ferric core portion (second ferric core portion) 313a, which is inclined toward the first circumferential side of the second rotor core 313, is formed by stacking the core sheets 352 upon one another. The total number of the stacked core sheets 351 forming the first ferric core portion 312a differs from the total number of the stacked core sheets 352 forming the second ferric core portion 313a. In this structure, when the rotor is operated by rated current, it is possible to set the switching pitch of induced voltage to 180° (electrical angle) and to equalize the switching pitch as shown in FIG. 59B. In this structure, the motor can rotate in two directions, and the feasibility and stability of sensorless driving (e.g., position detection using induced voltage) are enhanced. The stacking may be performed as shown in FIGS. 64 to 67. As shown in FIG. 64, the number of stacked core sheets 351 forming the first ferric core portions 312a inclined toward the second circumferential side is less than the number of stacked core sheets 352 forming the second ferric core portions 313a inclined toward the first circumferential side, and the core sheets 351 forming the first ferric core portions 312a sandwich the core sheets 352 forming the second ferric core portions 313a in the axial direction. As shown in FIG. 65, the number of stacked core sheets 351 forming the first ferric core portions 312a inclined toward the second circumferential side is less than the number of stacked core sheets 352 forming the second ferric core portions 313a inclined toward the first circumferential side, the core sheets 351 forming the first ferric core portions 312a are arranged at a first side in the stacking direction (axial direction), and the core sheets 352 forming the second ferric core portions 313a are arranged at a second side in the stacking direction. As shown in FIG. 66, the number of stacked core sheets 351 forming the first ferric core portions 312a inclined toward the second circumferential side is greater than the number of stacked core sheets 352 forming the second ferric core portions 313a inclined toward the first circumferential side, the core sheets 351 forming the first ferric core portions 312a are arranged at the first side in the stacking direction (axial direction), and the core sheets 352 forming the second ferric core portions 313a are arranged at the second side in the stacking direction. As shown in FIG. 67, the number of stacked core sheets 351 forming the first ferric core portions 312a inclined toward the second circumferential side is greater than the number of stacked core sheets 352 forming the second ferric core portions 313a inclined toward the first circumferential side, and the core sheets 352 forming the second ferric core portions 313a sandwich the core sheets 351 forming the first ferric core portions 312a in the axial direction.

The ferric core portions are formed so that the ferric core portions having identical shapes are arranged at opposite sides and separated by 180° in the circumferential direction. This balances the weight and allows for smooth rotation of the rotor.

Fourth Embodiment

A fourth embodiment of the present invention will now be described with reference to the drawings.

Parts that are the same structures as the first embodiment will not be described in detail.

Figure 68:
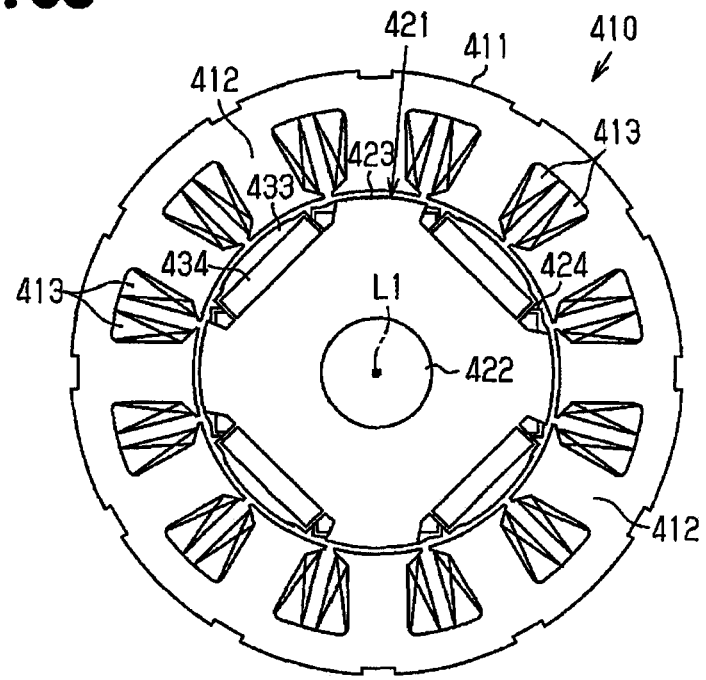
FIG. 68 is a schematic plan view showing a motor according to a fourth embodiment.

As shown in FIG. 68, a motor 410 includes an annular stator 411, which is arranged along an inner circumferential surface of a motor housing (not shown), and a rotor 421, which is rotatably arranged in the stator 411.

Figures 69A, 69B:
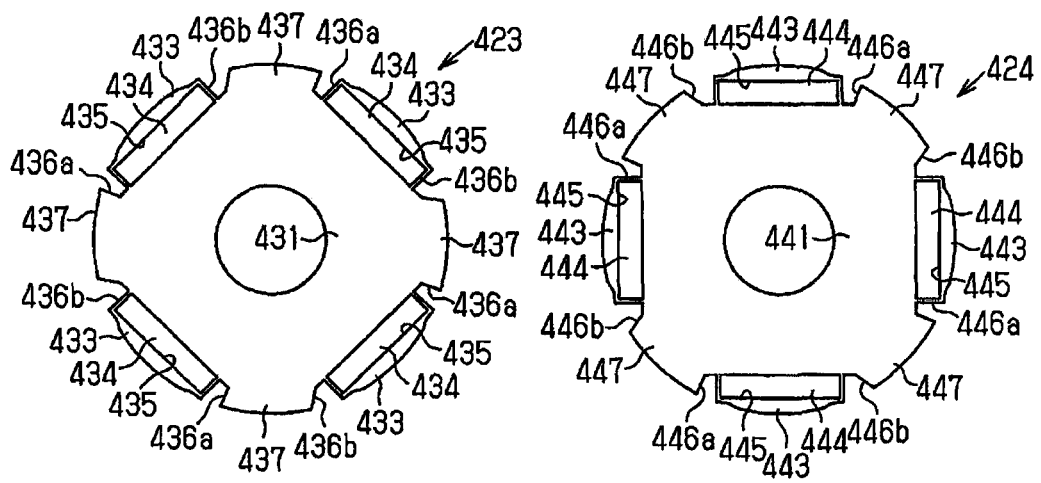
FIGS. 69A and 69B are plan views showing the rotor of the fourth embodiment.
Figure 70:
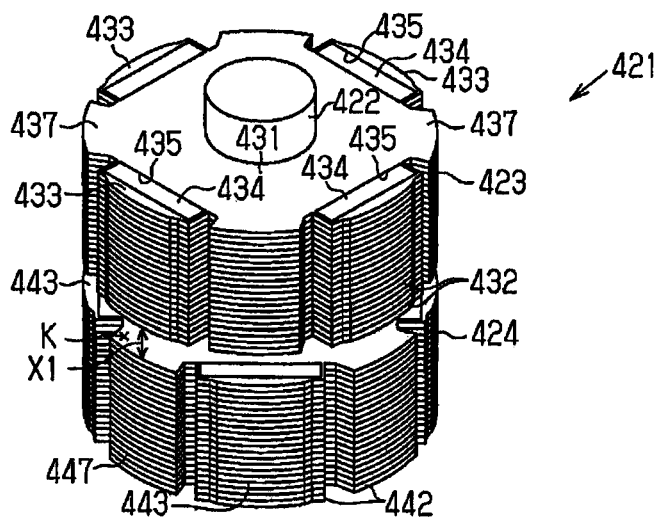
FIG. 70 is a perspective view of the rotor in the fourth embodiment.

As shown in FIGS. 68 to 70, the rotor 421 of the fourth embodiment includes a rotation shaft 422 and first and second rotor portions 423 and 424, which are fixed to the rotation shaft 422.

As shown in FIGS. 69 and 70, the first rotor portion 423 includes a cylindrical rotor core 431 fixed to the rotation shaft 422.

As shown in FIG. 70, the rotor core 431 is formed by stacking a plurality of core sheets 432 having generally identical shapes. A peripheral part of the rotor core 431 includes a plurality of magnetic pole portions 433 opposed, in the radial direction, to teeth 412 (see FIG. 68) of the stator 411 surrounding the rotor core 431.

More specifically, in the present embodiment, as shown in FIGS. 68 to 70, each magnetic pole portion 433 is formed by embedding a planar magnet 434 in the peripheral part of the rotor core 431. Magnet receptacles 435 are formed in the peripheral part of the rotor core 431 extending in the axial direction and are arranged at equal intervals (intervals of generally 90° in the present embodiment) in the circumferential direction. Each magnetic pole portion 433 is formed by accommodating and fixing a magnet 434 in the corresponding magnet receptacle 435 in a direction orthogonal to the radial direction of the rotor core 431.

The magnets 434 are arranged so that polarities of magnetic pole surfaces located outward in the radial direction of the rotor core 431 are the same (south poles, for example). In this structure, the four magnetic pole portions 433 having the same polarities (south poles) are formed at generally equal intervals (intervals of 90°) in the circumferential direction of the first rotor portion 423.

Two gaps 436a and 436b are formed at both circumferential sides of each magnetic pole portion 433. The gaps 436a and 436b form magnetic resistance. This forms ferric core portions 437, which are magnetically partitioned from the magnetic pole portions 433 in the circumferential direction, between the magnetic pole portions 433.

More specifically, the magnetic flux of the magnetic pole portions 433 enters the ferric core portions 437 through the interior of the rotor core 431 bypassing the gaps 436a and 436b formed at the two circumferential sides of each magnetic pole portion 433. Since the magnetic flux passes through the ferric core portion 437 outward in the radial direction, a pseudo-magnetic pole having a polarity differing from that of the adjacent magnetic pole portion 433 is formed in each ferric core portion 437. In this manner, the first rotor portion 423 of this embodiment is a so-called consequent pole type rotor.

As shown in FIGS. 69A and 70, each ferric core portion 437 of the rotor core 431 is inclined toward the first circumferential side. The ferric core portion 437 is formed so that the gaps 436a are located at the second circumferential side (clockwise direction in FIGS. 69A and 69B), the gaps 436b are located at the first circumferential side (counterclockwise direction in FIGS. 69A and 69B), and the outer side of the ferric core portion 437 in the radial direction is inclined toward the second circumferential side (clockwise direction in FIGS. 69A and 69B). The magnetic center of the ferric core portion 437 is also inclined at the same inclination angle as the ferric core portion 437.

As shown in FIGS. 69B and 70, the second rotor portion 424 includes a cylindrical rotor core 441 fixed to the rotation shaft 422.

As shown in FIG. 70, the rotor core 441 is formed by stacking a plurality of core sheets 442 having generally identical shapes. A peripheral part of the rotor core 441 includes a plurality of magnetic pole portions 443. The magnetic pole portions 443 are opposed, in the radial direction, to the teeth 412 (see FIG. 68) of the stator 411 which surround the rotor core 441.

More specifically, in this embodiment as shown in FIGS. 68 to 70, each magnetic pole portion 443 is formed by embedding a planar magnet 444 in the peripheral part of the rotor core 441. Magnet receptacles 445 are formed in the peripheral part of the rotor core 441 extending in the axial direction and are arranged at equal intervals (intervals of generally 90° in the present embodiment) in the circumferential direction. Each magnetic pole portion 443 is formed by accommodating and fixing a magnet 444 in the corresponding magnet receptacle 445 in a direction orthogonal to the radial direction of the rotor core 441.

The magnets 444 are arranged so that polarities of magnetic pole surfaces located outward in the radial direction of the rotor core 441 are the same (north poles, for example) as the magnets 434. In this structure, the four magnetic pole portions 443 having the same polarities (north poles) are formed at generally equal intervals (intervals of 90°) in the circumferential direction of the second rotor portion 424.

Two gaps 446a and 446b are formed at both circumferential sides of each magnetic pole portion 443. The gaps 446a and 446b form magnetic resistance. This forms ferric core portions 447, which are magnetically partitioned from the magnetic pole portions 443 in the circumferential direction, between the magnetic pole portions 443.

More specifically, in the same manner as the magnetic pole portions 433, the magnetic flux of the magnetic pole portions 443 enters the ferric core portions 447 through the interior of the rotor core 441 bypassing the gaps 446a and 446b formed at the two circumferential sides of each magnetic pole portion 443. Since the magnetic flux passes through the ferric core portion 447 outward in the radial direction, a pseudo-magnetic pole having a polarity differing from that of the adjacent magnetic pole portion 443 is formed in each ferric core portion 447. In this manner, the second rotor portion 424 of this embodiment is a so-called consequent pole type rotor.

As shown in FIGS. 69B and 70, each ferric core portion 447 of the rotor core 441 is inclined toward the first circumferential side. The ferric core portion 447 is formed so that the gaps 446a are located at the first circumferential side (counterclockwise direction in FIG. 69B), the gaps 446b are located at the second circumferential side (clockwise direction in FIG. 69B), and an outer side of the ferric core portion 447 in the radial direction is inclined toward the first circumferential side (counterclockwise direction in FIG. 69B). The magnetic center of the ferric core portion 447 is also inclined at the same inclination angle as the ferric core portion 447. There are four ferric core portions 447 like the first rotor portion 423 that has four ferric core portions 437.

The first and second rotor portions 423 and 424 are arranged so that the magnetic pole portions 433 of the first rotor portion 423 are overlapped in the axial direction with the ferric core portions 447 of the second rotor portion 424 having the same polarities as the magnetic pole portions 433 and so that the magnetic pole portions 443 of the second rotor portion 424 are overlapped in the axial direction with the ferric core portions 437 of the first rotor portion 423 having the same polarities as the magnetic pole portions 443.

As shown in FIG. 70, the first rotor portion 423 and the second rotor portion 424 are overlapped in the axial direction separated by an axial gap K, which serves as a magnetic resistance portion having an axial length X1. Polarities (south poles) of the magnetic pole portions 433 in the first rotor portion 423 differ from the polarities (north poles) of the magnetic pole portions 443 in the second rotor portion 424.

The first rotor portion 423 and the second rotor portion 424 are symmetric in shape and can be obtained by reversing the first and second rotor portions 423 and 424 about circumferential centers of the ferric core portions 437 and 447. In other words, when the positional relationship of the ferric core portions 437 in the first rotor portion 423 and the gaps 436a and 436b that are adjacent in the circumferential direction is reversed, the shape of the ferric core portion 437 of the first rotor portion 423 becomes the same as the ferric core portion 447 of the second rotor portion 424. Thus, the total circumferential width of the gaps 436a and 446b at the first circumferential side of the ferric core portions 437 and 447 in the rotor cores 431 and 441 is set to be equal to the total circumferential width of the gaps 436b and 446a at the second circumferential side of the ferric core portions 437 and 447 in the rotor cores 431 and 441.

The operation of the present embodiment will now be described.

When current is supplied to the winding 413 of the stator 411, the motor 410 of the present embodiment generates a rotating magnetic field that rotates the rotor 421. This rotates the rotor 421.

Figure 71:
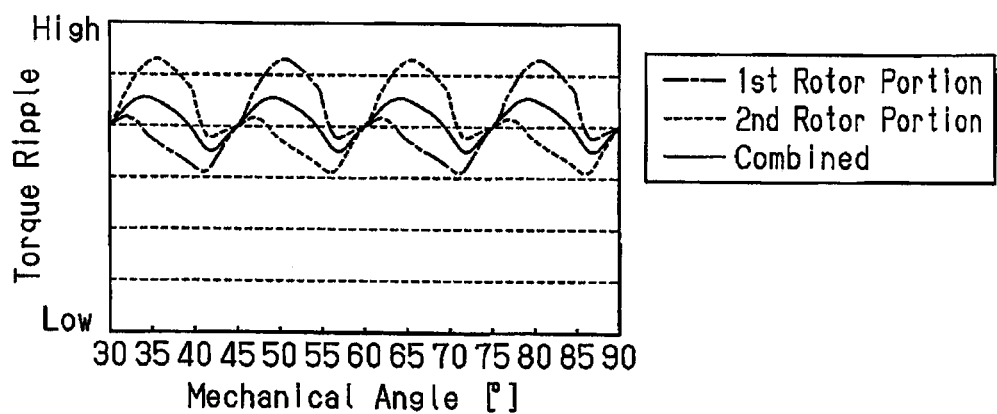
FIG. 71 is a graph of the cogging torque in the motor of the fourth embodiment.
Figure 72:
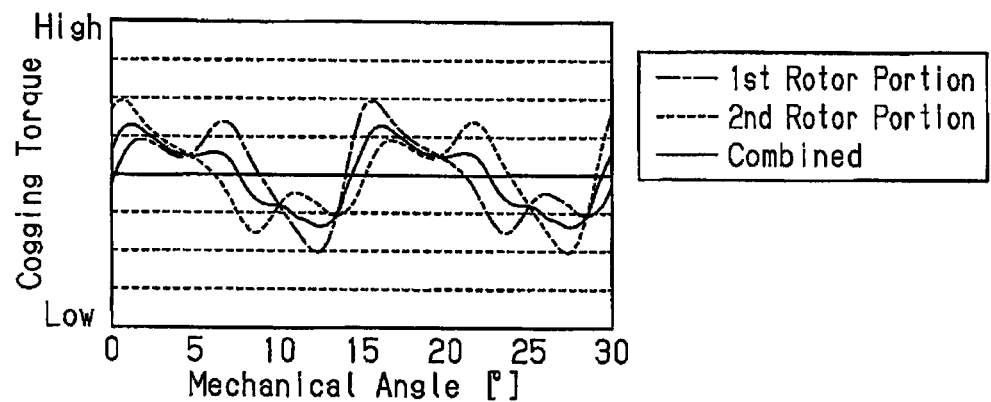
FIG. 72 is a graph of the torque ripple in the motor of the fourth embodiment.

The rotor core 431 of the first rotor portion 423 includes the ferric core portions 437, which are inclined toward the second circumferential side, and the rotor core 441 of the second rotor portion 424 includes the ferric core portions 447, which are inclined toward the circumferential side (one side in the circumferential direction) opposite to the side the ferric core portion 437 are included. This separates the torque ripples and peak values of cogging torques caused by the ferric core portions 437 and 447 as shown in FIGS. 71 and 72. Further, this cancels out the cogging torques caused by the ferric core portions 437 and 447 and suppress the torque ripples and cogging torques in the entire rotor 421.

The advantages of the fourth embodiment will now be described.

(5) The fourth embodiment includes the first rotor portion 423 having the magnetic pole portions 433, which are the south poles, and the second rotor portion 424, which is overlapped in the axial direction with the first rotor portion 423 through the axial gap K that serves as a magnetic resistance. The first rotor portion 423 includes the magnetic pole portions 443 having polarities (north poles) that differ from the first rotor portion 423. In this manner, the first rotor portion 423 and the second rotor portion 424 include the magnetic pole portions 433 and 443, which generate magnetic flux and have different polarities. This balances the magnetic force. The magnetic pole portions 433 of the first rotor portion 423 and the ferric core portions 447 of the second rotor portion 424 having the same polarity as the magnetic pole portions 433 are overlapped with each other in the axial direction, and the magnetic pole portions 443 of the second rotor portion 424 and the ferric core portions 437 of the first rotor portion 423 having the same polarity the magnetic pole portions 443 are overlapped with each other in the axial direction. The ferric core portions include the ferric core portions 437, which are inclined toward the second circumferential side, and the ferric core portions 447, which are inclined toward the first circumferential side. This separates the peaks in the cogging torques with the ferric core portions 437, which are inclined toward the second circumferential side, and the ferric core portions 447, which are inclined toward the first circumferential side, and thereby suppress the cogging torque of the entire rotor 421.

(6) The ferric core portions 437 inclined toward the second circumferential side are formed only in the first rotor portion 423, and the ferric core portions 447 inclined toward the first circumferential side are formed only in the second rotor portion 424. This simplifies the shapes of the rotor portions 423 and 424.

(7) The axial gap K is employed as the magnetic resistance portion between the first rotor portion 423 and the second rotor portion 424. Thus, the rotor portions 423 and 424 can be magnetically separated from each other without using a member serving as the magnetic resistance portion.

(8) The rotor cores 431 and 441 are formed by stacking the core sheets 432 and 442 that have the same shapes. Thus, there is no need to use core sheets having different shapes and reduces the number of types of parts. This prevents an increase in the number of steps for pressing and forming the core sheets.

Fifth Embodiment

A fifth embodiment of the present invention will now be described with reference to the drawings. The fifth embodiment differs from the fourth embodiment in the shapes of the first and second rotor portions. More specifically, in the fourth embodiment, the first and second rotor portions 423 and 424 include the ferric core portions 437 and 447 that are inclined in the same direction. In the fifth embodiment, each rotor portion includes two types of ferric core portions inclined in different directions. The difference from the fourth embodiment will now be described in detail. Like or same reference numerals are given to those components that are the same as the corresponding components of the fourth embodiment. Such components will not be described in detail.

As shown in FIGS. 73A to 74, a rotor 421 of the fifth embodiment includes a first rotor portion 451 and a second rotor portion 452, which is overlapped with the first rotor portion 451 in the axial direction with an axial gap K serving as a magnetic resistance located in between.

As shown in FIG. 73A, the magnetic pole portions 455 of the first rotor portion 451 includes first magnetic pole portions 455a and second magnetic pole portions 455b. Two gaps 456a are formed at both circumferential side of each first magnetic pole portion 455a, and two gaps 456b are formed at both circumferential sides of each second magnetic pole portion 455b. Each gap 456b has a circumferential width that differs from that of the gap 456a. Ferric core portions located between the magnetic pole portions 455a and 455b in the circumferential direction include first ferric core portions 457a, which are inclined toward the first circumferential side, and second ferric core portions 457b, which are inclined toward the second circumferential side. The first ferric core portion 457a is formed so that the gap 456a is located at the second circumferential side (clockwise direction in FIG. 73A), the gap 456b is located at the first circumferential side (counterclockwise direction in FIG. 73A), and the first ferric core portion 457a is inclined toward the first circumferential side (counterclockwise direction in FIG. 73A). The second ferric core portion 457b is formed so that the gap 456b is located at the second circumferential side (clockwise direction in FIG. 73A), the gap 456a is located at the first circumferential side (counterclockwise direction in FIG. 73A), and the second ferric core portion 457b is inclined toward the second side the circumferential direction (clockwise direction in FIG. 73A). In this manner, the first rotor portion 451 includes the ferric core portions 457b, which are inclined toward the second circumferential side, and the ferric core portions 457a, which are inclined toward the first circumferential side, on the same plane that is orthogonal to the axial direction.

As shown in FIG. 73B, the magnetic pole portions 458 of the second rotor portion 452 include first magnetic pole portions 454a and second magnetic pole portions 458b. Two gaps 459a are formed at both circumferential sides of each first magnetic pole portion 458a, and two gaps 459b are formed at both circumferential sides of each second magnetic pole portion 458b. Each gap 459b has a circumferential width that differs from that of the gap 459a. Ferric core portions located between the magnetic pole portions 458a and 458b in the circumferential direction include first ferric core portions 460a, which are inclined toward the first circumferential side, and second ferric core portions 460b, which are inclined toward the second circumferential side. The first ferric core portion 460a is formed so that the gap 459a is located at the second circumferential side (clockwise direction in FIG. 73B), the gap 459b is located at the first circumferential side (counterclockwise direction in FIG. 73B), and the first ferric core portion 460a is inclined toward the first circumferential side (counterclockwise direction in FIG. 73B). The second ferric core portion 460b is formed so that the gap 459b is located at the second circumferential side (clockwise direction in FIG. 73B), the gap 459a is located at the first circumferential side (counterclockwise direction in FIG. 73B), and the second ferric core portion 460b is inclined toward the second side the circumferential direction (clockwise direction in FIG. 73B). That is, the second rotor portion 452 includes the ferric core portions 460b, which are inclined toward the second circumferential side, and the ferric core portions 457a, which are inclined toward the first circumferential side, on the same plane that is orthogonal to the axial direction.

The first and second rotor portions 451 and 452 are arranged so that the first magnetic pole portions 455a of the first rotor portion 451 and the first ferric core portions 460a of the second rotor portion 452 having the same polarities as the magnetic pole portions 455a are overlapped with each other in the axial direction. The second magnetic pole portions 455b of the first rotor portion 451 and the second ferric core portions 460b of the second rotor portion 452 having the same polarities as the magnetic pole portions 455b are overlapped with each other in the axial direction. The first magnetic pole portions 458a of the second rotor portion 452 and the first ferric core portions 457a of the first rotor portion 451 having the same polarities as the magnetic pole portions 458a are overlapped with each other in the axial direction. The second magnetic pole portions 458b of the second rotor portion 452 and the second ferric core portions 457b of the first rotor portion 451 having the same polarities as the magnetic pole portions 458b are overlapped with each other in the axial direction.

As shown in FIG. 74, the first and second rotor portions 451 and 452 are overlapped with each other in the axial direction through the axial gap K, which serves as the magnetic resistance and has the axial length X1. The polarity (e.g., south pole) of the magnetic pole portions 455a and 455b in the first rotor portion 451 differs from the polarity (e.g., north poles) of the magnetic pole portions 458a and 458b in the second rotor portion 452.

The operation of the present embodiment will now be described.

Figure 75:
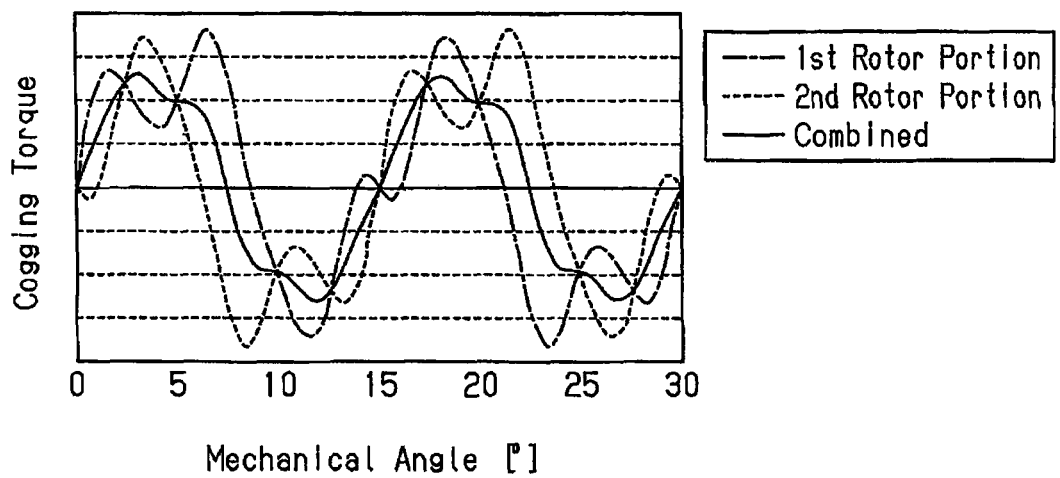
FIG. 75 is a graph of the cogging torque in the motor of the fifth embodiment.
Figure 76:
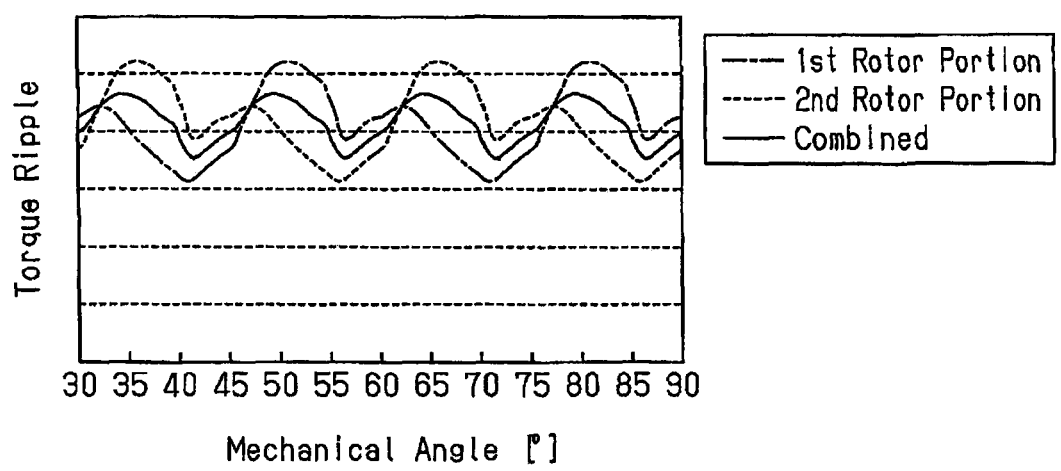
FIG. 76 is a graph of the torque ripple in the motor of the fifth embodiment.

In the motor 410 of the present embodiment, the first rotor portion 451 includes the ferric core portions 457a, which are inclined toward the first circumferential side, and the ferric core portions 457b, which are inclined toward the second circumferential side, and the second rotor portion 452 includes the ferric core portions 460a, which are inclined toward the first circumferential side, and the ferric core portions 460b, which are inclined toward the second circumferential side. As shown in FIGS. 75 and 76, this separates the torque ripples and peak values of the cogging torques caused by the ferric core portions 457a, 457b, 460a and 460b. This cancels out the cogging torques caused by the ferric core portions 457a, 457b, 460a and 460b cancel and suppresses the torque ripples and the cogging torques in the entire rotor 421.

In addition to advantages (7) and (8) of the fourth embodiment, the fifth embodiment has the following advantage.

(9) The first and second rotor portions 451 and 452 include the ferric core portions 457b and 460b, which are inclined toward the second circumferential side, and the ferric core portions 457a and 460a, which are inclined toward the first circumferential side, on the same plane that is orthogonal to the axial direction. This allows for the formation of the rotor portions 451 and 452 without using different types of rotor cores in the rotor portions 451 and 452.

The fourth and fifth embodiments of the present invention may be modified as described below.

The invention is not limited to the fourth and fifth embodiments, and first and second rotor portions of the following structures (J) to (L) may be employed.

Structure J

Figures 77A, 77B:
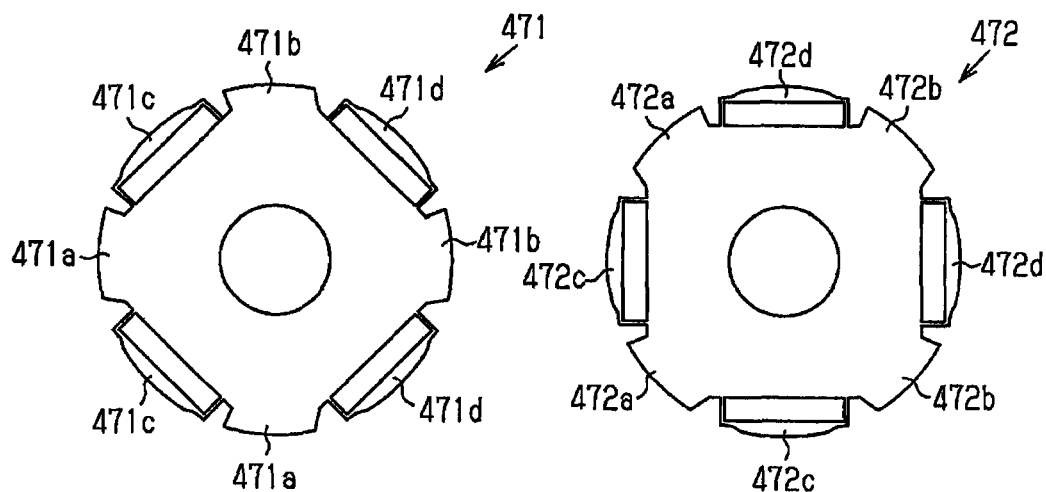
FIGS. 77A and 77B are plan views showing a rotor in another example.
Figure 78:
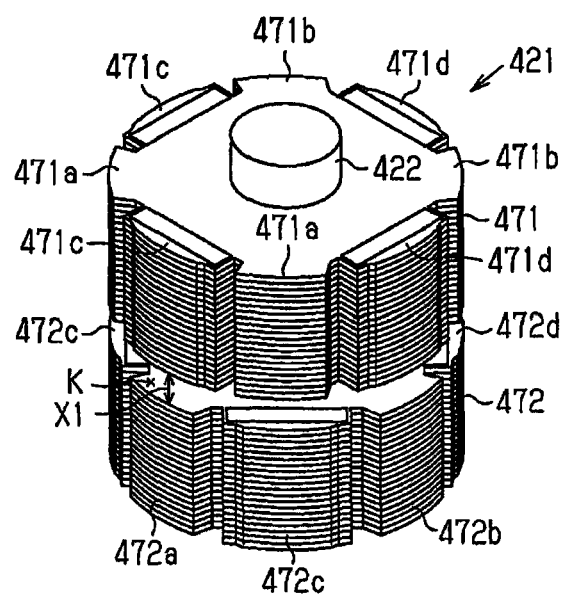
FIG. 78 is a perspective view showing the rotor of the example.

As shown in FIGS. 77A and 77B, a first rotor portion 471 includes first ferric core portions 471a, which are inclined toward the second circumferential side, and second ferric core portions 471b, which are inclined toward the second circumferential side. Each second ferric core portion 471b is located on the opposite side of a first ferric core portion 471a and separated by 180° in the circumferential direction. A second rotor portion 472 includes first ferric core portions 472a, which are inclined toward the second circumferential side, and second ferric core portions 472b, which are inclined toward the first circumferential side. Each second ferric core portion 472b is located on the opposite side of a first ferric core portions 472a and separated by 180° in the circumferential direction. The first and second rotor portions 471 and 472 are arranged so that first magnetic pole portions 471c of the first rotor portion 471 and first ferric core portions 472a of the second rotor portion 472 having the same polarities as the magnetic pole portions 471c are overlapped with each other in the axial direction. Second magnetic pole portions 471d of the first rotor portion 471 and the second ferric core portions 472b of the second rotor portion 472 having the same polarities as the magnetic pole portions 471d are overlapped with each other in the axial direction. First magnetic pole portions 472c of the second rotor portion 472 and the first ferric core portions 471a of the first rotor portion 471 having the same polarities as the magnetic pole portions 472c are overlapped with each other in the axial direction. Second magnetic pole portion 472d of the second rotor portion 472 and the second ferric core portion 471b of the first rotor portion 471 having the same polarities as the magnetic pole portions 472d are overlapped with each other in the axial direction. As shown in FIG. 78, the first rotor portion 471 and the second rotor portion 472 are overlapped with each other in the axial direction through a gap K serving as a magnetic resistance portion having an axial length X1.

Structure K

Figures 79A, 79B:
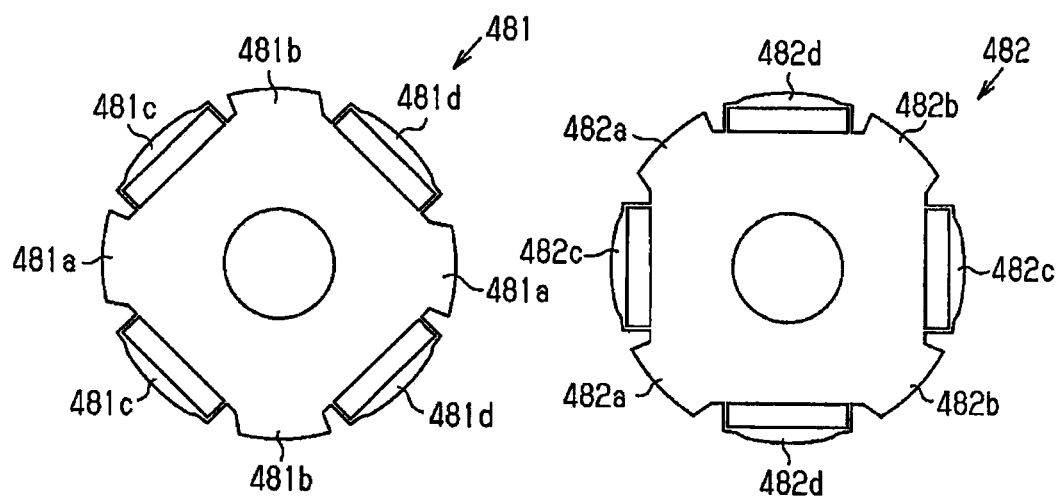
FIGS. 79A and 79B are plan views showing a rotor in another example.
Figure 80:
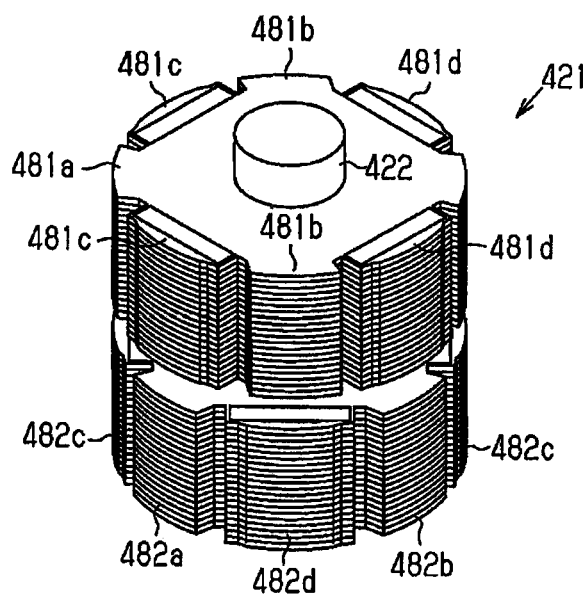
FIG. 80 is a perspective view showing the rotor of the example.

As shown in FIGS. 79A and 79B, a first rotor portion 481 includes first ferric core portions 481a, which are inclined toward the second circumferential side, and second ferric core portions 481b, which are inclined toward the first circumferential side. The first ferric core portions 481a, which have identical shapes, is located on opposite sides and separated by 180° in the circumferential direction. The second ferric core portions 481b, which have identical shapes, is located on opposite sides and separated by 180° in the circumferential direction. A second rotor portion 482 includes first ferric core portions 482a, which are inclined toward the second circumferential side, and second ferric core portions 482b, which are inclined toward the first circumferential side. A first ferric core portion 492a and a second ferric core portion 482b are located on opposite sides and separated by 180° in the circumferential direction. The first and second rotor portions 481 and 482 are arranged so that first magnetic pole portions 481c of the first rotor portion 481 and the first ferric core portions 482a of the second rotor portion 482 having the same polarities as the first magnetic pole portions 481c are overlapped with each other in the axial direction. Second magnetic pole portions 481d of the first rotor portion 481 and the second ferric core portions 482b of the second rotor portion 482 having the same polarities as the magnetic pole portions 481d are overlapped with each other in the axial direction. First magnetic pole portions 482c of the second rotor portion 482 and the first ferric core portions 481a of the first rotor portion 481 having the same polarities as magnetic pole portions 482c are overlapped with each other in the axial direction. Second magnetic pole portions 482d of the second rotor portion 482 and second ferric core portions 471b of the first rotor portion 471 having the same polarities as magnetic pole portions 482d are overlapped with each other in the axial direction. As shown in FIG. 80, the first rotor portion 481 and the second rotor portion 482 are overlapped with each other in the axial direction through a gap K serving as a magnetic resistance portion having an axial length X1.

Structures J and K also obtain advantage (5) of the fourth embodiment.

Structure L

As shown in FIG. 82, a rotor 500 includes a rotation shaft 422 and first and second rotor portions 501 and 502, which are fixed to the rotation shaft 422.

As shown in FIG. 82, the first rotor portion 501 and the second rotor portion 502 are fixed to the rotation shaft 422 so that an axial gap K serving as a magnetic resistance portion having an axial length X1 is provided between the first and second rotor portions 501 and 502.

As shown in FIG. 81A, the first rotor portion 501 includes a cylindrical rotor core 511 fixed to the rotation shaft 422.

As shown in FIG. 82, the rotor core 511 is formed by stacking a plurality of core sheets 512 having generally identical shapes.

As shown in FIG. 81A, a peripheral part of the rotor core 511 includes magnetic pole portions 513 and ferric core portions 514.

As shown in FIG. 81A, four magnetic pole portions 513 are formed at intervals of generally 90° in the circumferential direction. Each magnetic pole portions 513 includes a magnet receptacle 435 that receives a magnet 434. Further, each magnetic pole portions 513 includes a first outer surface 513a, which is curved outward in the radial direction to be convex, and a second outer surface 513b, which is continuous from the first outer surface 513a and curved inward in the radial direction to be concave. The second outer surface 513b is located at the second circumferential side (clockwise direction in FIG. 81A) of the first outer surface 513a inward in the radial direction from the circle C, which extends along the first outer surface 513a. A gap 515 located at the second circumferential side of the magnetic pole portion 513 includes a gap extension 515a and has a larger circumferential width and volume greater than a gap 516 located at a first circumferential side of the magnetic pole portion 513.

As shown in FIG. 81A, an outer surface 514a of each ferric core portion 514 is curved, and the ferric core portion 514 is fan-shaped as viewed from the axial direction (plan view).

As shown in FIG. 81B, the second rotor portion 502 includes a cylindrical rotor core 521 fixed to the rotation shaft 422.

As shown in FIG. 82, the rotor core 521 is formed by stacking a plurality of core sheets 522 having generally identical shapes.

As shown in FIG. 81B, a peripheral part of the rotor core 521 includes magnetic pole portions 523 and ferric core portions 524.

As shown in FIG. 81B, four magnetic pole portions 523 are formed at intervals of generally 90° in the circumferential direction. Each magnetic pole portion 523 includes a magnet receptacle 445, which receives a magnet 444.

As shown in FIG. 81B, four ferric core portions 524 are formed at intervals of generally 90° in the circumferential direction. Each ferric core portion 524 includes a first outer surface 524a, which is curved outward in the radial direction to be convex, and a second outer surface 524b, which is continuous from the first outer surface 524a and curved inward in the radial direction to be concave. The second outer surface 524b is located at the first circumferential side (counterclockwise direction in FIG. 81B) of the first outer surface 524a inward in the radial direction from the circle C, which extends along the first outer surface 524a. A gap 525 located at the first circumferential side of the ferric core portion 524 and includes a gap extension 525a and has a larger circumferential width and volume than a gap 526 located at the second circumferential side of the ferric core portion 524.

Figure 83:
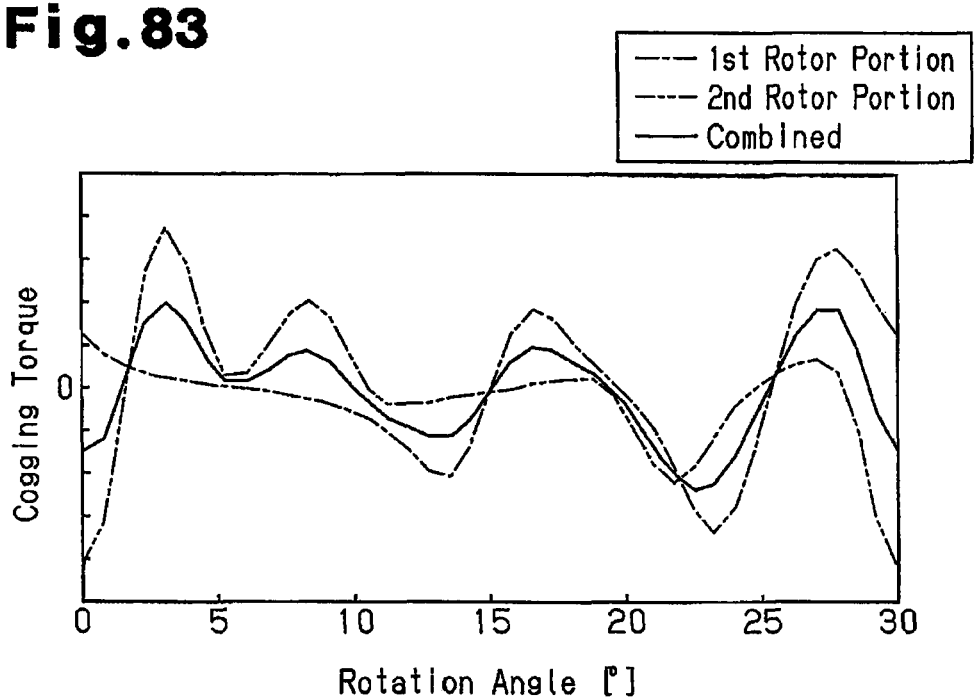
FIG. 83 is a graph of the cogging torque in the rotor of the example.
Figure 84:
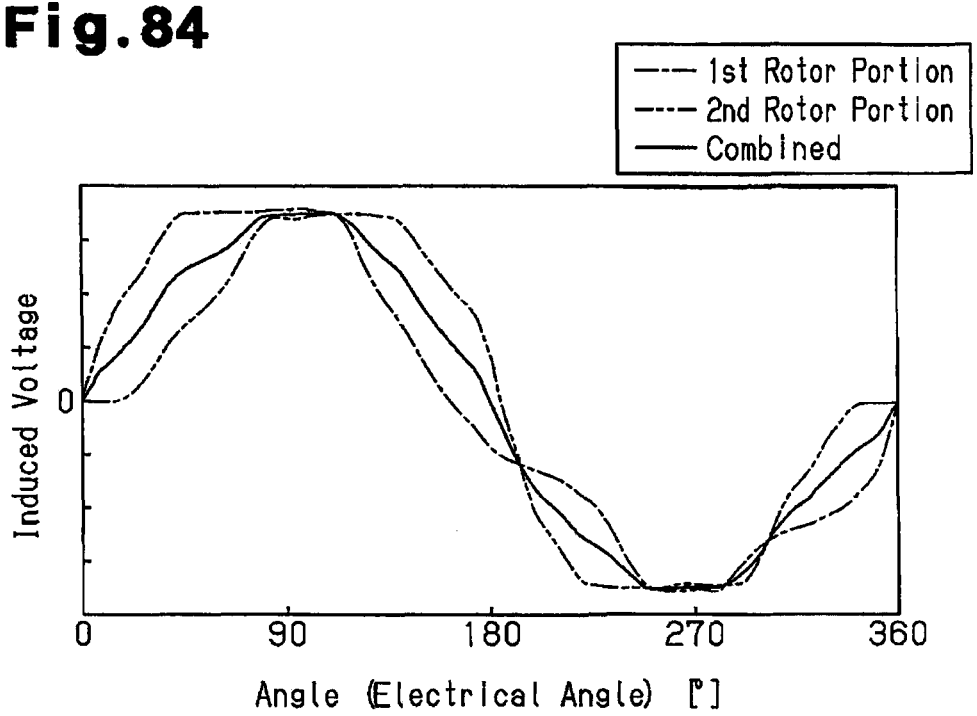
FIG. 84 is a graph of the induced voltage in the rotor of the example.

The same number of core sheets 512 and 522 are stacked to form the first and second rotor portions 501 and 502, respectively. Then, the first and second rotor portions 501 and 502 are fixed to the rotation shaft 422 to form the rotor. In this state, the ferric core portions 514 of the first rotor portion 501 (rotor core 511) and the magnetic pole portions 523 of the second rotor portion 502 (rotor cores 521) are overlapped with each other in the axial direction, and the ferric core portions 524 of the second rotor portion 502 (rotor cores 521) and the magnetic pole portions 513 of the first rotor portion 501 (rotor cores 511) are overlapped with each other in the axial direction. This structure reduces the cogging torque as shown in FIG. 83. Further, the induced voltage pitch becomes even as shown in FIG. 84.

Although the gap K is employed as the magnetic resistance portion in the above embodiment, a member capable of suppressing magnetic movement between the first rotor portion 471 and the second rotor portion 472 in the axial direction may be employed as the magnetic resistance portion.

Although the core sheets 432 and 442 are stacked to form the rotor cores 431 and 441 in the above embodiments, there is no such limitation In each of the above embodiments and modifications, the rotor is of an IPM type rotor that accommodates the magnets 434 and 444 in the magnet receptacles 435 and 445. However, the rotor may be of an SPM type rotor that arranges the magnets 434 and 444 on the outer circumferential surfaces of the rotor cores 431 and 441. Examples of a motor including a rotor of an SPM structure will now be described.

First Example of SPM Structure

As shown in FIG. 85, a motor 550 includes a substantially annular stator 411 arranged along an inner circumferential surface of a motor housing (not shown). A rotor 551 is rotatably arranged in the stator 411. The stator 411 has the same structure as the stator 411 of the fourth embodiment and thus will not be described in detail.

As shown FIGS. 86A and 86B, the rotor 551 includes a rotation shaft 422, first and second rotor portions 552 and 553 fixed to the rotation shaft 422, and a magnet retaining cover 554 covering the rotor portions 552 and 553 from the radially outer sides of the rotor portions 552 and 553.

The first rotor portion 552 includes a cylindrical rotor core 561, which is fixed to the rotation shaft 422, and magnets 562, which form magnetic pole portions and are arranged at radially outer sides of the rotor core 561.

Figure 87:
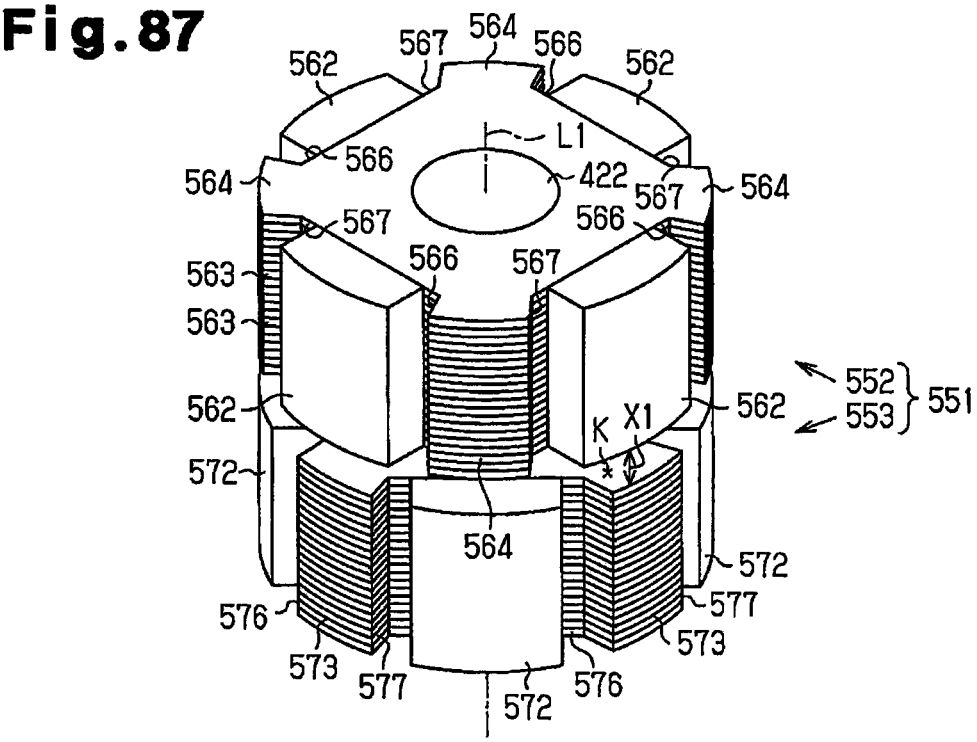
FIG. 87 is a perspective view of the first and second rotor portions in a state where the magnet retaining cover is removed.

As shown in FIG. 87, the rotor core 561 of the first rotor portion 552 is formed by stacking a plurality of core sheets 563 having generally identical shapes. The rotor core 561 of the first rotor portion 552 includes a plurality of ferric core portions 564, which are magnetized by the magnets 562 and function as one of the magnetic poles. Each ferric core portion 564 extends outward in the radial direction and has a curved outer surface 564a. The ferric core portion 564 is inclined toward the second circumferential side. The rotor core 561 of the first rotor portion 552 includes seat surfaces 565 between the ferric core portions 564. Each seat surface 565 is flat and extends in a direction orthogonal to the radial direction as viewed from the axial direction.

The second rotor portion 553 includes a cylindrical rotor core 571, which is fixed to the rotation shaft 422, and magnets 572, which are arranged at radially outer sides of the rotor core 571.

As shown in FIG. 87, the rotor core 571 of the second rotor portion 553 is formed by stacking a plurality of core sheets 573 having identical shapes. The rotor core 571 of the second rotor portion 553 includes a plurality of ferric core portions 574, which are magnetized by the magnets 572 and function as one of magnetic poles. Each ferric core portion 574 extends outward in the radial direction and has a curved outer surface 574a. The ferric core portion 574 is inclined toward the first circumferential side. The rotor core 571 of the second rotor portion 553 includes seat surfaces 575 between the ferric core portions 574. Each the seat surface 575 is flat and extends in a direction orthogonal to the radial direction as viewed from the axial direction.

The magnets 562 and 572 respectively include flat surfaces 562a and 572a that are located at radially inward positions when the magnets 562 and 572 are fixed to the seat surfaces 565 and 575 of the rotor cores 561 and 571 in the first and second rotor portions 552 and 553. The magnets 562 and 572 also respectively include curved outer surfaces 562b and 572b at radial outward positions. Gaps 566, 567, 576 and 577 are formed between the ferric core portions 564 and 574 and the magnets 562 and 572, which forming the magnetic pole portions.

As shown in FIG. 86A, the gap 566 formed on the second side circumferential of each ferric core portion 564 in the first rotor portion 552 has a smaller circumferential width and volume than the gap 567 formed at the first circumferential side of the ferric core portion 564. As shown in FIG. 86B, the gap 576 formed at the second circumferential side of each ferric core portion 574 in the second rotor portion 553 has a larger circumferential width and volume than the gap 577 formed at the first circumferential side of the ferric core portion 574. The gap 566 formed at the second circumferential side of each ferric core portion 564 in the first rotor portion 552 has generally the same circumferential width and volume as the gap 577 formed at the first circumferential side of each ferric core portion 574 in the second rotor portion 553. The gap 567 formed at the first circumferential side of each ferric core portion 564 in the first rotor portion 552 has generally the same circumferential width and volume as the gap 576 formed at on one circumferential side of each ferric core portion 574 in the second rotor portion 553.

Figure 88:
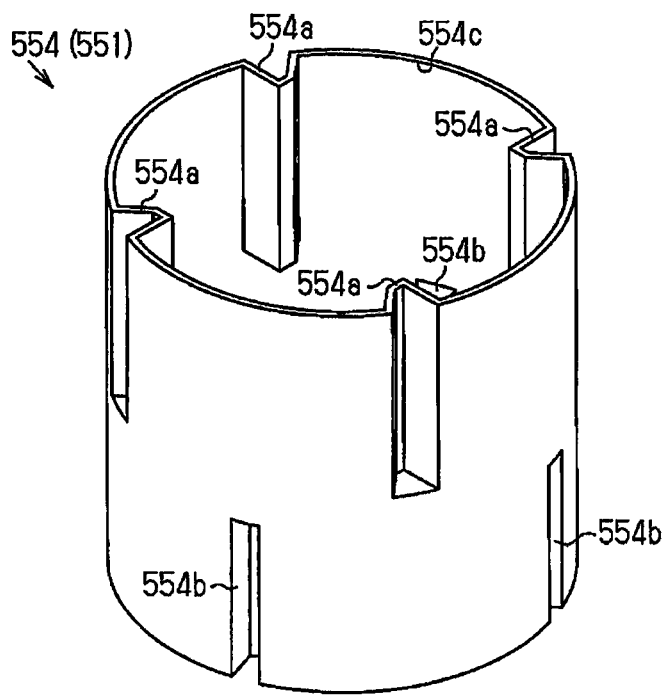
FIG. 88 is a perspective view showing the magnet retaining cover.

As shown in FIGS. 85 and 88, the magnet retaining cover 554, which covers the first and second rotor portions 552 and 553, is cylindrical. As shown in FIGS. 86A and 88, the magnet retaining cover 554 includes abutment recesses 554a, each entering one of the gaps 566 and 567 between the ferric core portions 564 and the magnets 562 in the first rotor portion 552 and abutting against the gap in the circumferential direction. As shown in FIGS. 86B and 88, the retaining cover 554 includes abutment recesses 554b, each entering one of the gaps 576 and 577 between the ferric core portion 574 and the magnet 572 in the second rotor portion 553 and abutting against the gap in the circumferential direction. Four abutment recesses 554a and four abutment recesses 554b are formed. Thus, a total of eight abutment recesses are formed. The abutment recesses 554a and 554b of the magnet retaining cover 554, an inner circumferential surface 554c of the magnet retaining cover 554, and the seat surfaces 565 and 575 of the rotor cores 561 and 571 sandwich the magnets 562 and 572 of the first and second rotor portions 552 and 553. This restricts movement of the magnets 562 and 572 in the radial direction and the circumferential direction.

In the rotor 551 of the first example, the first rotor portion 552 includes the ferric core portions 564, which are inclined toward the second circumferential side, and the second rotor portion 553 includes the ferric core portions 574, which are inclined toward the first circumferential side. However, there is no such limitation, and the structure may be modified as described below.

Second Example of SPM Structure

As shown in FIG. 89A, a first rotor portion 581 includes ferric core portions 581a, which are inclined toward the second circumferential side, and ferric core portions 581b, which are inclined toward the first circumferential side, on the same plane that is orthogonal to the axial direction. The ferric core portions 581a have identical shapes and are located at opposite sides separated by 180° from each other in the circumferential direction. The ferric core portions 581b. As shown in FIG. 89A, each ferric core portion 581a is formed so that a gap 591 is located at the second circumferential side (clockwise direction in FIG. 89A) and a gap 592 having a larger circumferential width than the gap 591 is located at the first circumferential side (counterclockwise direction in FIG. 89A). The ferric core portions 581a are inclined toward the second circumferential side (clockwise direction in FIG. 89A). As shown in FIG. 89A, each ferric core portion 581b is formed so that a gap 593 is located at the second circumferential side (clockwise direction in FIG. 89A) and a gap 594 having a smaller circumferential width than the gap 593 is located at the first circumferential side (counterclockwise direction in FIG. 89A). The ferric core portions 581b are inclined toward the first circumferential side (counterclockwise direction in FIG. 89A). The gap 593 has generally the same circumferential width and volume as the gap 592, and the gap 594 has generally the same circumferential width and volume as the gap 591.

As shown in FIG. 89B, a second rotor portion 582 includes ferric core portions 582a inclined toward the second circumferential side and ferric core portions 582b inclined toward the first circumferential side on the same plane that is orthogonal to the axial direction. The ferric core portions 582a have identical shapes and are located at opposite sides separated by 180° from each other in the circumferential direction. The ferric core portions 582b have identical shapes and are located at opposite sides separated by 180° from each other in the circumferential direction. As shown in FIG. 89B, each ferric core portion 582a is formed so that a gap 595 is located at the second circumferential side (clockwise direction in FIG. 89B) and a gap 596 having a larger circumferential width than the gap 595 is located at the first circumferential side (counterclockwise direction in FIG. 89B). The ferric core portions 582*a* are inclined toward the second circumferential side (counterclockwise direction in FIG. 89B). As shown in FIG. 89B, each ferric core portion 582*b* is formed so that a gap 597 is located at the second circumferential side (clockwise direction in FIG. 89B) and a gap 598 having a smaller circumferential width than the gap 597 is located at the first circumferential side (counterclockwise direction in FIG. 89B). The ferric core portions 582*b* are inclined toward the first circumferential side (clockwise direction in FIG. 89B). The gap 598 has generally the same circumferential width and volume as the gap 595, and the gap 597 has generally the same circumferential width and volume as the gap 596.

As shown in FIGS. 89A to 90, the first and second rotor portions 581 and 582 are arranged so that two of the four magnets 562 in the first rotor portion 581 located at opposite sides and separated by 180° in the circumferential direction are overlapped in the axial direction with the ferric core portions 582*a* of the second rotor portion 582 having the same polarity as the magnets 562. The remaining magnets 562 of the first rotor portion 581 are overlapped in the axial direction with the ferric core portions 582*b* of the second rotor portion 582 having the same polarity as the magnets 562. Two of the four magnets 582 in the second rotor portion 582 located at opposite sides and separated by 180° in the circumferential direction are overlapped in the axial direction with the ferric core portions 581*a* of the first rotor portion 581 having the same polarity as the magnets 572. The remaining magnets 572 of the second rotor portion 582 are overlapped in the axial direction with the ferric core portions 581*b* of the first rotor portion 581 having the same polarity as the magnets 572.

As shown in FIG. 90, the first and second rotor portions 581 and 582 are overlapped with each other in the axial direction through an axial gap K serving as a magnetic resistance portion having an axial length X1. The polarity (south pole, for example) of the magnets 562 in the first rotor portion 581 differs from the polarity (north pole, for example) of the magnets 572 in the second rotor portion 582.

Third Example of SPM Structure

Figures 91A, 91B:
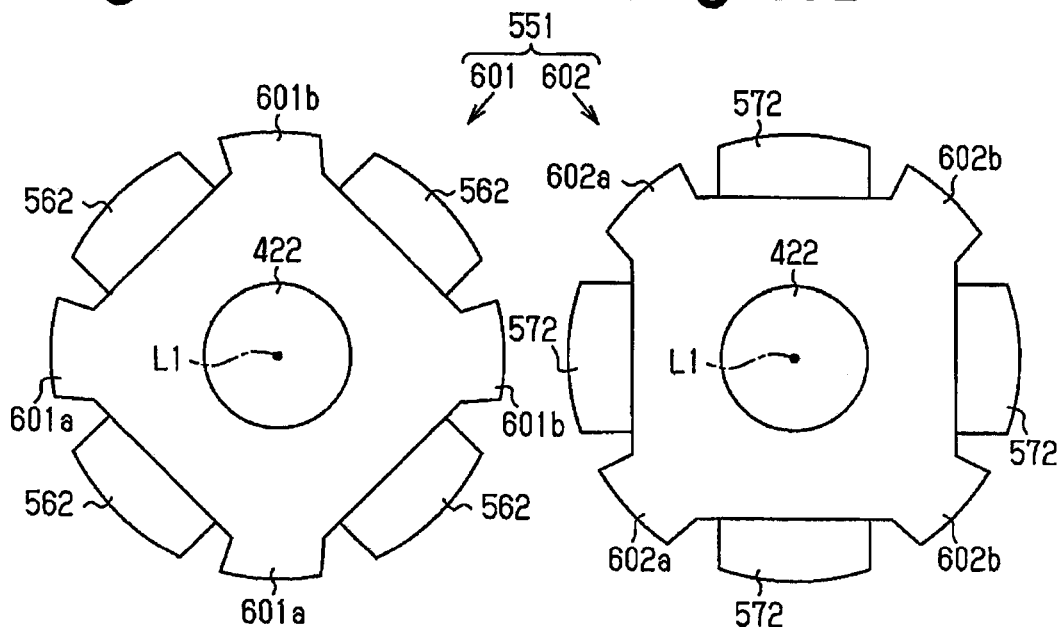
FIG. 91A is a plan view showing the first rotor portion in the state where the magnet retaining cover is removed.
FIG. 91B is a plan view showing the second rotor portion in the state where the magnet retaining cover is removed.

As shown in FIG. 91A, a first rotor portion 601 includes ferric core portions 601*a*, which are inclined toward the second circumferential side, and ferric core portions 601*b*, which are inclined toward the first circumferential side. A ferric core portion 601*a* and a ferric core portion 601*b* are located at opposite sides and separated by 180° in the circumferential direction. As shown in FIG. 91B, a second rotor portion 602 includes ferric core portions 602*a*, which are inclined toward the second circumferential side, and second ferric core portions 602*b*, which are inclined toward the first circumferential side. A ferric core portion 602*a* and a ferric core portion 602*b* are located at opposite sides and separated by 180° in the circumferential direction.

Figure 92:
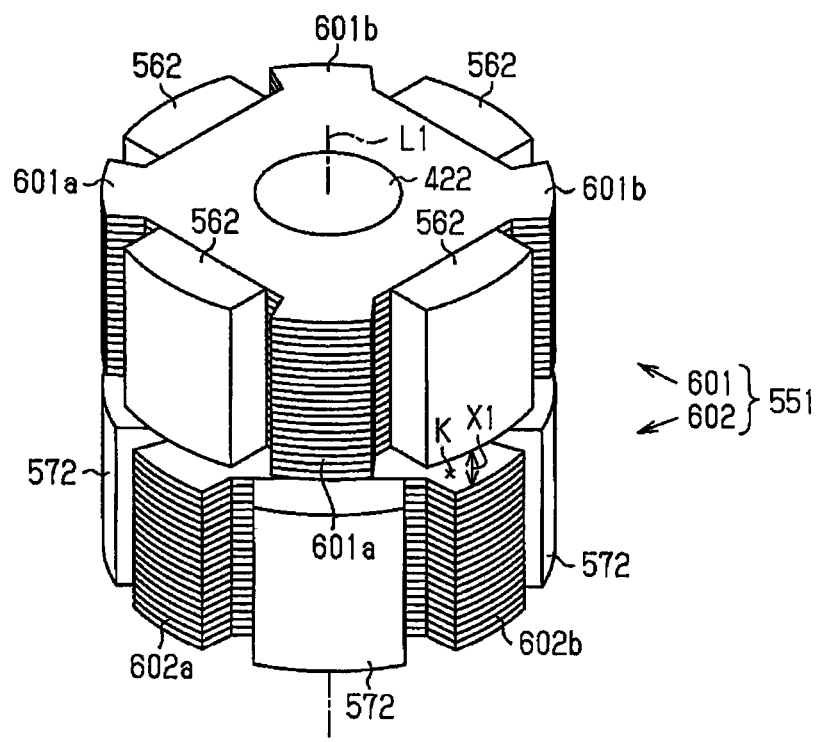
FIG. 92 is a perspective view showing the first and second rotor portions in the state where the magnet retaining cover is removed.

As shown in FIGS. 91A to 92, the first and second rotor portions 601 and 602 are arranged so that two of the four magnets 562 in the first rotor portion 601 are overlapped in the axial direction with the ferric core portions 602*a* in the second rotor portion 602 having the same polarity as the magnets 562. The remaining magnets 562 in the first rotor portion 601 are overlapped in the axial direction with the ferric core portions 602*b* in the second rotor portion 602 having the same polarity as the magnets 562. Two of the four magnets 572 in the second rotor portion 602 are overlapped in the axial direction with the ferric core portions 601*a* in the first rotor portion 601 having the same polarity as the magnets 572. The remaining magnets 572 in the second rotor portion 602 are overlapped in the axial direction with the ferric core portions 601*b* in the first rotor portion 601 having the same polarity as the magnets 572. As shown in FIG. 92, the first rotor portion 601 and the second rotor portion 602 are overlapped with each other in the axial direction through an axial gap K serving as a magnetic resistance portion having an axial length X1.

Fourth Example of SPM Structure

As shown in FIG. 93A, a first rotor portion 611 includes ferric core portions 611*a*, which are inclined toward the second circumferential side, and ferric core portions 611*b*, which are inclined toward the second circumferential side. The ferric core portions 611*a* are located at opposite sides separated by 180° in the circumferential direction. The ferric core portions 611*b* are located at opposite sides separated by 180° in the circumferential direction. As shown in FIG. 93B, a second rotor portion 612 includes ferric core portions 612*a*, which are inclined toward the second circumferential side, and ferric core portions 612*b*, which are inclined toward the first circumferential side. A ferric core portion 612*a* and a ferric core portion 612*b* are located at opposite sides and separated by 180° in the circumferential direction.

As shown in FIGS. 93A to 94, the first and second rotor portions 611 and 612 are arranged so that two of the four magnets 562 in the first rotor portion 611 are overlapped in the axial direction with the ferric core portions 612*a* in the second rotor portion 612 having the same polarity as the magnets 562. The remaining magnets 562 in the first rotor portion 611 are overlapped in the axial direction with the ferric core portions 612*b* in the second rotor portion 612 having the same polarity as the magnets 562. Two of the four magnets 572 in the second rotor portion 612 are overlapped in the axial direction and the ferric core portions 611*a* in the first rotor portion 611 having the same polarity as the magnets 572. The remaining magnets 572 in the second rotor portion 612 are overlapped in the axial direction with the ferric core portions 611*b* in the first rotor portion 611 having the same polarity as the magnets 572. As shown in FIG. 94, the first rotor portion 611 and the second rotor portion 612 are overlapped with each other in the axial direction through an axial gap K serving as a magnetic resistance portion having an axial length X1.

Figure 95:
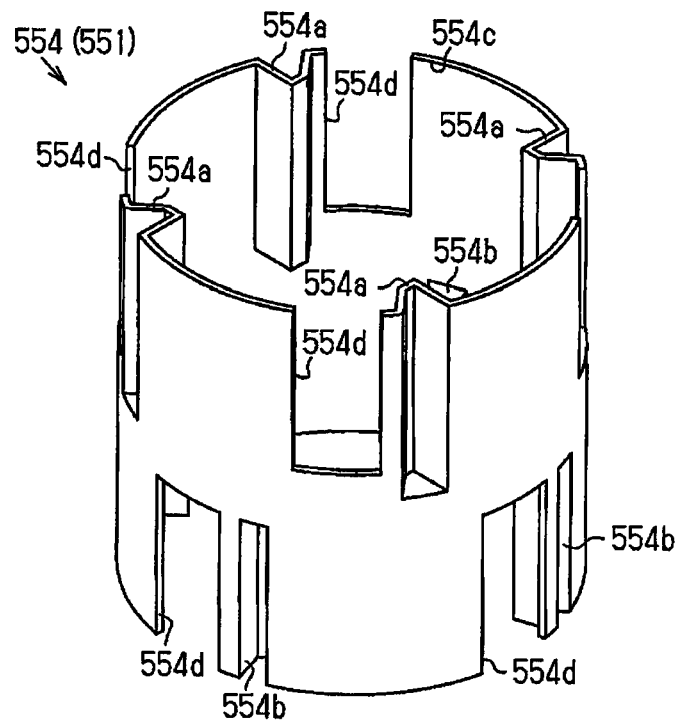
FIG. 95 is a perspective view showing a magnet retaining cover in another example.
Figure 96:
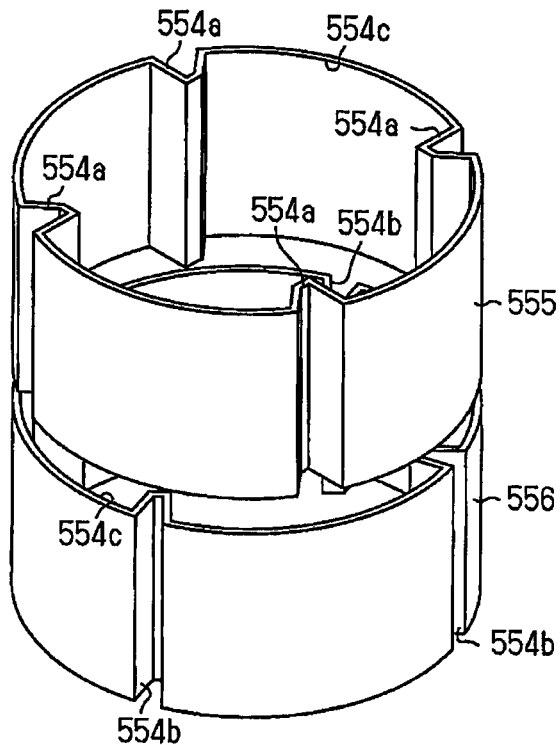
FIG. 96 is a perspective view showing a magnet retaining cover in another example.

Although the magnet retaining cover 544 has a simple cylindrical shape in the first to fourth examples, there is no limitation to such a structure. As shown in FIG. 95 for example, the retaining cover 554 may include cutouts 544*d*, which are cut out in the radial direction from the magnet retaining cover 544 and extend in the axial direction. Alternatively, as shown in FIG. 96 for example, separate retaining covers 555 and 556 may be used for the first rotor portion and the second rotor portion, respectively.

A sixth embodiment in which the present invention is embodied will be described below with reference to the drawings.

Components that are the same as the corresponding components of the first embodiment will not be described in detail.

Figure 97:
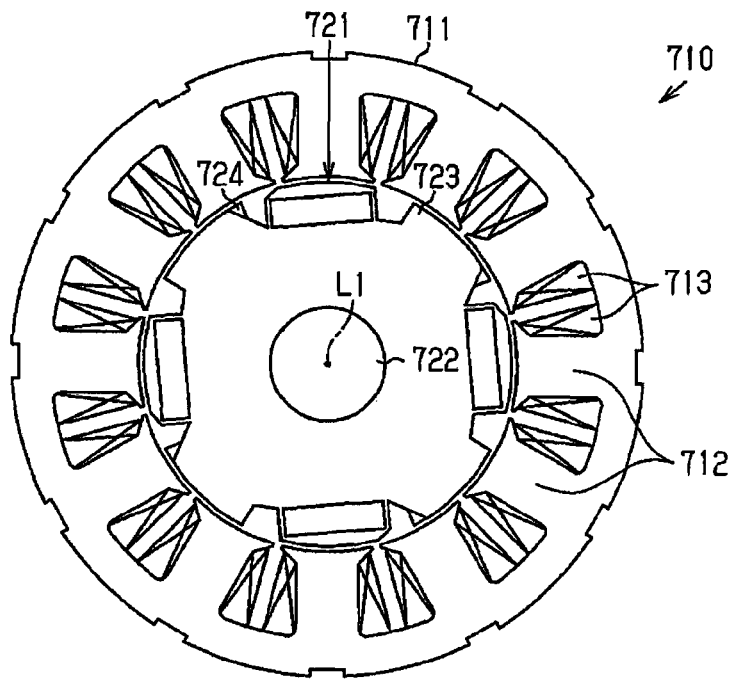
FIG. 97 is a schematic plan view showing a motor according to a sixth embodiment.

As shown in FIG. 97, a motor 710 includes an annular stator 711 arranged along an inner circumferential surface of a motor housing (not shown) and a rotor 721, which is rotatably arranged in the stator 711.

Figure 98A:
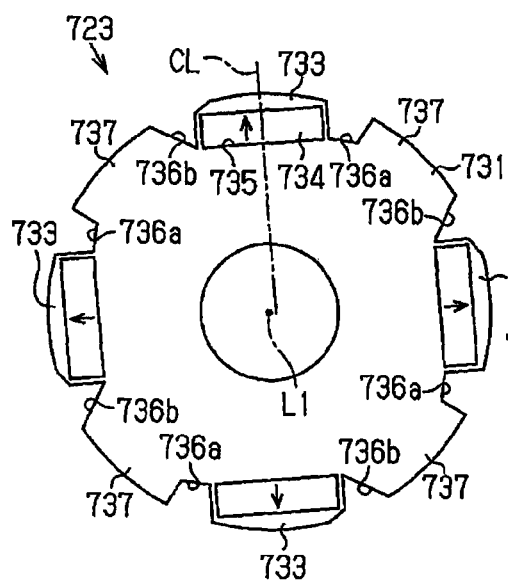
FIGS. 98A and 98B are plan views showing a rotor in the sixth embodiment.

As shown in FIG. 98A, a first rotor portion 723 includes a cylindrical rotor core 731, which is fixed to a rotation shaft 722.

A plurality of magnetic pole portions 733 are formed in a peripheral part of the rotor core 731. The magnetic pole portions 733 are opposed to teeth 712 (second embodiment FIG. 97) of the stator 711 in the radial direction. The stator 711 surrounds the rotor core 731.

In this embodiment, as shown in FIG. 98A, each magnetic pole portion 733 is formed by embedding a generally planar magnet 734 in the peripheral part of the rotor core 731.

Each magnet 734 is inclined so that its end at the first circumferential side as viewed from the axial direction is close to a central portion (center in the circumferential direction) of the rotor 721 and so that its end at the second circumferential side is far from the central portion of the rotor 721. In other words, each magnet 734 is inclined so that a line CL, which is orthogonal to the longitudinal direction of the magnet 734 as viewed from the axial direction, is inclined toward the first circumferential side relative to the radial direction. The line CL, which extends through the longitudinally central part of the magnet 734 and is orthogonal to the longitudinal direction, does not intersect the axis L1. In this structure, the inclination of the magnet 734 inclines the magnetic direction of as the magnetic pole portion 733 in the same direction (first circumferential side).

Two gaps 736a and 736b are formed at both circumferential sides of each magnetic pole portion 733. The gaps 736a and 736b form magnetic resistance. This forms ferric core portions 737, which are magnetically partitioned from the magnetic pole portions 733 in the circumferential direction, between the magnetic pole portions 733.

More specifically, the magnetic flux of the magnetic pole portions 733 flows into the ferric core portions 737 through an interior of the rotor core 731 to bypass the gaps 736a and 736b formed at the two circumferential sides of each magnetic pole portion 733. Since the magnetic flux passes through the ferric core portion 737 outward in the radial direction, a pseudo-magnetic pole having a polarity differing from that of the adjacent magnetic pole portion 733 is formed in each ferric core portion 737. In this manner, the first rotor portion 723 of this embodiment is a so-called consequent pole type rotor.

As shown in FIG. 98A, the ferric core portions 737 of the rotor core 731 are inclined toward the first circumferential side. Each ferric core portion 737 is formed so that the gap 736a is located at the first circumferential side (counterclockwise direction in FIG. 98A) and the gap 736b is located at the second circumferential side (clockwise side as viewed in the drawing). A radially outer side of the ferric core portion 737 is inclined toward the first circumferential side (counterclockwise side as viewed in the drawing). The magnetic center of the ferric core portion 737 is also inclined in accordance with the inclination angle of the ferric core portion 737.

Figure 98B:
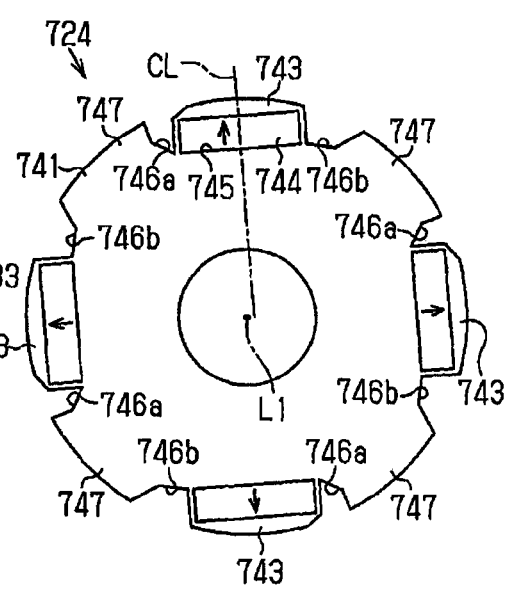

As shown in FIG. 98B, a second rotor portion 724 includes a cylindrical rotor core 741 fixed to the rotation shaft 722.

As shown in FIG. 98B, a plurality of magnetic pole portions 743 are formed in the peripheral part of the rotor core 741. The magnetic pole portions 743 are opposed to the teeth 712 (second embodiment FIG. 97) of the stator 711 in the radial direction. The stator 711 surrounds the rotor core 741.

In the present embodiment, as shown in FIG. 98B, each magnetic pole portion 743 is formed by embedding a planar magnet 744 into the peripheral part of the rotor core 741. More specifically, magnet receptacles 745, which extend in the axial direction, are formed in the peripheral part of the rotor core 741 at equal intervals in the circumferential direction (intervals of generally 90° intervals in this embodiment). Each magnetic pole portion 743 is formed by accommodating and fixing the magnet 744 in the magnet receptacle 745 in a direction orthogonal to the radial direction of the rotor core 741.

The magnets 744 are arranged so that the polarity (north, for example) is the same at the magnetic pole surfaces located at the radially outer side of the rotor core 741. In this structure, the four magnetic pole portions 743 have the same polarity (north pole) and are formed at generally equal intervals (90°) in the circumferential direction.

Each magnet 744 is inclined so that its end at the first circumferential side as viewed from the axial direction is close to a central portion (center in the circumferential direction) of the rotor 721 and its end at the second circumferential side is far from the central portion of the rotor 721. In this structure, the inclination of the magnet 744 inclines the magnetic direction of the magnetic pole portion 743 in the same direction (first circumferential side). In other words, the magnet 744 is shaped so that the line CL, which is orthogonal to the longitudinal direction as viewed from the axial direction, is inclines toward the first circumferential side relative to the radial direction. The line CL, which extends through the longitudinally central part of the magnet 744 and is orthogonal to the longitudinal direction of the magnet 744, does not intersect with the axis L1. The number of the magnetic pole portions 743 including the magnets 744 is the same as the magnetic pole portions 733 including the magnets 734, and the inclination amount (inclination angle) of the magnetic direction of the magnetic pole portion 743 is the same as the inclination amount of the magnetic direction of the magnetic pole portion 733. The magnetic flux is distributed so that the magnetic flux in one rotation direction is symmetric to the magnetic flux in the other rotation direction.

Two gaps 746a and 746b are formed at the two circumferential sides of each magnetic pole portion 743. The gaps 746a and 746b form magnetic resistance. This forms ferric core portions 747, which are magnetically partitioned from the magnetic pole portions 743 in the circumferential direction, between the magnetic pole portions 743.

More specifically, in the same manner as the magnetic pole portions 733, the magnetic flux of the magnetic pole portions 743 flows into the ferric core portions 747 through an interior of the rotor core 741 to bypass the gaps 746a and 746b formed at the two circumferential sides of each magnetic pole portion 743. Since the magnetic flux passes through the ferric core portion 747 outward in the radial direction, a pseudo-magnetic pole having a polarity differing from that of the adjacent magnetic pole portion 743 is formed in each ferric core portion 747. In this manner, the first rotor portion 724 of this embodiment is a so-called consequent pole type rotor.

As shown in FIG. 98B, the ferric core portions 747 of the rotor core 741 are inclined toward the second circumferential side. Each ferric core portion 747 is formed so that the gap 746a is located at the second circumferential side (clockwise direction in FIG. 98B) and the gap 746b is located at the first circumferential side (counterclockwise side as viewed in the drawing). A radially outer side of the ferric core portion 747 is inclined toward the second circumferential side (clockwise direction in FIG. 98B). A magnetic center of the ferric core portion 747 is also inclined in accordance with the inclination angle of the ferric core portion 747. The number of ferric core portions 747 is the same (four) as the ferric core portions 737 in the first rotor portion 723, and the ferric core portions 737 and 747 are inclined in opposite directions.

The first and second rotor portions 723 and 724 are arranged so that the magnetic pole portions 733 in the first rotor portion 723 are overlapped in the axial direction with the magnetic pole portions 743 in the second rotor portion 724 having the same polarity as the magnetic pole portions 733. The ferric core portions 737 of the first rotor portion 723 are overlapped with in the axial direction with the ferric core portions 747 of the second rotor portion 724 having the same polarity as the ferric core portions 737.

The operation of the present embodiment will now be described.

When current is supplied to the winding 713 of the stator 711, the motor 710 of the present embodiment generates a rotating magnetic field that rotates the rotor 721. This rotates the rotor 721.

Figure 99:
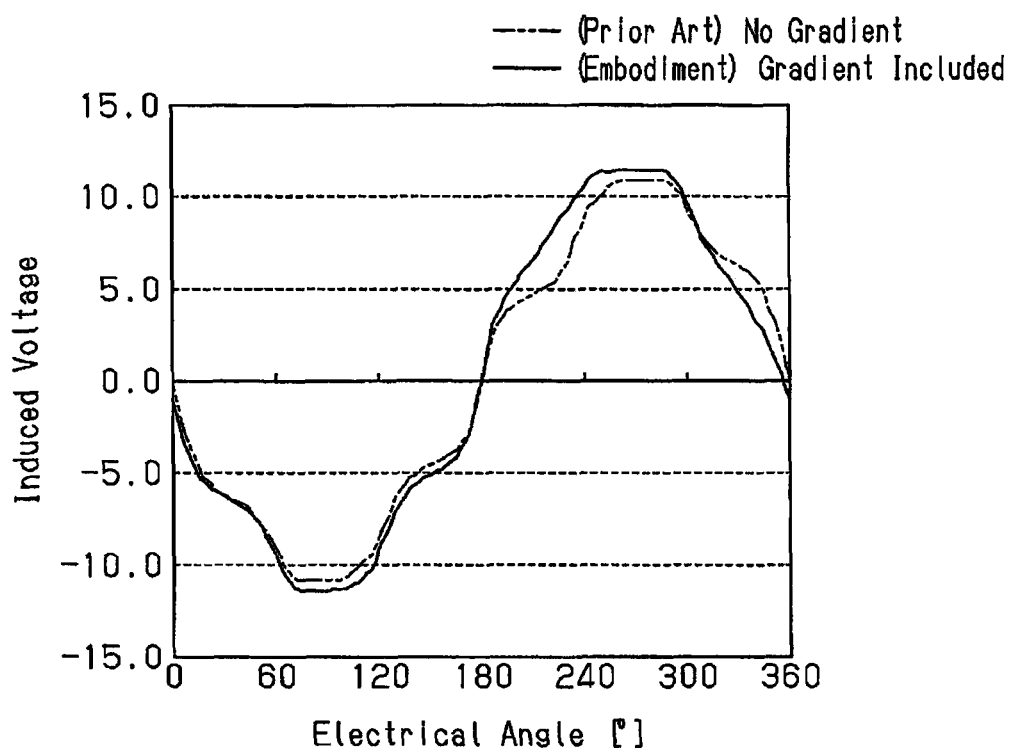
FIG. 99 is a graph of the induced voltage in the motor in the embodiment.
Figure 100:
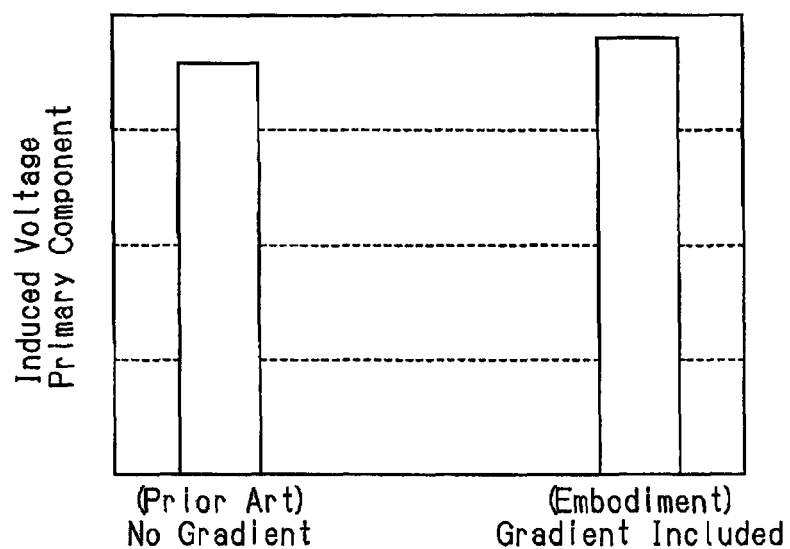
FIG. 100 is a graph of the difference between induced voltage of the motor in the sixth embodiment and the induced voltage of a conventional motor.

The rotor core 731 of the first rotor portion 723 includes the ferric core portions 737, which are inclined toward the second circumferential side, and the rotor core 741 of the second rotor portion 724 includes the ferric core portions 747, which are inclined toward the opposite side (first circumferential side) of the ferric core portions 737. The rotor cores 731 and 741 include the magnetic pole portions 733 and 743, which are inclined toward the first circumferential side. Thus, as compared with when using a conventional rotor, induced voltage can be increased and torque of the motor 710 is increased as shown in FIGS. 99 and 100.

The present embodiment has the advantages described below.

(10) The first rotor portion 723 includes the magnetic pole portions 733, of which the magnetic directions are inclined toward the first circumferential side, and the ferric core portions 737, which are inclined toward the first circumferential side. The second rotor portion 724 includes the magnetic pole portions 743, which are inclined in the same direction as the magnetic pole portions 733, and the ferric core portions 747, which are inclined toward the second circumferential side that is opposite to the ferric core portions 737. This improves the primary component of the induced voltage and increases the torque as shown in FIGS. 99 and 100.

(11) The ferric core portions 737, which are inclined toward the first circumferential side, are formed only in the first rotor portion 723, and the ferric core portions 747, which are inclined toward the first circumferential side, are formed only in the second rotor portion 724. This simplifies the shapes of the rotor portions 723 and 724.

The above embodiment of the invention may be modified as described below.

In the above embodiment, the magnetic directions of the magnets 734 and 744 (magnetic pole portions 733 and 743) are inclined in the circumferential direction by inclining the magnets 734 and 744 in the circumferential direction. Instead, for example, without inclining the magnets 734 and 744, the polarizing directions of the magnets 734 and 744 may be adjusted so that only the magnetic directions of the magnets 734 and 744 are inclined in the circumferential direction.

Figure 101A:
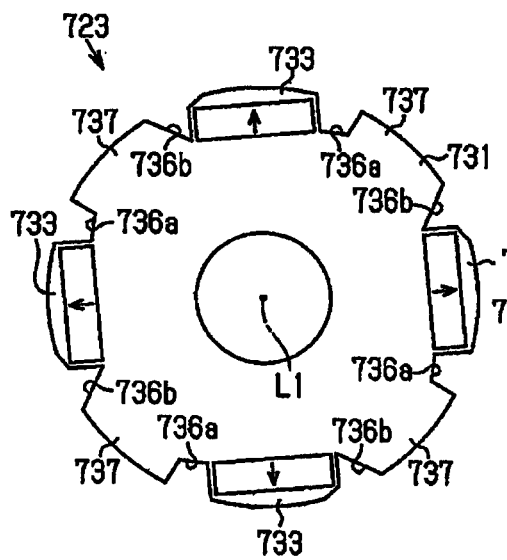
FIGS. 101A and 101B are plan views showing a rotor in another example.
Figure 101B:
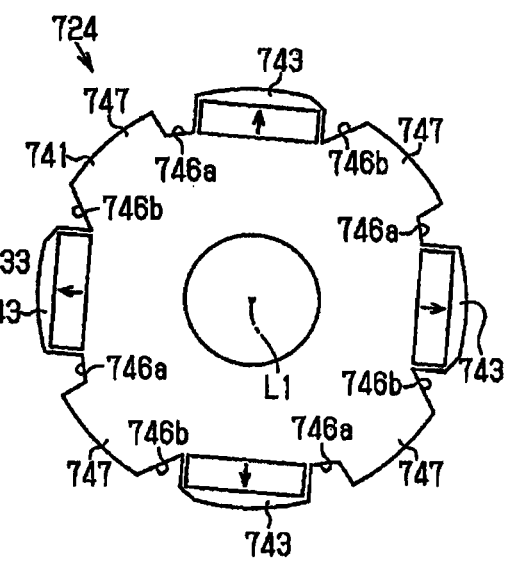

The magnetic directions of the magnetic pole portions 733 and 743 of the first and second rotor portions 723 and 724 are inclined toward one circumferential side in the above embodiment, the invention is not limited to this structure. Instead, for example, as shown in FIGS. 101A and 101B, the magnetic direction of the magnetic pole portion 733 of the first rotor portion 723 may be inclined toward the first circumferential side, and the magnetic direction of the magnetic pole portion 743 of the second rotor portion 724 may be inclined toward the second circumferential side.

Figure 102A:
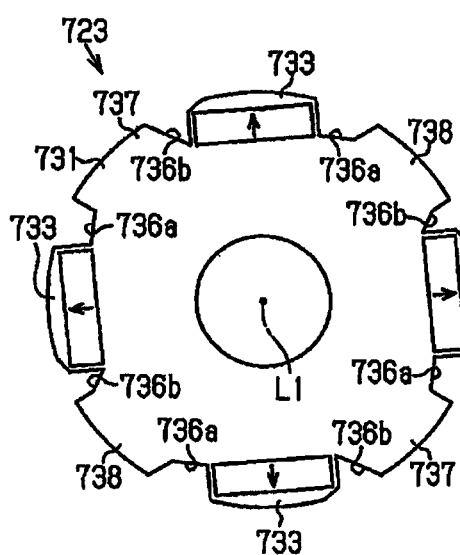
FIGS. 102A and 102B are plan views of a rotor in another example.
Figure 102B:
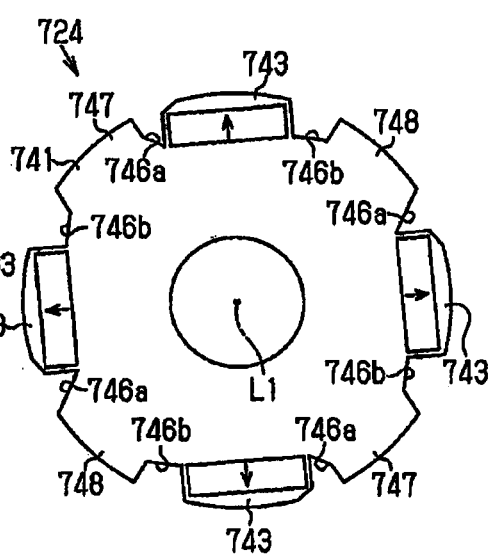

In the above embodiment, the first rotor portion 723 includes the ferric core portions 737, which is inclined toward the first circumferential side, and the second rotor portion 724 includes the ferric core portions 747, which is inclined toward the second circumferential side. Instead, for example, as shown in FIGS. 102A and 102B, the first and second rotor portions 723 and 724 may be respectively provided with ferric core portions 737 and 748, which are inclined toward the first circumferential side, and ferric core portions 738 and 747, which are inclined toward the second circumferential side. In other words, if the first and second rotor portions 723 and 724 respectively include ferric core portions 737 and 748, which are inclined toward the first circumferential side and the ferric core portions 738 an 747, which are inclined toward the second circumferential side relative to a plane that is orthogonal to the axial direction, the rotor portions 723 and 724 can be formed without using a number of types of rotor cores for the rotor portions 723 and 724.

In this case, it is preferable that the ferric core portions 737, which are inclined toward the first circumferential side of the first rotor portion 723, and the ferric core portions 747, which are inclined toward the second circumferential side of the second rotor portion 724, are overlapped in the axial direction, and the ferric core portions 737, which are inclined toward the second circumferential side of the first rotor portion 723, and the ferric core portions 747, which are inclined toward the first circumferential side of the second rotor portion 724, are overlapped in the axial direction.

Figure 103A:
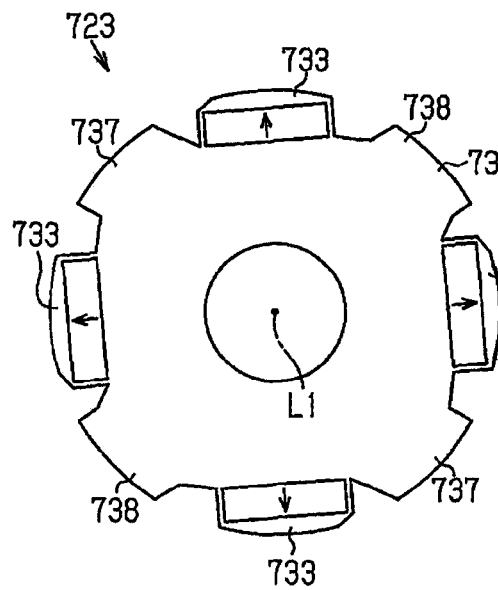
FIGS. 103A and 103B are plan views showing a rotor in another example.
Figure 103B:
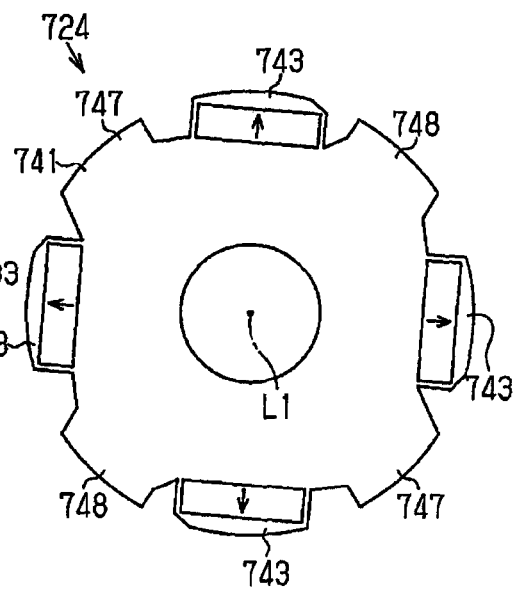

In FIGS. 102A and 102B, in the same amount as the above embodiment, the magnetic directions of the magnetic pole portions 733 and 743 of the rotor portions 723 and 724 are inclined in the same direction (one of sides in the circumferential direction). Alternatively, as shown in FIGS. 103A and 103B, the magnetic directions of the magnetic pole portions 733 of the first rotor portion 723 may be inclined toward the first circumferential side, and the magnetic directions of the magnetic pole portions 743 of the second rotor portion 724 may be inclined toward the second circumferential side.

Figure 104:
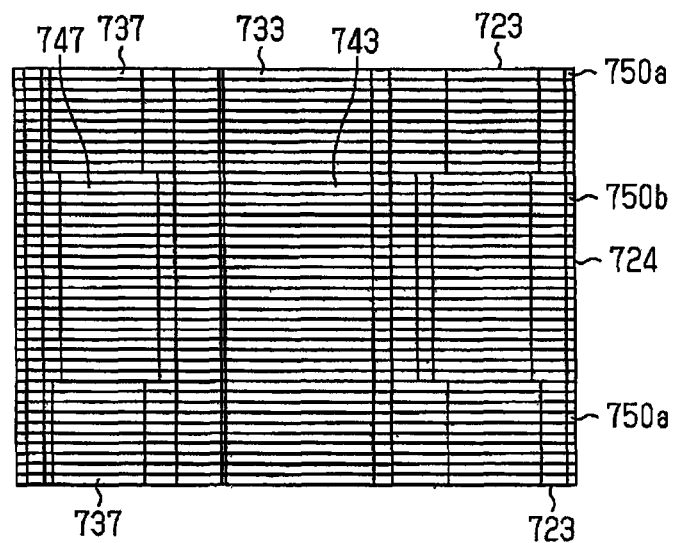
FIG. 104 is a side view showing a rotor and illustrating how core sheets are stacked.

Although not particularly mentioned in the present embodiment, as shown in FIG. 104, the rotor cores 731 and 741 of the rotor portions 723 and 724 may be formed by stacking the core sheets 750a and 750b in the axial direction. In FIG. 104, first rotor portions 723 including ferric core portions 737, which are inclined toward the first circumferential side, are arranged at both sides in the stacking direction (axial direction), so that the first rotor portions 723 sandwich the second rotor portion 724 inclined toward the second circumferential side. Further, as shown in FIG. 104, ferric core portions 737 are stacked on one side of the center of the core sheets 750a and 750b in the stacking direction, and the ferric core portions 747 are stacked on the other side.

In the present embodiment, the magnetic pole portions 733 and 743 of the rotor portions 723 and 724 are overlapped with each other in the axial direction, and the ferric core portions 737 and 747 of the rotor portions 723 and 724 are overlapped in the axial direction. However, there is no such limitation.

Structure M

As shown in FIGS. 105A to 106, a structure M includes a first rotor portion 723 in which magnetic pole portions 733 are south poles, and a second rotor portion 724 in which magnetic pole portions 743 are north poles and differ from the first rotor portions 723. The first rotor portion 723 and the second rotor portion 724 are overlapped through an axial gap K, which forms a magnetic resistance, with respect to the first rotor portions 723. The first rotor portion 723 and the second rotor portion 724 include the magnetic pole portions 733 and 743, which can generate magnetic flux and have different polarities. This allows for a magnetic balance.

Figure 107:
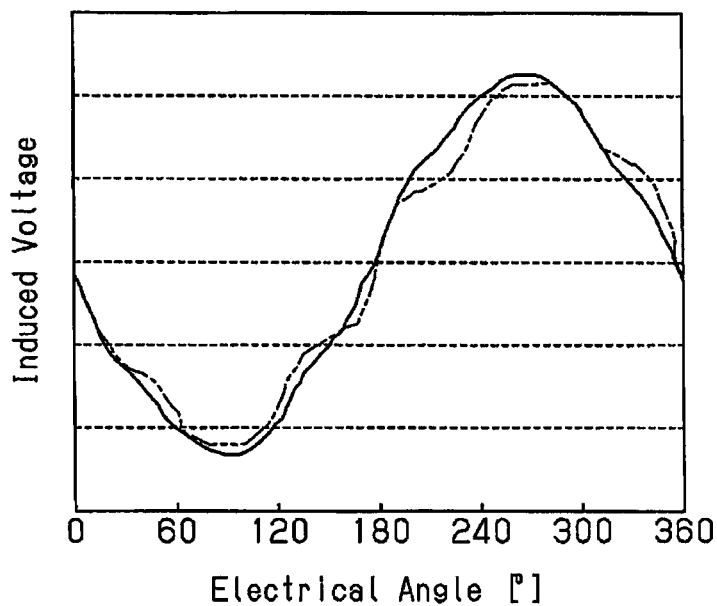
FIG. 107 is a graph of the induced voltage of a motor including the rotor of the example.
Figure 108:
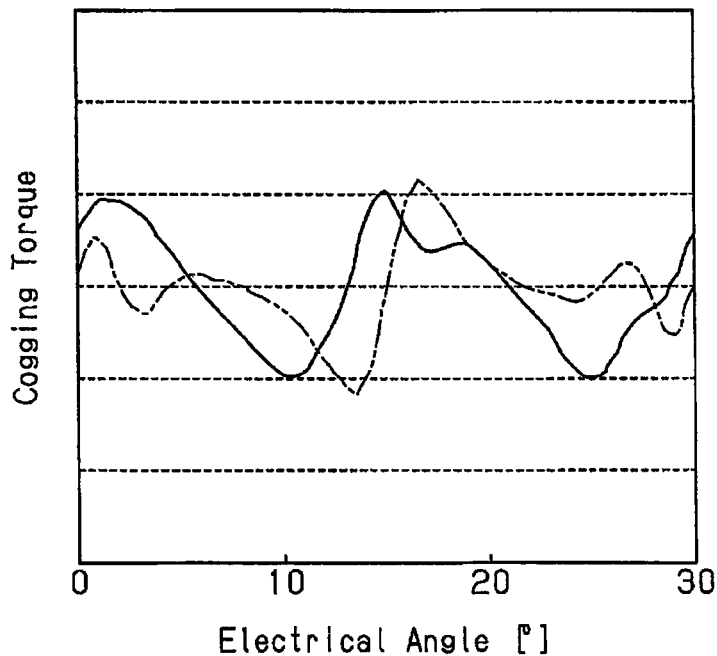
FIG. 108 is a graph of the cogging torque of the motor including the rotor of the example.
Figure 109:
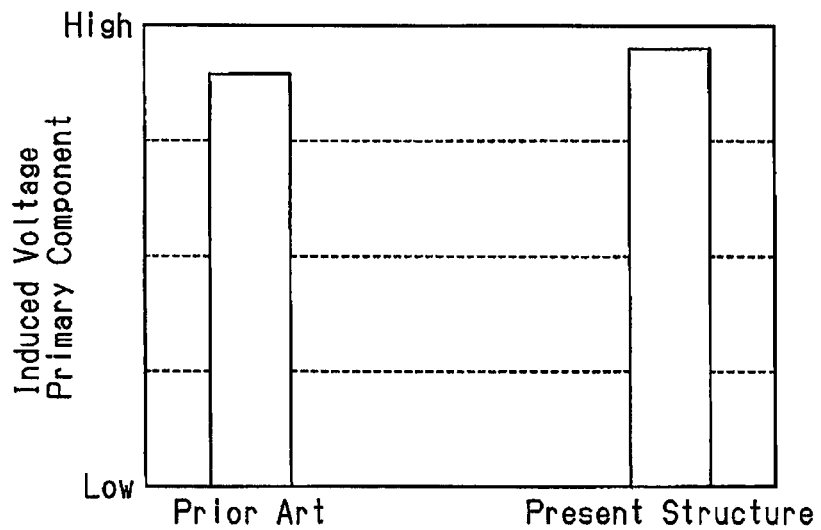
FIG. 109 is a graph of the difference between induced voltage of the motor including the rotor of the example and induced voltage of a conventional motor.
Figure 110:
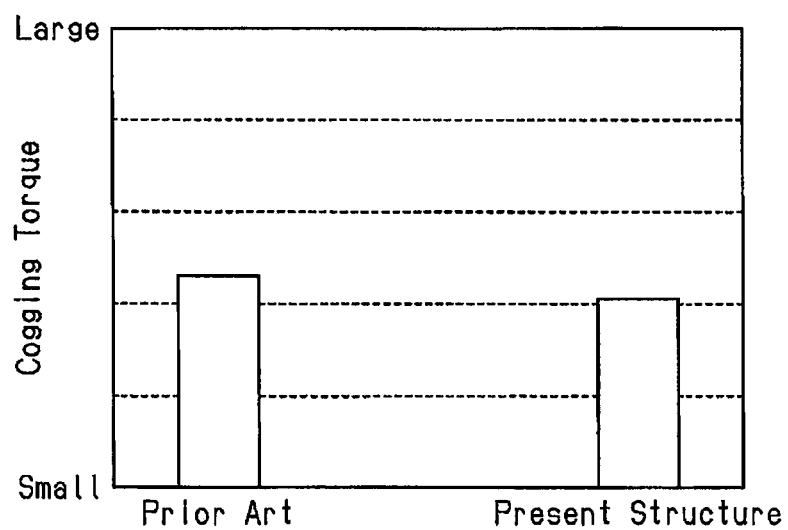
FIG. 110 is a graph of a difference between cogging torque of the motor including the rotor of the example and cogging torque of the conventional motor.

As shown in FIGS. 105A to 106, the magnetic pole portions 733 of the first rotor portion 723 and the ferric core portions 747 of the second rotor portion 724 having the same polarity as the magnetic pole portions 733 are overlapped with each other in the axial direction, and the magnetic pole portions 743 of the second rotor portion 724 and the ferric core portions 737 of the first rotor portion 723 having the same polarity as the magnetic pole portions 743 are overlapped with each other in the axial direction. The ferric core portions include the ferric core portions 737, which are inclined toward the first circumferential side, and the ferric core portions 747, which are inclined toward the second circumferential side. This separates the peaks of cogging torques of the ferric core portions 737, which are inclined toward the first circumferential side, and the ferric core portions 747, which are inclined toward the second circumferential side. This suppresses the cogging torques in the entire rotor 721 as shown in FIGS. 108 and 110. The induced voltage can be enhanced as shown in FIGS. 107 and 109. The axial gap K is employed as the magnetic resistance portion between the first rotor portions 723 and the second rotor portions 724. This magnetically separates the first and second rotor portions 723 and 724 from each other without separately arranging a member as the magnetic resistance portion.

Although the gap K is employed as the magnetic resistance portion, a member capable of suppressing movement of magnetic force between the first and second rotor portions 723 and 724 in the axial direction may be arranged, and this member may be employed as the magnetic resistance portion.

In FIGS. 105A and 105B, the magnetic directions of the magnetic pole portions 733 and 743 of the rotor portions 723 and 724 are inclined in the same direction (first side of circumferential direction) in the same manner as the above embodiment. This may be modified to structure N.

Structure N

As shown in FIGS. 111A and 111B, magnetic directions of the magnetic pole portions 733 of the first rotor portion 723 may be inclined toward the first circumferential side, and the magnetic directions of the magnetic pole portions 743 of the second rotor portion 724 may be inclined toward the second circumferential side.

Structure O

A rotor structure as shown in FIGS. 112A and 112B may be employed. As shown in FIGS. 112A and 112B, the first rotor portion 723 includes magnetic pole portions 761 having magnetic directions inclined toward the first circumferential side and magnetic pole portions 762 having magnetic directions inclined toward the second circumferential side. The magnetic pole portions 761 having the magnetic directions inclined toward the first circumferential side and the magnetic pole portions 762 having the magnetic directions inclined toward the first circumferential side have shapes which are reversed every electrical angle of 360° (45° in mechanical angle in the drawings). As shown in FIG. 112B, the second rotor portion 724 includes magnetic pole portions 763 having magnetic directions inclined toward the first circumferential side and magnetic pole portions 764 having magnetic directions inclined toward the second circumferential side. The magnetic pole portions 763 having the magnetic directions inclined toward the first circumferential side and the magnetic pole portions 764 having the magnetic directions inclined toward the second circumferential side have shapes which are reversed every electrical angle of 360° (45° in mechanical angle in the drawings).

Structure P

Figure 113A:
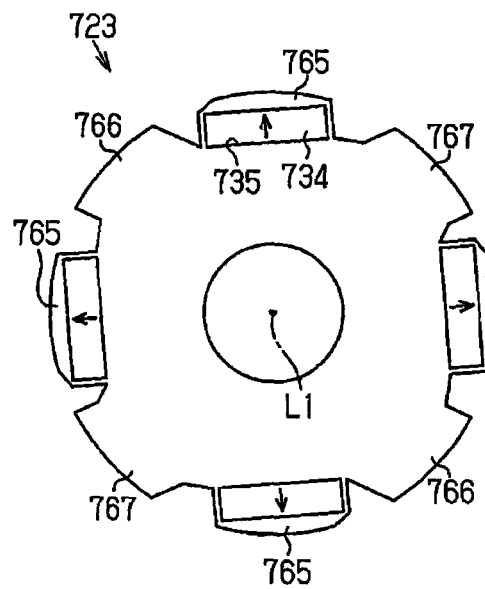
FIGS. 113A and 113B are plan views showing a rotor in another example.
Figure 113B:
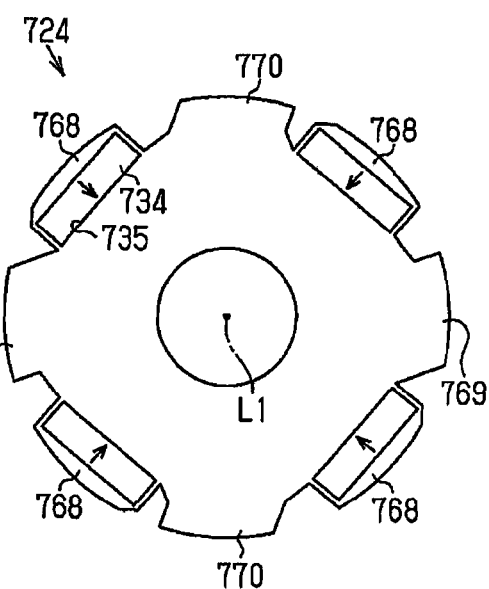

A rotor structure as shown in FIGS. 113A and 113B may be employed. As shown in FIG. 113A, the first rotor portion 723 includes magnetic pole portions 765 having magnetic directions inclined toward the first circumferential side, ferric core portions 766 inclined toward the first circumferential side, and ferric core portions 767 inclined toward the second circumferential side. As shown in FIG. 113B, the second rotor portion 724 includes magnetic pole portions 768 having magnetic directions inclined toward the first circumferential side, ferric core portions 769 inclined toward the first circumferential side, and ferric core portions 770 inclined toward the second circumferential side. The second rotor portion 724 has a shape obtained by rotating the first rotor portion 723 toward the first circumferential side (counterclockwise direction in FIG. 113A) by about 45°. The magnets 734 of the magnetic pole portions 768 forming the second rotor portion 724 have polarities on a radially outer side opposite from the magnets 734 of the magnetic pole portions 765 forming the first rotor portion 723.

Structure Q

Figure 114A:
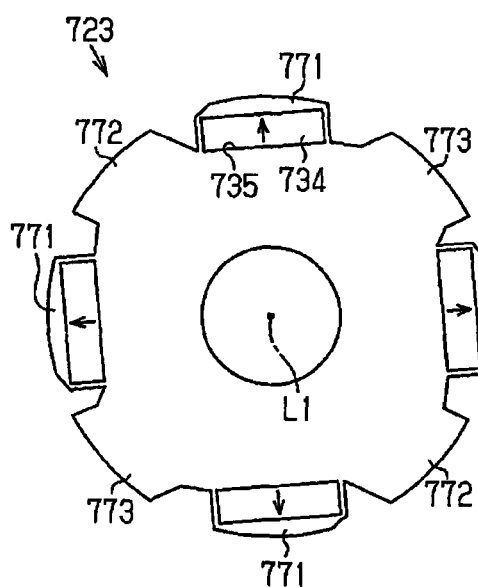
FIGS. 114A and 114B are plan views showing a rotor in another example.
Figure 114B:
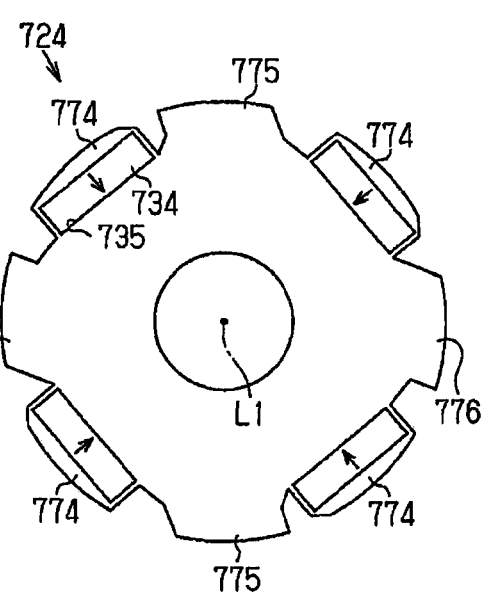

A rotor structure as shown in FIGS. 114A and 114B may be employed. As shown in FIG. 114A, the first rotor portion 723 includes magnetic pole portions 771 having magnetic directions inclined toward the first circumferential side, ferric core portions 772 inclined toward the first circumferential side, and ferric core portions 773 inclined toward the second circumferential side. As shown in FIG. 114B, the second rotor portion 724 includes magnetic pole portions 774 having magnetic directions inclined toward the second circumferential side, ferric core portions 775 inclined toward the first circumferential side, and ferric core portions 776 inclined toward the second circumferential side. The magnets 734 of the magnetic pole portions 774 forming the second rotor portion 724 have polarities at a radially outer side opposite from the magnets 734 of the magnetic pole portions 771 forming the first rotor portion 723.

Structure R

Figure 115A:
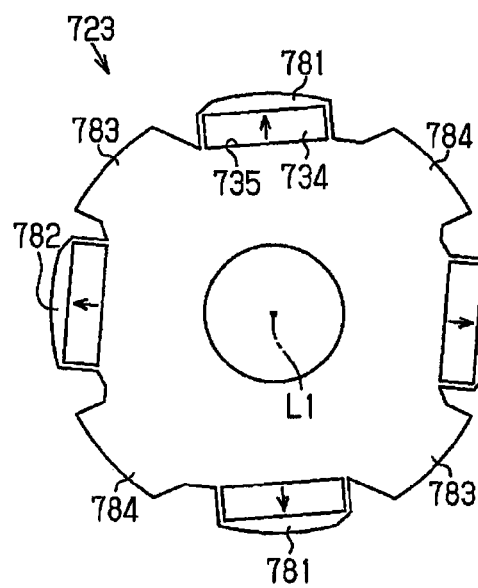
FIGS. 115A and 115B are plan views showing a rotor in another example.
Figure 115B:
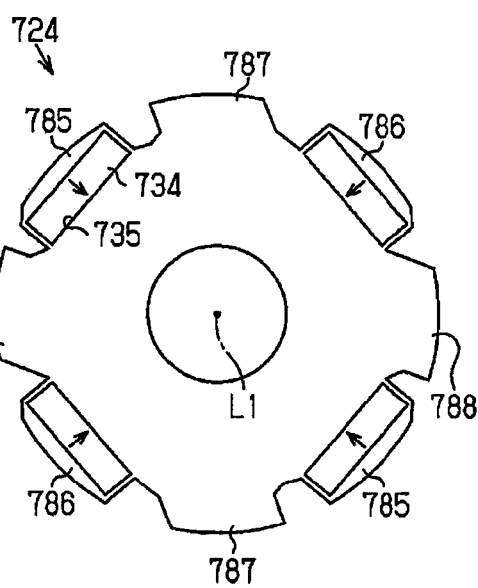

A rotation shaft as shown in FIGS. 115A and 115B may be employed. As shown in FIG. 115A, the first rotor portion 723 includes magnetic pole portions 781 having magnetic directions inclined toward the first circumferential side, magnetic pole portions 782 having magnetic directions inclined toward the second circumferential side, ferric core portions 783 inclined toward the first circumferential side, and ferric core portions 784 inclined toward the second circumferential side. The magnetic pole portions 781 having the magnetic directions inclined toward the first circumferential side and the magnetic pole portions 782 having the magnetic directions inclined toward the second circumferential side have shapes reversed every 360° in electrical angle. As shown in FIG. 115B, the second rotor portion 724 includes magnetic pole portions 785 having magnetic directions inclined toward the first circumferential side, magnetic pole portions 786 having magnetic directions inclined toward the second circumferential side, ferric core portions 787 inclined toward the first circumferential side, and ferric core portions 788 inclined toward the second circumferential side. The magnetic pole portions 785 having the magnetic directions inclined toward the first circumferential side and the magnetic pole portions 786 having the magnetic directions inclined toward the second circumferential side have shapes reversed every 360° in electrical angle. The magnets 734 of the magnetic pole portions 781 and 782 forming the second rotor portion 724 have polarities on a radially outer side which are opposite from those of the magnets 734 of the magnetic pole portions 785 and 786 forming the first rotor portion 723.

Figure 116A:
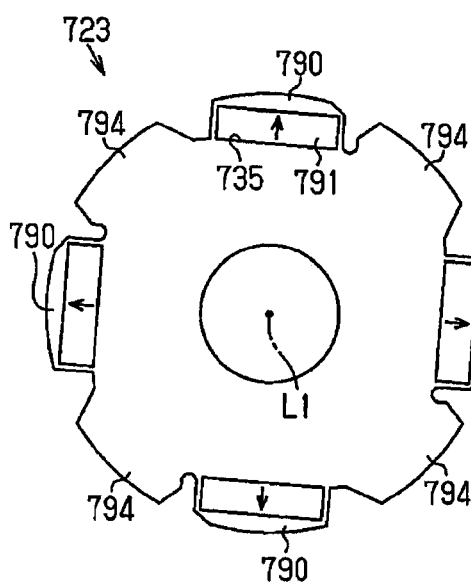
FIGS. 116A and 116B are plan views showing a rotor in another example.
Figure 116B:
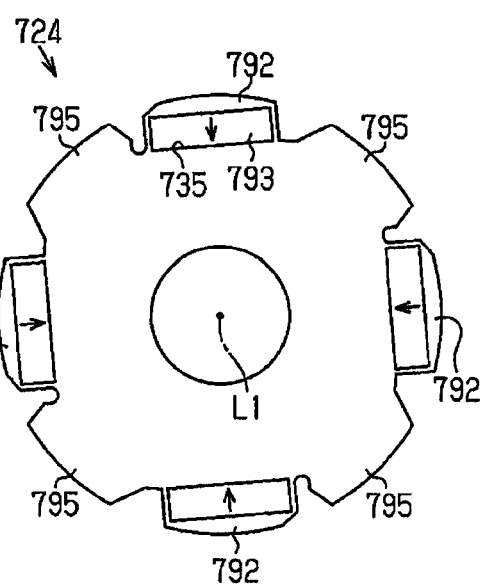
Figure 117:
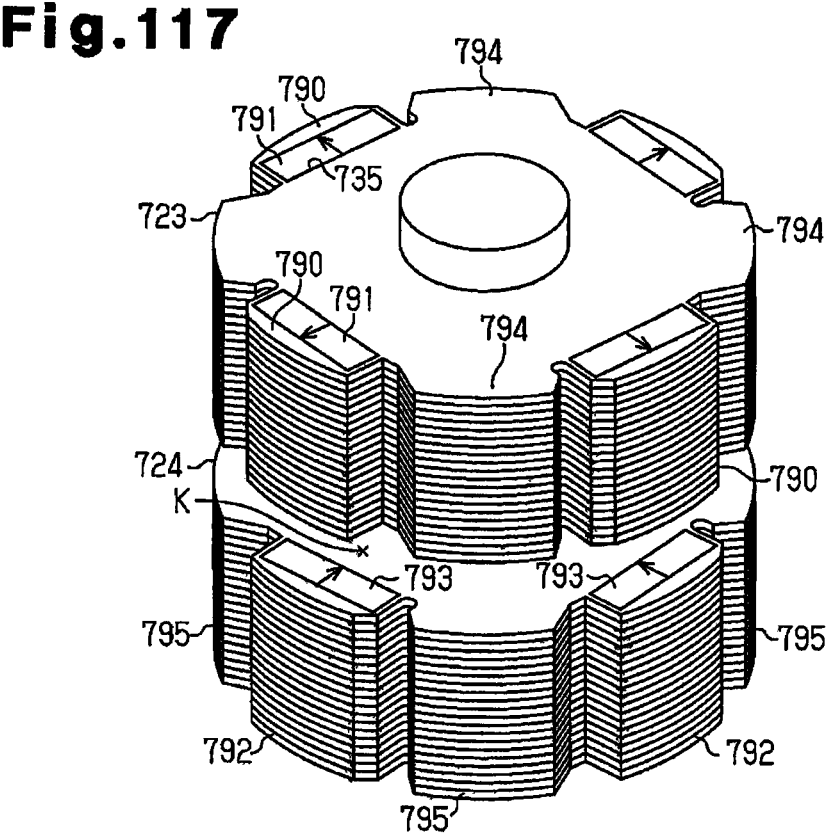
FIG. 117 is a perspective view showing the rotor of the example.
Figure 118:
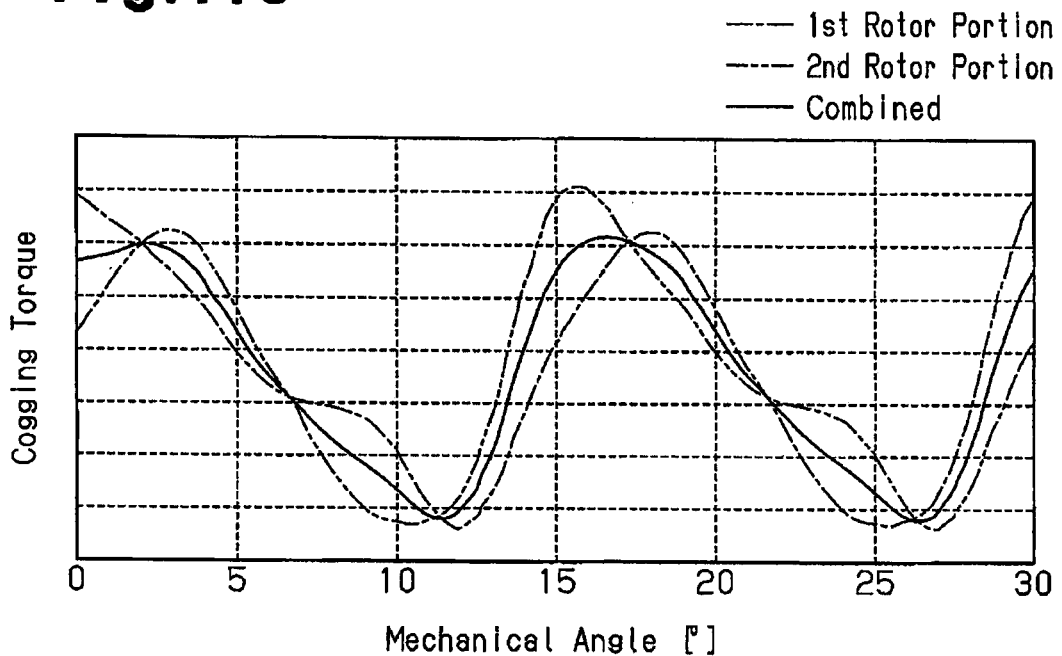
FIG. 118 is a graph of the cogging torque of a motor including the rotor of the example.
Figure 119:
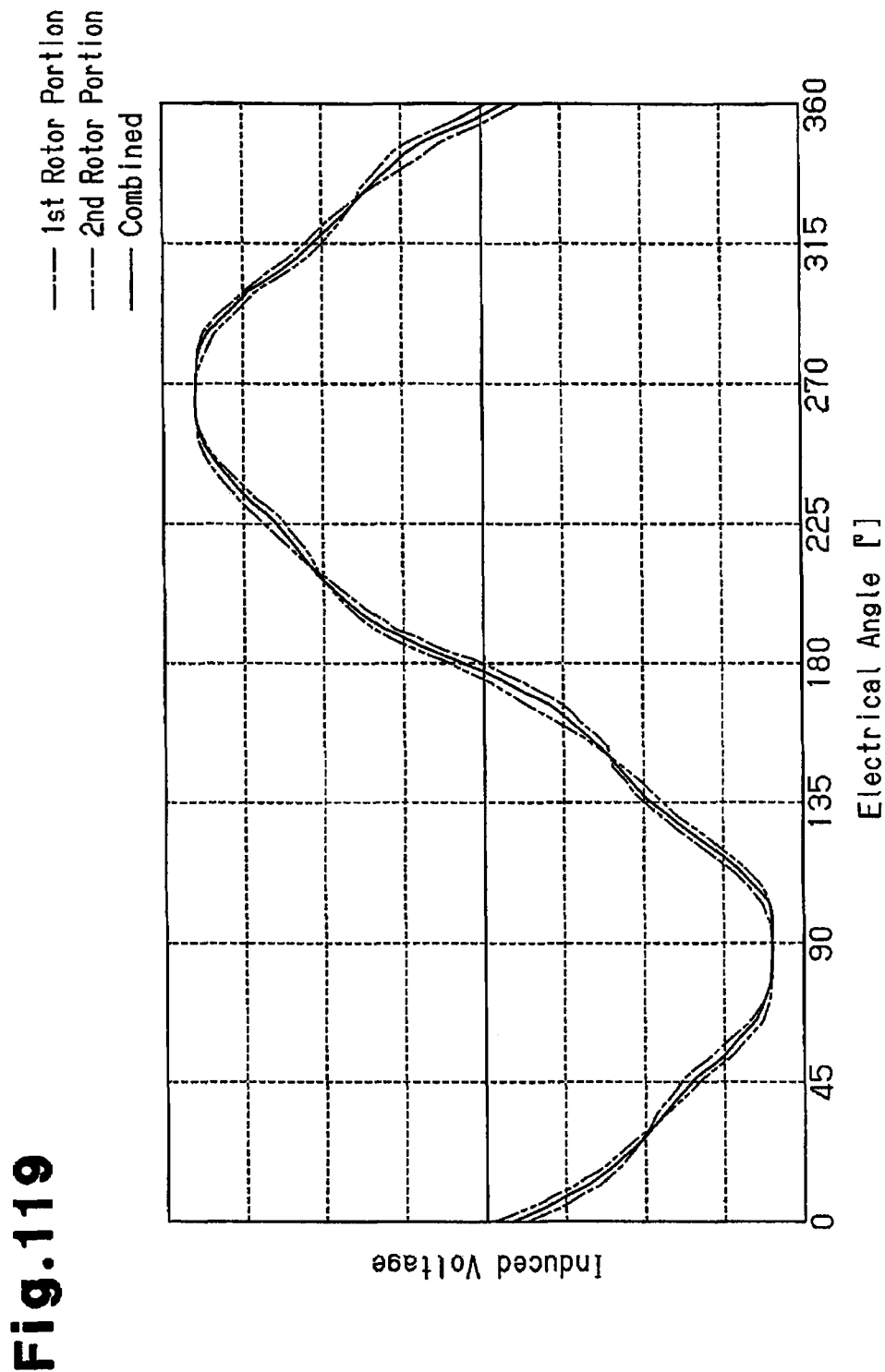
FIG. 119 is a graph of the induced voltage of the motor including the rotor of the example.

In the above embodiment, the magnets 734 and 744 of the magnetic pole portions 733 and 743 overlapped with each other in the axial direction have the same polarity at the radially outer side. Instead, for example, as shown in FIGS. 116A to 117, it is possible to employ a structure that polarities of magnets 791 provided on magnetic pole portions 791 of the first rotor portion 723 and polarities of magnets 793 provided on magnetic pole portions 792 of the second rotor portion 724 are opposite from each other, and the magnetic pole portions 790 and 792 are overlapped with each other in the axial direction through a gap K as a magnetic resistance portion. More specifically, the first rotor portion 723 includes magnetic pole portions 790 having magnetic directions inclined toward the second circumferential side, and ferric core portions 794 inclined toward the first circumferential side. The second rotor portion 724 includes magnetic pole portions 792 having magnetic directions inclined toward the first circumferential side, and ferric core portions 795 inclined toward the second circumferential side. The magnets 791 of the first rotor portion 723 are arranged so that magnetic poles on a radially outer side are south poles, and the magnets 793 of the second rotor portion 724 are arranged so that magnetic poles on a radially outer side are north poles so that the polarities of the magnets 793 become opposite from those of the magnets 791 of the first rotor portion 723. In this structure also, as shown in FIG. 118, the peaks of cogging torques generated by the rotor portions 723 and 724 are separated from each other. This cancels out the cogging torques generated by the rotor portions 723 and 724. As shown in FIG. 119, by combining the induced voltage of the first rotor portion 723 and the induced voltage of the second rotor portion 724, the pitch of the induced voltage becomes even.

The magnetic directions of the magnetic pole portions 733 and 743 and the ferric core portions 737 and 747 are inclined in the circumferential direction in the above embodiment. Structures in which the magnetic directions of magnetic pole portions are inclined in the circumferential direction without inclining the ferric core portions will be described as reference examples.

As shown in FIG. 121, a rotor 800 includes a rotation shaft 801 and first and second rotor portions 802 and 803 fixed to the rotation shaft 801. The rotation shaft 801 has substantially the same shape as the rotation shaft 722 and thus will not be described in detail.

The first rotor portion 802 includes magnetic pole portions 811 and ferric core portions 812.

Magnets 811a forming the magnetic pole portions 811 are inclined toward the first circumferential side so that ends of the magnets 811a at the first circumferential side as viewed from the axial direction are close to a central portion (center in radial direction) of the rotor and ends of the magnets 811a at the second circumferential side become far from the central portion of the rotor. In this structure, as the magnets 811a incline, the magnetic directions as the magnetic pole portions 811 incline in the same direction (one side in circumferential direction).

As shown in FIG. 120A, each ferric core portions 812 extends outward in the radial direction. The ferric core portion 812 extends along the radial direction and is not inclined in the circumferential direction.

The second rotor portion 724 includes magnetic pole portions 821 and ferric core portions 822.

Magnets 821a forming the magnetic pole portions 821 are inclined toward the first circumferential side so that ends of the magnets 821a at the first circumferential side as viewed from the axial direction are close to the central portion (center in radial direction) of the rotor and ends of the magnets 821a at the second circumferential side become far from the central portion of the rotor. In this structure, as the magnets 821a incline, the magnetic directions as the magnetic pole portions 821 incline in the same direction (one side in circumferential direction).

As shown in FIG. 120B, each ferric core portion 822 extends outward in the radial direction. The ferric core portion 822 extends along the radial direction and is not inclined in the circumferential direction.

The first and second rotor portions 802 and 803 are arranged so that the magnetic pole portions 811 of the first rotor portion 802 and the ferric core portions 822 of the second rotor portion 803 having the same polarities as the magnetic pole portions 811 are overlapped with each other in the axial direction. The ferric core portions 812 of the first rotor portion 802 and the magnetic pole portions 821 of the second rotor portion 803 having the same polarity as the ferric core portions 812 are overlapped with each other in the axial direction through a gap K.

Figure 122:
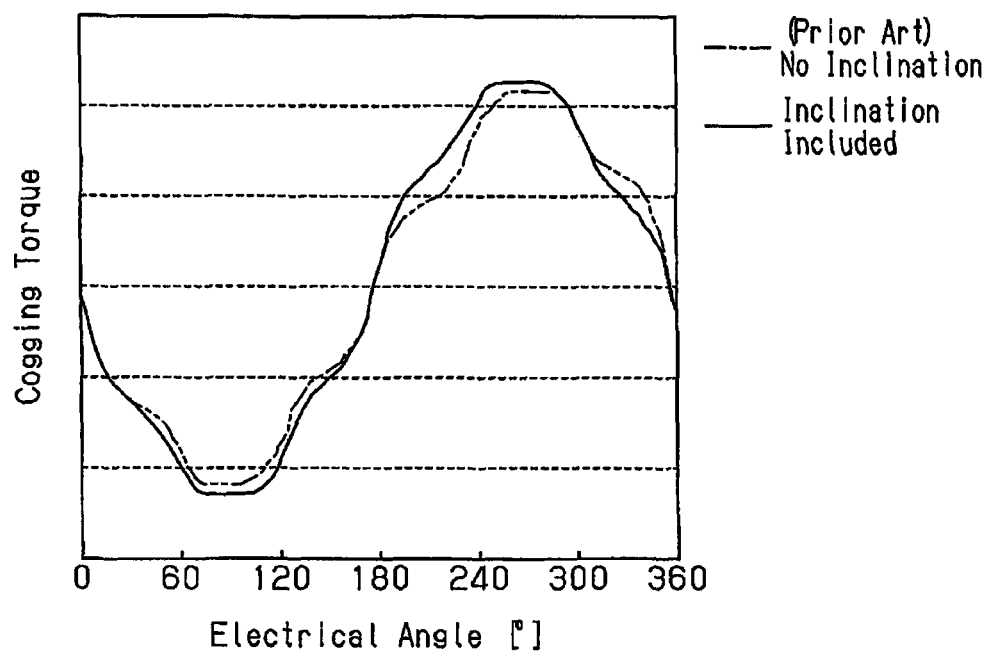
FIG. 122 is a graph of the induced voltage of a motor including the rotor of the example.
Figure 123:
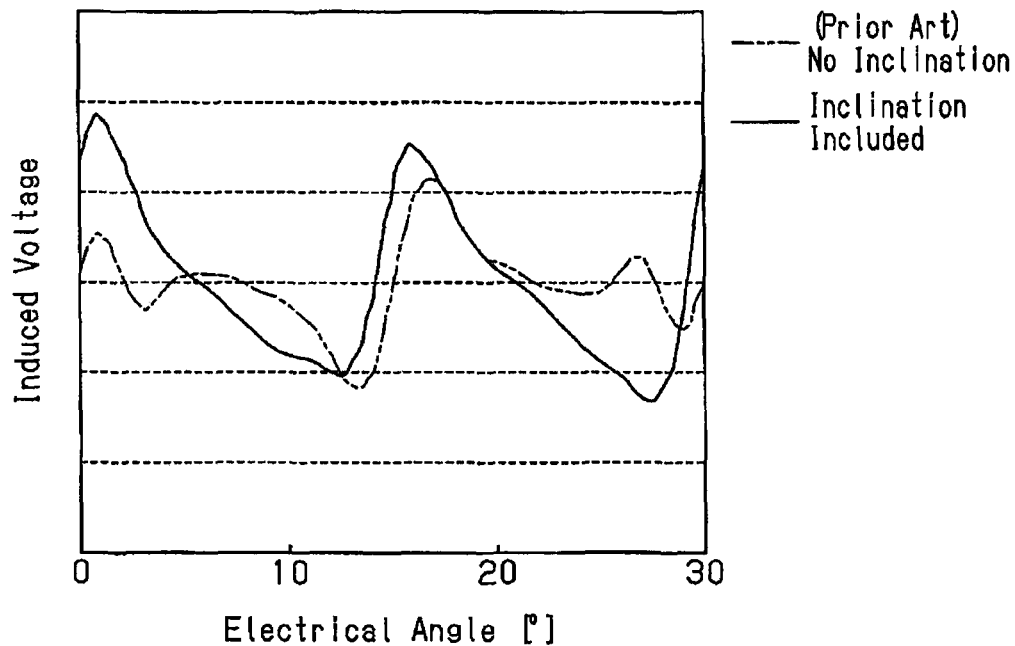
FIG. 123 is a graph of cogging torque of the motor including the rotor of the example.

As described above, the first and second rotor portions 802 and 803 are formed so that magnetic directions of the magnetic pole portions 811 and 821 are inclined in the circumferential direction and the ferric core portions 812 and 822 are not inclined. This increases the cogging torque as shown in FIG. 122 but increases the induced voltage as shown in FIG. 123.

Although the rotors are IPM-type rotors in which the magnets 734 and 744 are received in the magnet receptacles 735 and 745 in the above embodiments and modification, the rotors may be SPM-type rotors in which the magnets 734 and 744 are arranged on the outer circumferential surfaces of the rotor cores 731 and 741.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

DESCRIPTION OF REFERENCE CHARACTERS 10) motor; 21, 101, 121, 160, 260, 311, 331) rotor; 22) rotation shaft; 23, 102, 122, 312, 313, 332) rotor core; 24, 163, 164, 261, 271; 351, 352) core sheet; 30c, 133a, 182a, 185a, 203a, 213a, 223a, 233a, 243a, 253a, 263a, 272a, 312b, 313b, 314b, 333b) outer surface; 30) magnetic pole portion; 31, 314, 333) magnet; 33, 34, 51, 52, 53, 54, 113, 114, 115, 116, 134, 135, 136, 137, 143, 144, 145, 146, 153, 154, 155, 156, 175, 176, 177, 178, 187, 188, 189, 190, 205, 206, 207, 208, 215, 216, 217, 218, 225, 226, 235, 236, 244, 245, 254, 255, 265, 266, 275, 276, 321, 322, 323, 324, 341, 342, 343, 344) gap serving as boundary; 35, 35a, 35b, 41, 42, 43, 44, 111, 112, 133, 161, 312a, 313a, 332a, 332b) ferric core portion; 113a, 115a, 134a, 136a, 143a, 144a, 145a, 146a, 153a, 154a, 155a, 156a, 175a, 177a, 187a, 189a, 207a, 217a, 225a, 226a, 235a, 236a, 244a, 254a, 265a, 266a, 275a, 276a) gap extension; 131, 132, 141, 142, 151, 152, 162) magnetic pole portion; H) circumferential width; 410) motor; 421, 500, 551) rotor; 422) rotation shaft; 423, 451, 471, 481, 501, 552, 553, 581, 601, 611) first rotor portion; 431, 441, 511, 521, 561, 571) rotor core; 424, 452, 472, 482, 502, 553, 582, 602, 612) second rotor portion; 433, 443, 455, 455a, 455b, 458, 458a, 458b, 471c, 471d, 472c, 472d, 481c, 481d, 482c, 482d, 513, 523) magnetic pole portion; 434, 444) magnet; 437, 447, 457a, 457b, 460a, 460b, 514, 524, 564, 574, 581a, 581b, 582a, 582b, 601a, 601b, 602a, 602b, 611a, 611b, 612a, 612b) ferric core portion; 436a, 436b, 446a, 446b, 456a, 456b, 459a, 459b, 515, 516, 525, 526, 566, 567, 576, 577, 591~598) gap; 562, 572) magnet forming magnetic pole portion; K) axial gap serving as magnetic resistance; 710) motor; 721, 800) rotor; 723, 802) first rotor portion; 724, 803) second rotor portion; 731, 741) rotor core; 733, 743, 761, 762, 763, 764, 765, 768, 771, 774, 781, 782, 785, 786, 790, 792, 811, 821) magnetic pole portion; 734, 744, 791, 793, 811a, 821a) magnet; 737, 738, 747, 748, 766, 767, 769, 770, 772, 773, 775, 776, 783, 784, 787, 788, 794, 795, 812, 822) ferric core portion; 736a, 736b, 746a, 746b) gap serving as boundary.

The invention claimed is:

1. A rotor comprising:
a plurality of magnetic pole portions arranged along a circumferential direction of a rotor core, wherein each of the magnetic pole portions includes a magnet forming one of two magnetic poles; and
first and second ferric core portions arranged in the rotor core and located between adjacent ones of the magnetic pole portions in the circumferential direction, wherein
each of the first and second ferric core portions functions as the other one of the magnetic poles,
a first gap is formed between each of the first and second ferric core portions and a magnetic pole portion located at a first circumferential side,
a second gap is formed between each of the first and second ferric core portions and a magnetic pole portion located at a second circumferential side,
the first gap at the first circumferential side of the first ferric core portion has a smaller width than the second gap at the second circumferential side of the first ferric core portion,
the first ferric core portion is inclined toward the first circumferential side,
the first gap at the first circumferential side of the second ferric core portion has a larger width than the second gap at the second circumferential side of the second ferric core portion,
the second ferric core portion is inclined toward the second circumferential side,
each of the magnetic pole portions extends in a direction orthogonal to a radial direction of the rotor core,
each of the first gap and the second gap is only formed between each of the first and second ferric core portions and the magnetic pole portion, and
only one ferric core portion of the first and second ferric core portions is located between adjacent magnetic pole portions.

2. The rotor according to claim 1, wherein
each of the first and second ferric core portions inclines with respect to the radial direction of the rotor core, and each of the magnetic pole portions does not incline with respect to the radial direction of the rotor core.

3. The rotor according to claim 1, wherein
each of the magnetic pole portions includes one outer surface and a pair of side surfaces, and
each of the side surfaces extends along the radial direction of the rotor core.

4. The rotor according to claim 1, wherein the magnet is accommodated in each of the magnetic pole portions so that the magnet is orthogonal to the radial direction of the rotor core.

5. The rotor according to claim 1, wherein
the first ferric core portions and the second ferric core portions are stacked in an axial direction of the rotor at the same position in the circumferential direction, and
the first ferric core portion has a total length in the stacking direction and the second ferric core portion has a total length in the stacking direction that differs from the total length of the first ferric core portion.

6. The rotor according to claim 1, wherein a larger one of the first gap and second gap includes a gap extension that extends to an outer surface of the corresponding one of the first ferric core portion, the second ferric core portion, and the magnetic pole portion.

7. The rotor according to claim 6, further comprising a first rotor portion and a second rotor portion overlapped with each other in the axial direction, wherein
the first gap is arranged in the first rotor portion only at the first circumferential side of the corresponding one of the first ferric core portion, the second ferric core portion, and the magnetic pole portion, and
the first gap is arranged in the second rotor portion only at the second circumferential side of the corresponding one of the first ferric core portion, the second ferric core portion, and the magnetic pole portion.

8. The rotor according to claim 1, wherein the rotor core is formed by stacking a plurality of core sheets that are identical in shape.

9. The rotor according to claim 8, wherein the core sheets are separated from each other in the circumferential direction so that the first ferric core portion is overlapped with the second ferric core portion in the axial direction.

10. The rotor according to claim 8, wherein
the first ferric core portion is one of a plurality of first ferric core portions, and the second ferric core portion is one of a plurality of second ferric core portions,
each of the core sheets includes at least two of the first ferric core portions and at least two of the second ferric core portions, and
either one of the first ferric core portions and the second ferric core portions are identical in shape and separated from each other by 180 degrees in the circumferential direction.

11. The rotor according to claim 8, wherein the rotor core is symmetric in a stacking direction of the core sheets about a center of the stacking direction.

12. The rotor according to claim 1, wherein the first and second ferric core portions are arranged so that a circumferential angle at a radially outer side is in an electrical angle range of 5 degrees to 24 degrees.

13. A motor comprising the rotor according to claim 1.

14. A rotor comprising:
a plurality of magnetic pole portions arranged along a circumferential direction of a rotor core, wherein each of the magnetic pole portions includes a magnet forming one of two magnetic poles; and first and second ferric core portions located between the magnetic pole portions, wherein each of the first and second ferric core portions functions as the other one of the magnetic poles, a first gap is formed between each of the first and second ferric core portions and a magnetic pole portion located at a first circumferential side, a second gap is formed between each of the first and second ferric core portions and a magnetic pole portion located at a second circumferential side, the first gap and the second gap have different circumferential widths, a total circumferential width of the first gap is equal to a total circumferential width of the second gap, each of the magnetic pole portions extends in a direction orthogonal to a radial direction of the rotor core, each of the first gap and the second gap is only formed between each of the first and second ferric core portions and the magnetic pole portion, and only one ferric core portion of the first and second ferric core portions is located between adjacent magnetic pole portions.

15. A motor comprising the rotor according to claim 14.

\* \* \* \* \*